(12) United States Patent
Cho et al.

(10) Patent No.: US 8,675,272 B2
(45) Date of Patent: Mar. 18, 2014

(54) OPTICAL MODULATOR, METHODS OF MANUFACTURING AND OPERATING THE SAME AND OPTICAL APPARATUS INCLUDING THE OPTICAL MODULATOR

(75) Inventors: Yong-chul Cho, Suwon-si (KR); Jae-hyung Jang, Seoul (KR); Yong-hwa Park, Yongin-si (KR); Chang-soo Park, Daejeon (KR); Jong-In Song, Gwangju (KR)

(73) Assignees: Samsung Electronics Co., Ltd., Suwon-si (KR); Gwangju Institute of Science and Technology, Gwangju (KR)

( * ) Notice: Subject to any disclaimer, the term of this patent is extended or adjusted under 35 U.S.C. 154(b) by 717 days.

(21) Appl. No.: 12/720,795

(22) Filed: Mar. 10, 2010

(65) Prior Publication Data

US 2010/0321755 A1 Dec. 23, 2010

(30) Foreign Application Priority Data

Jun. 17, 2009 (KR) .................. 10-2009-0053996

(51) Int. Cl.
| | |
|---|---|
| *G02F 1/01* | (2006.01) |
| *G02F 1/03* | (2006.01) |
| *G02F 1/07* | (2006.01) |
| *G02F 1/017* | (2006.01) |
| *G02F 1/025* | (2006.01) |

(52) U.S. Cl.
CPC ............ *G02F 1/01708* (2013.01); *G02F 1/025* (2013.01)
USPC ............................ 359/248; 359/238; 359/245

(58) Field of Classification Search
USPC ................ 359/238, 245, 248; 257/11–27, 79, 257/94–97, 183–201
See application file for complete search history.

(56) References Cited

U.S. PATENT DOCUMENTS

| | | | |
|---|---|---|---|
| 4,708,473 A | 11/1987 | Metzdorff et al. | |
| 4,915,498 A | 4/1990 | Malek | |
| 4,935,616 A | 6/1990 | Scott | |
| 5,027,182 A | 6/1991 | Kim et al. | |
| 5,081,530 A | 1/1992 | Medina | |
| 5,157,451 A | 10/1992 | Taboada et al. | |
| 5,200,793 A | 4/1993 | Ulich et al. | |
| 5,204,521 A | 4/1993 | Lin et al. | |
| 5,567,955 A | 10/1996 | Liu | |
| 5,572,540 A * | 11/1996 | Cheng ..................... | 372/50.12 |
| 5,579,103 A | 11/1996 | Tachikawa | |

(Continued)

OTHER PUBLICATIONS

Weidong Zhou, et al, "Lower-Power Phototransceiver Arrays With Vertically Integrated Resonant-Cavity LEDs and Heterostructure Phototransistors", IEEE Photonics Technology Letters, Vol. 13, No. 11, Nov. 2001, pp. 1218-1220.

(Continued)

*Primary Examiner* — Mahidere Sahle
(74) *Attorney, Agent, or Firm* — Sughrue Mion, PLLC

(57) ABSTRACT

An optical modulator, methods of manufacturing and operating the same, and an optical apparatus including the optical modulator are disclosed. The optical modulator includes an electro-optical converter and an optical-electric converter, stacked perpendicular to a substrate, and a gate transistor. The gate transistor gates a signal transmitted to the electro-optical converter from the optical-electric converter and allows charges generated in the optical-electric converter and charges remaining in the electro-optical converter to flow while bypassing the electro-optical converter when gating ON is performed.

38 Claims, 35 Drawing Sheets

(56) References Cited

U.S. PATENT DOCUMENTS

| | | | |
|---|---|---|---|
| 5,684,308 A * | 11/1997 | Lovejoy et al. | 257/184 |
| 6,028,328 A | 2/2000 | Riechert et al. | |
| 6,088,068 A | 7/2000 | Halttunen et al. | |
| 6,100,517 A | 8/2000 | Yahav et al. | |
| 6,331,911 B1 | 12/2001 | Manassen et al. | |
| 6,483,094 B1 | 11/2002 | Yahav et al. | |
| 6,597,011 B1 | 7/2003 | Atanackovic | |
| 6,987,306 B2 | 1/2006 | Fathimulla et al. | |
| 7,016,519 B1 | 3/2006 | Nakamura et al. | |
| 7,067,853 B1 | 6/2006 | Yao | |
| 7,079,307 B2 | 7/2006 | Chun Liu et al. | |
| 7,095,487 B2 | 8/2006 | Gonzalez-Banos et al. | |
| 2006/0087640 A1 | 4/2006 | Yamaguchi | |
| 2006/0250330 A1 * | 11/2006 | Fish | 345/76 |
| 2008/0137071 A1 | 6/2008 | Chow | |
| 2008/0173879 A1 | 7/2008 | Monaco et al. | |
| 2009/0101919 A1 * | 4/2009 | Yao | 257/85 |

OTHER PUBLICATIONS

H. Luo, et al, "Optical upconverter with integrated heterojunction phototransistor and light-emitting diode", Applied Physics Letters 88, (2006), 073501-073501-3.

Kenichi Matsuda et al; "Optoelectronic approach to optical parallel processing based on the photonic parallel memory (PPM)"; SPIE Proceedings; Devices for Optical Processing; vol. 1562; 1991; pp. 21-29.

H. Beneking et al, GaAs-GaAlAs Anti-Stokes Light Converter; Electronics Letters; vol. 10; No. 16; Aug. 8, 1974; pp. 346-347.

B.Yang et al; "Quantum Electronics Letters"; IEEE Journal of Quantum Electronics; vol. 36; No. 12; Dec. 2000; pp. 1389-1391.

Hossam M.H. Shalaby; "Chip-Level Detection in Optical Code Division Multiple Access"; Journal of Lightwave Technology; vol. 16; No. 6; Jun. 1998; pp. 1077-1087.

* cited by examiner (A) PULSE GATING (B) SINUSOIDAL GATING

OPTICAL MODULATOR, METHODS OF MANUFACTURING AND OPERATING THE SAME AND OPTICAL APPARATUS INCLUDING THE OPTICAL MODULATOR

CROSS-REFERENCE TO RELATED APPLICATIONS

This application claims the benefit of Korean Patent Application No. 10-2009-0053996, filed on Jun. 17, 2009, in the Korean Intellectual Property Office, and the disclosure of which is incorporated herein in its entirety by reference.

BACKGROUND

1. Field

One or more exemplary embodiments of the present invention relate to an optical modulator and methods of manufacturing and operating the same, and more particularly, to an optical modulator having a gating function, methods of manufacturing and operating the same, and an optical apparatus including the optical modulator.

2. Description of the Related Art

An additional unit is used in order to obtain information about the distance between a camera that takes two-dimensional images and a subject. The information about the distance between the camera and the subject may be obtained by using a binocular stereo vision method using two cameras or a triangulation method using structured light and a camera. However, in the binocular stereo vision method or the triangulation method, as the distance between the camera and the subject increases, accuracy of the information about the distance is rapidly reduced, and the distance measured is dependent on the surface state of the subject. Thus it is difficult to obtain accurate information about the distance.

In order to overcome this problem, a time-of-flight (TOF) method has been developed. In the TOF method, a light flight time, which is the time taken for modulated light to be irradiated onto a subject, reflected from the subject and received by a light receiving unit, is measured.

TOF methods may be classified into a TOF method using direct time measuring, a TOF method using phase delay measuring, and a TOF method using correlation.

In the TOF method using direct time measuring, the time taken for pulse light to be projected onto a subject and reflected from the subject is measured using a timer.

In the TOF method using phase delay measuring, a light having a continuous sinusoidal wave is projected onto a subject, reflected by the subject, and a phase difference of the light is detected to calculate distance.

In the TOF method using correlation, pulse light is projected onto a subject and the distance between the camera and the subject is measured by using information about brightness that is obtained by multiplying a gating signal that is synchronized with the pulse light by a reflection light signal. In the TOF method using correlation, the amount of light of a near subject that is received by the camera is large and thus the image of the subject looks bright, whereas the amount of light of a far subject that is received by the camera is small and thus the image of the subject looks relatively dark.

In the TOF method using phase delay measuring or the TOF method using correlation, information about the distance may be obtained using high-speed gating using an optical modulator.

An image amplifier, which is a type of optical modulator, may obtain a bright image by amplifying fine light by performing a three-step boosting operation. However, an operating voltage of the image amplifier has to be high, and the image amplifier is large sized. In the image amplifier, gating has to be performed so as to obtain information about the distances between a camera and a subject and may be performed using a photocathode of the image amplifier at a speed of about 1 ns to about 5 ns. However, even after gating off is performed using the photocathode of the image amplifier, charges remain in phosphor of the image amplifier. Thus, gating is not completely performed in the image amplifier until light due to the charges that remain in the phosphor of the image amplifier disappears. As such, gating speed of the image amplifier is about 30 Khz to several hundreds of Khz.

An optical modulator using a Pockel or Kerr effect based on crystal optics uses variation of refractive indices according to voltages. In the optical modulator using the Pockel or Kerr effect based on crystal optics, gating may be performed at a speed of several GHz, and a high control voltage of several KV is necessary.

Also, a semiconductor-based optical modulator using a multiple quantum well (MQW) is small-sized and may be driven at low voltage. However, in the semiconductor-based optical modulator using the MQW, an optical gain and wavelength conversion structure is not present, and an ON/OFF ratio is low, and it is difficult to maintain the semiconductor-based optical modulator using the MQW in a completely OFF state. Also, a pixelation operation and a dedicated design of electrodes for operation may be performed so as to gate a large-scale device at high speed.

A semiconductor-based optical shutter having an optical gain includes an Avalanche photodiode (APD) and a light emitting diode (LED), which are vertically stacked on a semiconductor substrate. The semiconductor-based optical shutter may have a small volume. However, a current loop is formed via a gate during a gating operation, and current generated in the APD is diverged by the LED and the gate so that a loss of current may occur. Also, the gate itself may be turned on/off at high speed, and the gating speed of the semiconductor-based optical shutter is reduced because it takes time to turn off the LED. In other words, charges are not transferred to the LED from the APD in a gating ON state, and it takes time for light due to charges stacked on the LED before the gating ON state to disappear. As a result, an optical tail is generated.

SUMMARY

One or more exemplary embodiments of the present invention include an optical modulator that has a relatively small volume and is inexpensive, may be driven with a relatively low voltage and is capable of reducing a gating time.

Additional aspects will be set forth in part in the description which follows and, in part, will be apparent from the description, or may be learned by practice of the presented exemplary embodiments.

According to one or more exemplary embodiments of the present invention, an optical modulator includes: an electro-optical converter and an optical-electric converter, which are stacked in the direction perpendicular to a substrate; and a gate transistor for, when gating ON is performed, gating a signal transmitted to the electro-optical converter from the optical-electric converter and allowing charges generated in the optical-electric converter and charges remaining in the electro-optical converter to flow while bypassing the electro-optical converter.

The optical modulator may further include an array including a plurality of unit pixels, wherein each of the plurality of unit pixels comprises the optical-electric converter, the electro-optical converter, and the gate transistor.

The optical modulator may further include a control unit for simultaneously controlling gate transistors of the array.

The gate transistor and the control unit may be connected to each other via a power transistor.

The array may include a plurality of blocks each of which includes at least two unit pixels, and the gate transistor may be controlled according to each block.

The optical modulator may further include a charge amplification unit disposed between the optical-electric converter and the electro-optical converter, wherein an output terminal of the optical-electric converter is held in common by the gate transistor and the charge amplification unit, and the two converters, the charge amplification unit, and the gate transistor constitute a unit pixel.

The optical-electric converter and the electro-optical converter may constitute a unit pixel, and a gate layer, which is an anode layer, may be held in common by the two converters, and the gate transistor may be connected to the gate layer and may be disposed outside the unit pixel. The optical modulator may further include an array including a plurality of unit pixels, and each of the plurality of unit pixels includes the optical-electric converter and the electro-optical converter, and the gate transistor may be disposed outside the array. The array may include a plurality of blocks, and each of the plurality of blocks may include at least two of the unit pixels, and a plurality of gate transistors may be disposed outside the array to correspond to each of the blocks.

A load may be provided between the gate transistor corresponding to each block and the unit pixels formed in each block.

The optical-electric converter may include a heterojunction phototransistor (HPT) having a 2-port structure or a 3-port structure.

When the optical-electric converter is an HPT having a 2-port structure, an emitter, a base, and a collector of the HPT may be sequentially stacked on the electro-optical converter, and a collector of the gate transistor may be connected to the emitter of the HPT.

When the optical-electric converter includes an HPT having a 2-port structure, a collector, a base, and an emitter of the HPT may be sequentially stacked on the electro-optical converter, and an emitter of the gate transistor may be connected to the collector of the HPT.

When the optical-electric converter includes an HPT having a 3-port structure, an emitter, a base, and a collector of the HPT may be sequentially stacked on the electro-optical converter, and a collector of the gate transistor may be connected to the base of the HPT.

The gate transistor may include a first heterojunction bipolar transistor (HBT), and the charge amplification unit may include a second HBT.

The optical-electric converter may include an avalanche photodiode (APD).

According to one or more exemplary embodiments of the present invention, a method of operating the optical modulator including an electro-optical converter and an optical-electric converter stacked in the direction perpendicular to a substrate and a gate transistor gating a signal transmitted to the electro-optical converter from the optical-electric converter and allowing charges generated in the optical-electric converter and charges remaining in the electro-optical converter to flow while bypassing the electro-optical converter when gating ON is performed, the method includes applying a gating voltage signal to a gate of the gate transistor.

The gating voltage signal may be supplied in a pulse waveform, a sinusoidal waveform or a triangular waveform.

According to one or more exemplary embodiments of the present invention, an optical apparatus including an optical modulator, wherein the optical modulator includes: an electro-optical converter and an optical-electric converter, which are stacked perpendicular to a substrate; and a gate transistor for, when gating ON is performed, gating a signal transmitted to the electro-optical converter from the optical-electric converter and allowing charges generated in the optical-electric converter and charges remaining in the electro-optical converter to flow while bypassing the electro-optical converter.

According to one or more exemplary embodiments of the present invention, a method of manufacturing an optical modulator, includes: stacking an electro-optical converter and an optical-electric converter in the direction perpendicular to a substrate; and forming a gate transistor for, when gating ON is performed, gating a signal transmitted to the electro-optical converter from the optical-electric converter, wherein the gate transistor allows charges generated in the optical-electric converter and charges remaining in the electro-optical converter to flow while bypassing the electro-optical converter.

The stacking of the electro-optical converter and the optical-electric converter perpendicular to each other may include: forming the electro-optical converter; and forming the optical-electric converter on the electro-optical converter.

The stacking of the electro-optical converter and the optical-electric converter perpendicular to each other may include: forming the optical-electric converter; and forming the electro-optical converter on the optical-electric converter.

The method may further include forming a charge amplification unit for amplifying charges generated in the optical-electric converter, wherein an output terminal of the optical-electric converter is held in common by the gate transistor and the charge amplification unit.

In the stacking of the electro-optical converter and the optical-electric converter perpendicular to each other, when the optical-electric converter includes at least an emitter layer, a base layer, and a collector layer, the electro-optical converter and the optical-electric converter are stacked perpendicular to each other so that the collector layer is a surface on which light is incident.

In the stacking of the electro-optical converter and optical-electric converter perpendicular to each other, when the optical-electric converter may include at least an emitter layer, a base layer, and a collector layer, the electro-optical converter and the optical-electric converter are stacked perpendicular to each other so that the emitter layer is a surface on which light is incident.

The method may further include forming a gate layer between the optical-electric converter and the electro-optical converter, wherein the gate transistor and the gate layer are connected to each other.

The optical-electric converter, the electro-optical converter, and the gate transistor may be formed in an area in which a unit pixel is formed. The optical-electric converter and the electro-optical converter may be formed in an area in which a unit pixel is formed.

The optical-electric converter, the electro-optical converter, the gate transistor, and the charge amplification unit may be formed in an area in which a unit pixel is formed.

The optical-electric converter and the gate transistor may be simultaneously formed.

The optical-electric converter, the gate transistor, and the charge amplification unit may be simultaneously formed.

The optical-electric converter may include a heterojunction phototransistor (HPT) having a 2-port or 3-port structure.

When the optical-electric converter includes an HPT having a 2-port structure, an emitter of the optical-electric converter and a collector of the gate transistor may be connected to each other.

When the optical-electric converter includes an HPT having a 2-port structure, a collector of the optical-electric converter and an emitter of the gate transistor may be connected to each other.

When the optical-electric converter includes an HPT having a 3-port structure, a base of the optical-electric converter and a collector of the gate transistor may be connected to each other.

Each of the optical-electric converter, the gate transistor, and the charge amplification unit may include an HPT, and an emitter of the optical-electric converter may be connected to a collector of the gate transistor and a base of the charge amplification unit.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
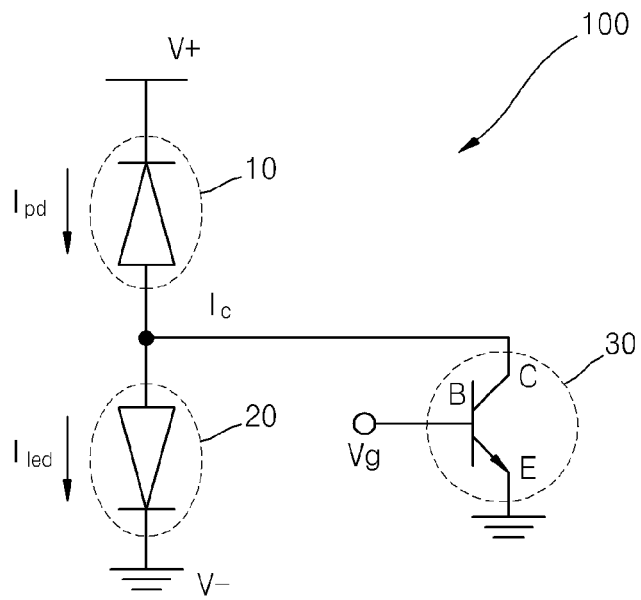
FIG. 1 is a circuit diagram of an optical modulator according to an exemplary embodiment of the present invention.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

FIG. 1 is a circuit diagram of a first optical modulator 100 according to an exemplary embodiment of the present invention. Referring to FIG. 1, the first optical modulator 100 according to the present exemplary embodiment may have an optical amplification function and a wavelength conversion function as well as an optical shutter function. Thus, when light that is incident on the first optical modulator 100 is near infrared light, light to be output from the first optical modulator 100 may be red light that is easily received by a general charge coupled device (CCD) camera.

Referring to FIG. 1, the first optical modulator 100 according to the present exemplary embodiment includes a photodiode 10, a light emitting unit 20, and a gate transistor 30. The photodiode 10 may be an example of an optical-electric converter that converts an optical signal of incident light into an electrical signal. Thus, the photodiode 10 may be replaced with various diodes having an optical-electric conversion function. For example, the photodiode 10 may be an avalanche photodiode (APD). The light emitting unit 20 may be an example of an electro-optical converter that converts the electrical signal input from the photodiode 10 into an optical signal. The light emitting unit 20 may be a light emitting diode. Electrodes disposed on a surface of the light emitting unit 20 from which light is emitted may be grounded, or a lower voltage than a power supply voltage may be applied to the electrodes disposed on a surface of the light emitting unit 20 from which light is emitted. The gate transistor 30 is connected between the photodiode 10 and the light emitting diode 20. The gate transistor 30 may gate a signal transmitted to the light emitting unit 20 from the photodiode 10. In this regard, the gate transistor 30 may be a bipolar transistor. In this case, a collector C of the gate transistor 30 is connected between the photodiode 10 and the light emitting unit 20. An emitter E of the gate transistor 30 may be grounded, and a gating voltage Vg may be applied to a base B of the gate transistor 30. Voltages V+ and V− may be applied to both ends of a unit pixel including the photodiode 10 and the light emitting unit 20. As a result of the application of the voltages V+ and V−, a negative bias voltage is applied to the photodiode 10 and is a positive bias voltage is applied to the light emitting unit 20. When light is incident on the photodiode 10 when the voltages V+ and V− are applied to the photodiode 10, a photodiode current $I_{pd}$ is generated in the photodiode 10 due to a photoelectric effect. The photodiode current $I_{pd}$ is amplified and then is transmitted to the light emitting unit 20. $I_{led}$ represents current transmitted to the light emitting unit 20 from the photodiode 10.

Figure 2:
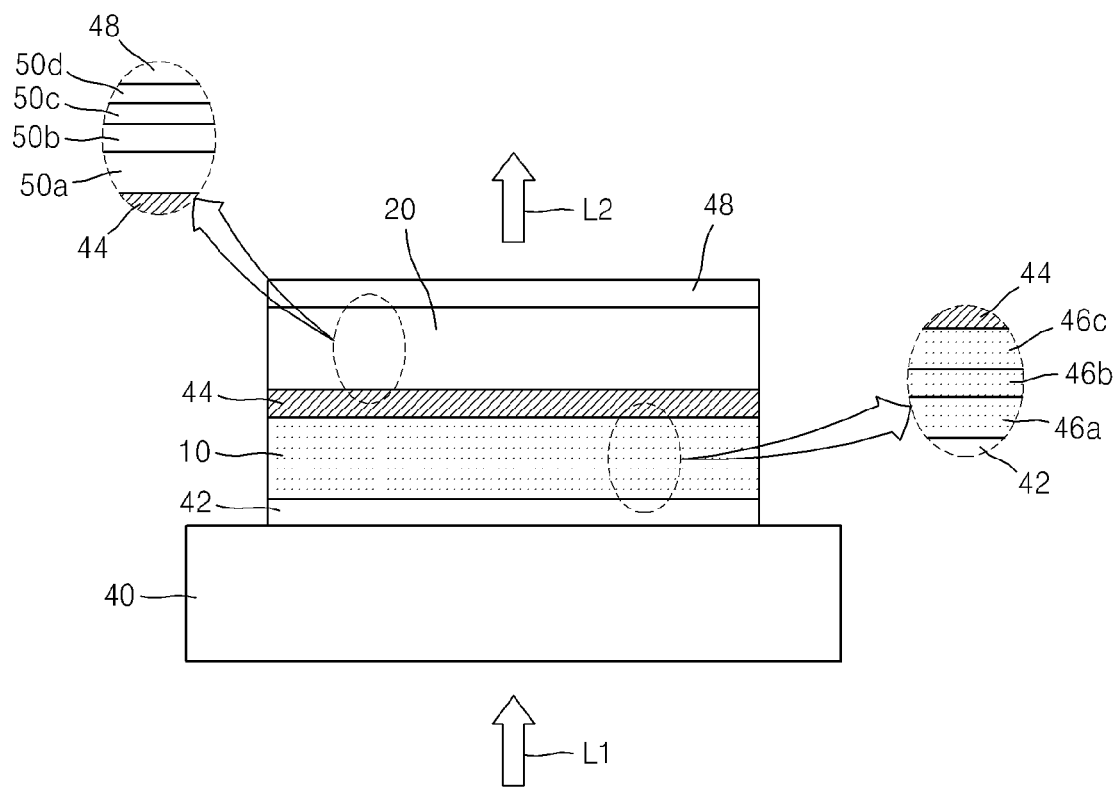
FIG. 2 is a cross-sectional view of an optical modulator that may be represented by the circuit diagram of FIG. 1, according to an exemplary embodiment of the present invention.

FIG. 2 is a cross-sectional view of an optical modulator that may be represented by the circuit diagram of FIG. 1, according to an exemplary embodiment of the present invention. Referring to FIG. 2, a first upper electrode 42 is disposed on a substrate 40. A photodiode 10 is disposed on the first upper electrode 42. The first upper electrode 42 may be a conductive layer that is transparent with respect to incident light L1 incident on the substrate 40, and may be an indium tin oxide (ITO) layer, a zinc oxide (ZnO) layer or an AZO layer. The first upper electrode 42 may contact part or the whole of a bottom surface of the photodiode 10. The substrate 40 may be a transparent substrate with respect to the incident light L1. For example, the substrate 40 may be a GaAs substrate, a glass substrate or a sapphire substrate. However, the substrate 40 may be formed of other transparent materials. A gate layer 44 is disposed on the photodiode 10. The gate layer 44 may be included in the photodiode 10. Also, the gate layer 44 may be included in a light emitting unit 20 disposed on the gate layer 44. In other words, the gate layer 44 may be interposed between the photodiode 10 and the light emitting unit 20. The gate layer 44 is connected to the collector C of the gate transistor 30 of the first optical modulator 100 of FIG. 1 and is used for a gating operation. The gate layer 44 may be an anode layer of the photodiode 10. The gate layer 44 may be a P+ type GaAs layer but may vary according to the incident light L1. The thickness of the gate layer 44 may be about 200 nm. The gate layer 44 may have a greater doping concentration than other layers so that an ohmic contact may be easily achieved. The doping concentration of the gate layer 44 may be greater than $4 \times 10^{18}$ cm$^{-3}$, for example. The doping concentration of the gate layer 44 is relative to other layers and thus may vary according to doping concentrations of other layers.

The first upper electrode 42 may contact a cathode layer (not shown) of the photodiode 10. A capping layer may be disposed between the first upper electrode 42 and the cathode layer. The cathode layer may be an N+ InGaP layer. The capping layer may be an N+ type InGaAs layer or an N+ type GaAs layer. The photodiode 10 includes an absorption layer 46a, a charge layer 46b, and a multiplication layer 46c, which are sequentially stacked on the first upper electrode 42. The cathode layer or the capping layer and the cathode layer are disposed between the first upper electrode 42 and the absorption layer 46a. The absorption layer 46a is formed to absorb the incident light L1, and a material of the absorption layer 46a may vary according to the wavelength of the incident light L1. For example, when the incident light L1 is near infrared light having a wavelength of 900 nm or higher, the absorption layer 46a may be an i-InGaAs layer or i-GaAs layer that has a smaller energy band gap than GaAS and is an undoped layer, but may be other material layers. When the wavelength of the incident light L1 is less than 900 nm, a GaAs layer may be used as the absorption layer 46a but other material layers may also be used as the absorption layer 46a. The multiplication layer 46c multiplies electrons generated in the absorption layer 46a. The multiplication layer 46c is a layer that is doped with a doping impurity and may be a P type GaAs layer having a thickness of about 300 nm to about 1000 nm. When the thickness of the multiplication layer 46c is small, a driving voltage that is used to drive the first optical modulator 100 of FIG. 1 may be reduced, and the range of voltage in which an optical gain of the photodiode 10 is obtained may be limited.

When the photodiode 10 is an APD, the optical gain of the photodiode 10 increases according to the magnitude of the negative bias voltage applied to the photodiode 10. When the negative bias voltage is about 10 V to about 30 V, the optical gain of the photodiode 10 is about 4 to about 5. When the negative bias voltage is 100 V, the optical gain of the photodiode 10 is about 100; however, noise may be increased during an amplification operation. When the negative bias voltage applied to the photodiode 10 is about 40 V to 60 V, the optical gain of the photodiode 10 may be about 50. When the photoelectric conversion efficiency of the photodiode 10 is about 20% to about 30% and the luminous efficiency of the light emitting unit 20 is about 10% to about 20%, if the optical gain of the photodiode 10 is about 50, the optical gain (output light energy/input light energy) of the first optical modulator 100 may be about 1 to about 3.

The light emitting unit 20 is disposed on the gate layer 44, and a lower electrode 48 is disposed on the light emitting unit 20. The light emitting unit 20 may be a light emitting diode (LED) including a light emitting layer. The lower electrode 48 may be a conductive layer that is transparent with respect to light L2 that is emitted from the light emitting diode 20. The transparent conductive layer may be an ITO layer, a ZnO layer or an AZO layer. The lower electrode 48 may contact the cathode layer of the light emitting unit 20. In this case, the lower electrode 48 may contact the whole or part of a bottom surface of the cathode layer. The cathode layer of the light emitting unit 20 may be an N+ type GaP layer having a thickness of about 2000 nm. The light emitting unit 20 includes a reflective layer 50a, a first cladding layer 50b, an active layer 50c, and a second cladding layer 50d, which are sequentially stacked on the gate layer 44 in the direction of the lower electrode 48.

The reflective layer 50a may be a layer that reflects light emitted backwards, i.e., light emitted from the active layer 50c toward the photodiode 10, such as a distributed Bragg reflector (DBR) layer. A DBR layer is formed by alternately stacking two layers having different refractive indices and/or thicknesses. If the reflective layer 50a is a DBR layer, the two layers stacked alternately may be an AlAs layer and an $Al_{0.3}Ga_{0.7}As$ layer. In this case, the thickness of the reflective layer 50a may be equal to or less than 1200 nm. The first cladding layer 50b may be a p type AlGaInP layer. The active layer 50c may be a material layer having a MQW structure, i.e., a material layer that emits light due to recombination of charges transmitted from the photodiode 10. For example, the active layer 50c may be an undoped InGaP/AlGaInP layer. The second cladding layer 50d may be an N type AlGaInP layer. The thicknesses of the first and second cladding layers 50b and 50d may be different.

The light L2 emitted from the light emitting unit 20 may be visible light. For example, the emitted light L2 may be red light having a wavelength of about 600 nm to about 700 nm.

Figure 3:
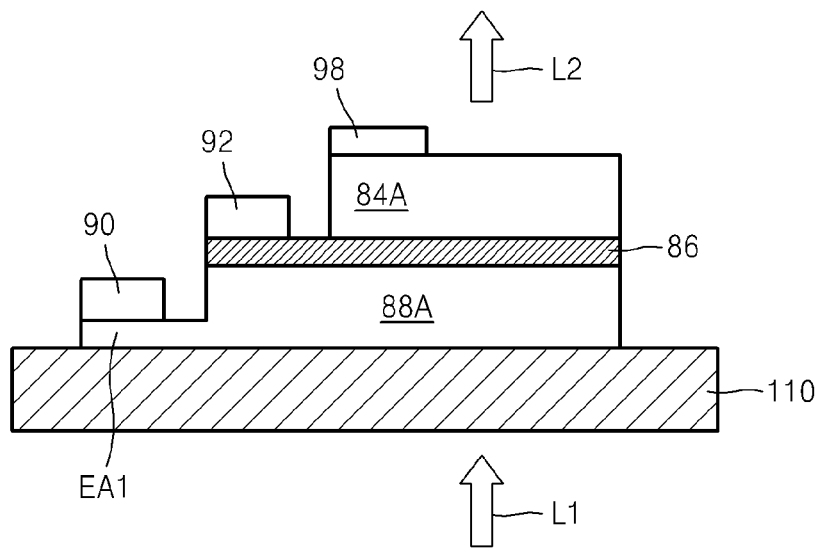
FIG. 3 is a cross-sectional view of an optical modulator that may be represented by the circuit diagram of FIG. 1, according to another exemplary embodiment of the present invention.

FIG. 3 is a cross-sectional view of an optical modulator that may be represented by the circuit diagram of FIG. 1, according to another exemplary embodiment of the present invention. Referring to FIG. 3, a photodiode 88A is disposed on a substrate 110. The substrate 110 is a substrate that is transparent with respect to incident light L1 and may be a compound semiconductor substrate. A material of the substrate 110 may vary according to the incident light L1. For example, when the incident light L1 is near infrared light having a wavelength of about 900 nm or higher, the substrate 110 may be an undoped GaAs substrate that is transparent with respect to the incident light L1. When the wavelength of the incident light L1 is different, the substrate 110 may be formed of other compound semiconductors other than undoped GaAs. The order for stacking layers of the photodiode 88A may be different from the order shown in FIG. 2. For example, the photodiode 88A may include an N type compound semiconductor layer, an optical absorption layer, and a P type compound semiconductor layer, which are sequentially stacked on the substrate 110. On the other hand, the order for stacking layers of the photodiode 10 of FIG. 2 may be opposite to that of the photodiode 88A of FIG. 3. A layer that is conducive to growth of the photodiode 88A, i.e., a layer that is appropriate to lattice match may be interposed between the substrate 110 and the photodiode 88A. For example, a buffer layer (not shown) and a contact layer (not shown), which are sequentially stacked on the substrate 110, may be further interposed between the substrate 110 and the photodiode 88A. The buffer layer and the contact layer may be included in the photodiode 88A. The buffer layer and the contact layer may be compound semiconductor layers that are doped with the same impurity as the substrate 110. The photodiode 88A has an extended area EA1. The extended area EA1 has a smaller thickness than that of another portion of the photodiode 88A, that is, a main portion. The extended area EA1 may include the buffer layer and the contact layer, which are sequentially stacked on the substrate 110. In other words, a top surface of the extended area EA1 may be a top surface of the contact layer. An upper electrode 90 is disposed on the extended area EA1. The upper electrode 90 is separated from the main portion of the photodiode 88A. The upper electrode 90 may be the same as the upper electrode 42 of FIG. 2. A gate layer 86 and a light emitting unit 84A are sequentially stacked on the main portion of the photodiode 88A. A gating electrode 92 and the light emitting unit 84A are disposed on the gate layer 86. The gating electrode 92 is separated from the light emitting unit 84A. A lower electrode 98 is disposed on the light emitting unit 84A. The lower electrode 98 may be the same as the lower electrode 48 of FIG. 2.

A method of manufacturing the first optical modulator 100 according to one or more exemplary embodiments of the present invention will now be described.

First, a method of manufacturing the first optical modulator of FIG. 2 according to an exemplary embodiment of the present invention will be described with reference to FIGS. 4 through 9. FIGS. 4 through 9 are cross-sectional views illustrating a method of manufacturing the first optical modulator shown in FIG. 2, according to an exemplary embodiment of the present invention.

Figure 4:
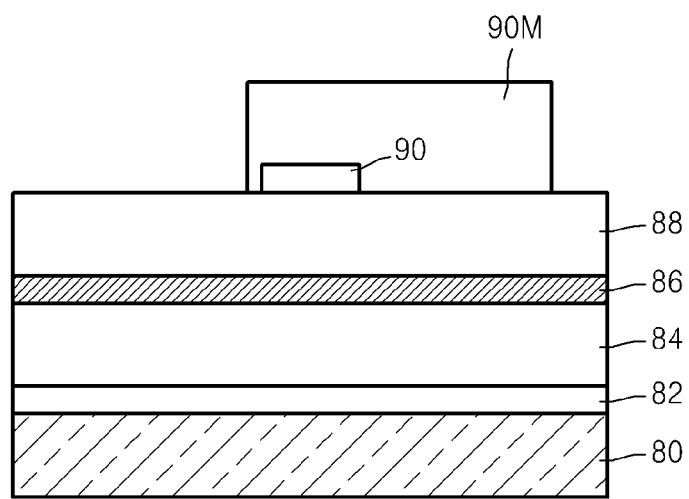
FIGS. 4 through 9 are cross-sectional views illustrating a method of manufacturing the optical modulator shown in FIG. 2, according to an exemplary embodiment of the present invention.

Referring to FIG. 4, a separation layer 82 is formed on a substrate 80. The substrate 80 may be a compound semiconductor substrate such as a GaAs substrate. The separation layer 82 is used to separate the substrate 80 from a unit pixel formed on the substrate 80 and including elements of a light emitting unit and a photo diode. Thus, the separation layer 82 may be referred to as a sacrificial layer. The separation layer 82 may be an n type AlGaInP layer. A buffer layer may be interposed between the substrate 80 and the separation layer 82, and may be an n type GaAs layer. A light emitting layer 84 is formed on the separation layer 82. The structure of the light emitting layer 84 may be the same as that of an LED. The internal layer structure of an LED is well known to one of ordinary skill in the art, and thus, a detailed description of the structure of the light emitting layer 84 will not be provided here. The light emitting layer 84 may be formed using an epitaxial growth method using a metal organic chemical vapor deposition (MOCVD) or molecular beam epitaxy (MBE) process. A reflection base layer may be formed under the gate layer 86. The reflection base layer may be the same as the reflective layer 50a of FIG. 2.

The gate layer 86 is formed on the light emitting layer 84. The gate layer 86 is a layer to which a gating signal is applied from a gate transistor (not shown). The gate layer 86 may constitute an anode of a light emitting unit to be formed from the light emitting layer 84 in a subsequent process, and may be a P+ type GaAs layer. The gate layer 86 may also be formed using the above-described epitaxial growth method. A photodiode layer 88 is formed on the gate layer 86. The photodiode layer 88 may be an example of an optical-electric conversion layer. The photodiode layer 88 may have the same structure as that of the APD or a different structure from that of other photodiode layers. The internal layer structure of the photodiode layer 88 may vary according to incident light, and in particular, an optical absorption layer thereof. An example of the internal layer structure of the photodiode layer 88 has been described with reference to FIG. 2.

A photodiode is generally known to one of ordinary skill in the art, and the internal layer structure of the photodiode is also widely known to one of ordinary skill in the art. Thus, detailed descriptions of the internal layer structure of the photodiode layer 88 will not be provided here.

Layers of the photodiode layer 88 may be formed using the epitaxial growth method. The photodiode layer 88 is patterned in a subsequent process and is formed as a photodiode. The gate layer 86 may constitute an anode of the photodiode.

Subsequently, the upper electrode 90 is formed on the photodiode layer 88. The upper electrode 90 may be formed of a transparent conductive layer such as an ITO layer, a ZnO layer or an AZO layer. A mask 90M is formed on the photodiode layer 88 so as to cover the upper electrode 90 and to define a partial area of the photodiode layer 88 around the upper electrode 90. The mask 90M may be a photosensitive layer pattern. The mask 90M defines an area to be used as the photodiode in the photodiode layer 88. After the mask 90M is formed, the photodiode layer 88 around the mask 90M is etched until a portion of the gate layer 86 is exposed. Then the mask 90M is removed. The photodiode 88A is formed on the gate layer 86 by performing the etching process, as illustrated in FIG. 5.

Figure 5:
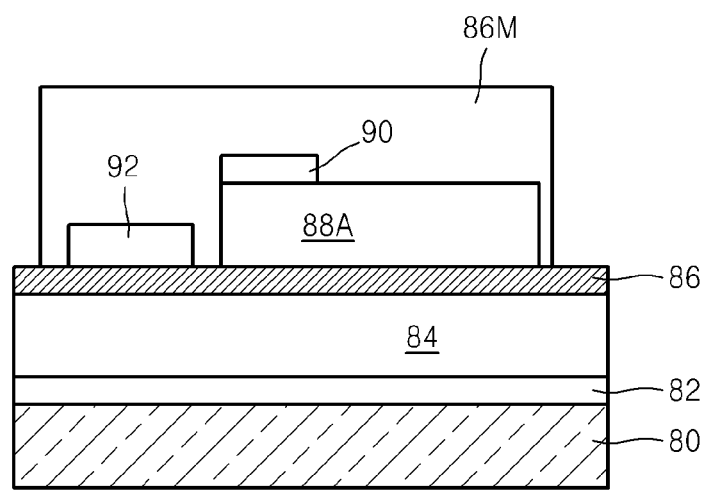

Referring to FIG. 5, the gating electrode 92 is formed on the exposed portion of the gate layer 86. The gating electrode 92 is separated from the photodiode 88A. The gating electrode 92 may be formed by forming a photosensitive layer pattern (not shown) that exposes only a portion of the gate layer 86 in which the gating electrode 92 is to be formed and then performing a process of removing the photosensitive layer pattern, i.e., a lift-off process. The gating electrode 92 may be connected to a collector (not shown) of a gate transistor (not shown). The structure and method of manufacturing a bipolar transistor that is used as the gate transistor are well known to one of ordinary skill in the art. The gate transistor may be formed by performing an additional process.

Subsequently, a mask 86M is formed on the gate layer 86 so as to cover the photodiode 88A, the upper electrode 90, and the gating electrode 92. The mask 86M may be a photosensitive pattern. The mask 86M defines a unit pixel area. The gate layer 86 around the mask 86M and the light emitting layer 84 are sequentially etched. The etching process may be performed until a portion of the separation layer 82 or the substrate 80 is exposed. After the etching process is performed, the light emitting layer 84 is patterned, and thus, the light emitting unit 84A is formed on the separation layer 82, as illustrated in FIG. 6.

Figure 6:
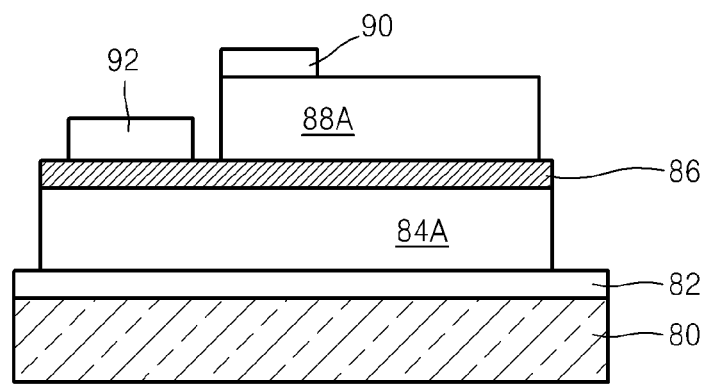

FIG. 6 illustrates the light emitting unit 84A, the gate layer 86, the photodiode 88A, and related electrodes 90 and 92, which constitute a unit pixel.

A plurality of such unit pixels may be simultaneously formed on the substrate 80. For convenience of explanation, only one unit pixel is illustrated on the substrate 80. Thus, the unit pixels of FIG. 6 are formed on the substrate 80, thereby forming an array.

Figure 7:
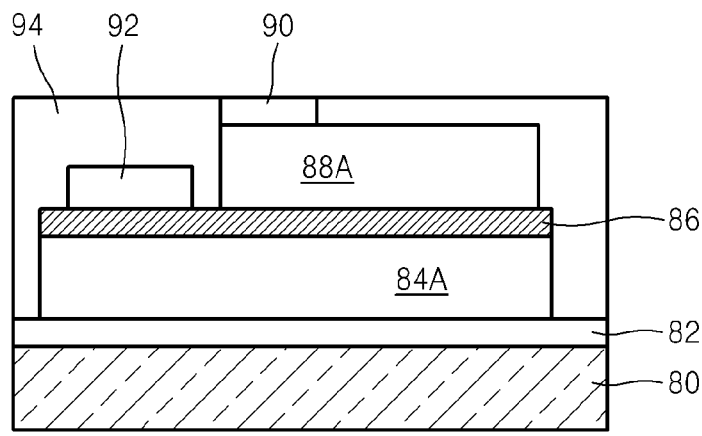

Referring to FIG. 7, an interlayer dielectric layer 94 is formed on the separation layer 82 so as to cover the light emitting unit 84A, the gate layer 86, the photodiode 88A, the upper electrode 90, and the gating electrode 92. A top surface of the interlayer dielectric layer 94 is planarized until a portion of the upper electrode 90 is exposed.

Figure 8:
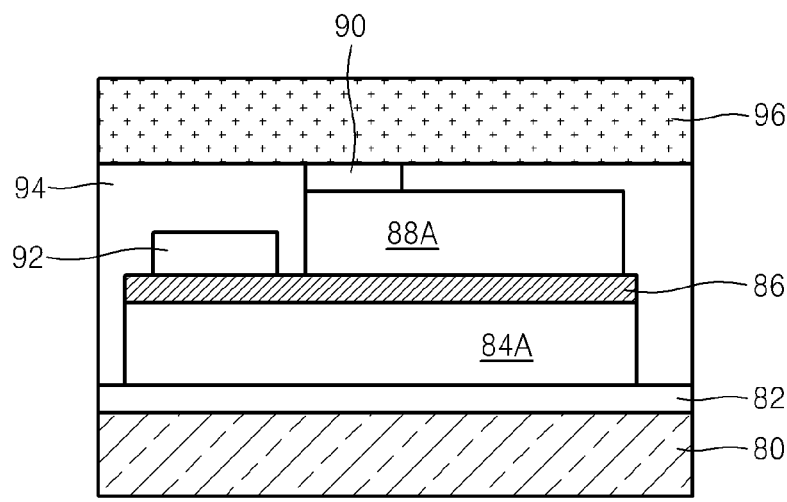

Referring to FIG. 8, a transparent substrate 96 is bonded onto the interlayer dielectric layer 94 so as to cover the exposed portion of the upper electrode 90. The transparent substrate 96 may be a glass substrate, a GaAs substrate or a sapphire substrate. After the transparent substrate 96 is bonded onto the interlayer dielectric layer 94, the substrate 90 is removed from a resultant structure of the bonded transparent substrate 96. The substrate 80 may be removed by performing an epitaxial lift-off process. In this regard, the substrate 80 may be removed by decomposing the separation layer 82 or separating the separation layer 82 from the unit pixel formed on the substrate 80.

Figure 9:
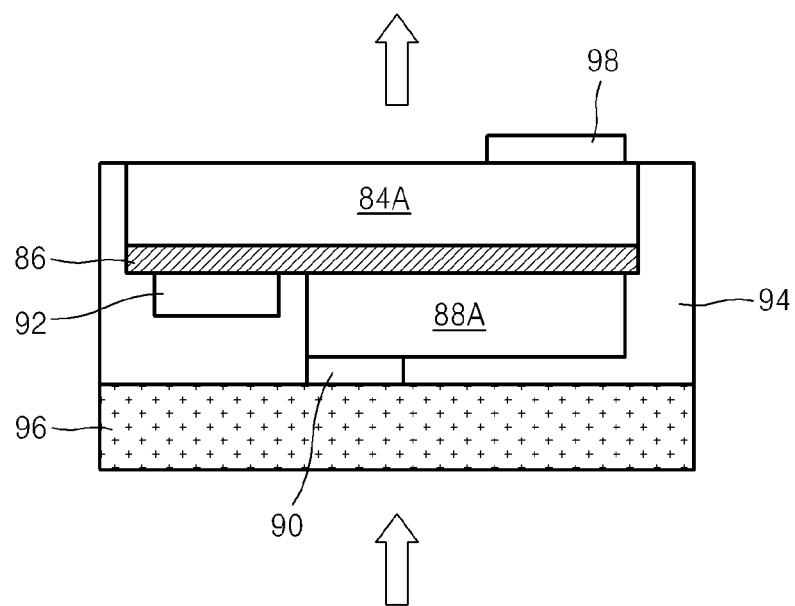

Referring to FIG. 9, the lower electrode 98 is formed on the light emitting unit 84A from which the substrate 80 is removed and of which surface is exposed. The exposed surface of the light emitting unit 84A is a surface from which light is emitted and that faces an optical image sensor such as a CCD or a CMOS. The lower electrode 98 may be formed of the same material as the material of the upper electrode 90. After that, a gate transistor such as 30 of FIG. 1 and the gating electrode 92 may be connected to each other. Such connection may be performed simultaneously when the gating electrode 92 is formed, depending on when a process of forming a gate transistor such as 30 of FIG. 1 will be performed. For example, a gate transistor such as the gate transistor 30 of FIG. 1 may be formed when the light emitting layer 84 is formed, or before the photodiode layer 88 is formed after the light emitting layer 84 is formed, or when the photodiode layer 88 is formed, or after the photodiode layer 88 is formed.

A method of manufacturing the first optical modulator 100 according to another exemplary embodiment of the present invention will now be described with reference to FIGS. 10 through 13. Like reference elements denote like reference numerals and like terminology. In addition, if growth methods of elements are not particularly mentioned, they may be the same as those of the method of manufacturing the optical modulator shown in FIG. 2, as described with reference to FIGS. 4 through 9.

Figure 10:
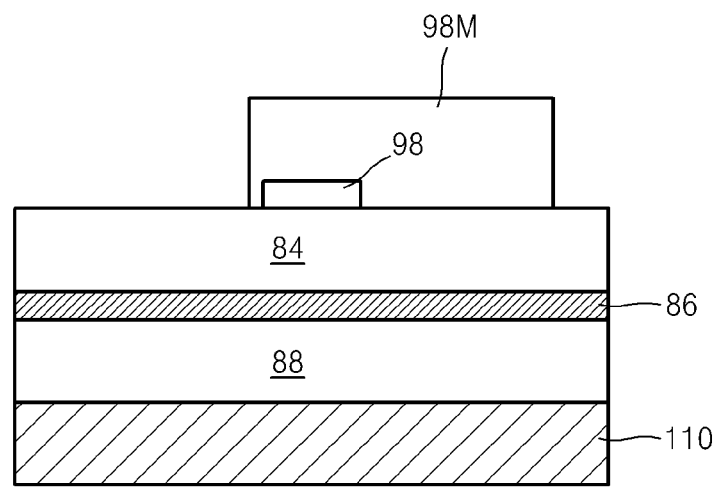
FIGS. 10 through 13 are cross-sectional views illustrating a method of manufacturing the optical modulator shown in FIG. 3, according to another exemplary embodiment of the present invention.

Referring to FIG. 10, a photodiode layer 88 is formed on a substrate 110. In this case, the order for stacking layers of the photodiode layer 88 may be different from the order shown in FIG. 4. For example, an N type compound semiconductor layer, an optical absorption layer, and a P type compound semiconductor layer may be sequentially stacked on the substrate 110, thereby forming the photodiode layer 88. The order for stacking layers of the photodiode 88A of FIG. 4 may be opposite to that of the photodiode layer 88 of FIG. 10. The substrate 110 may be a transparent substrate with respect to incident light, for example, with respect to incident light having a wavelength of about 800 nm to about 900 nm. However, the substrate 110 may be transparent with respect to incident light having a different wavelength. The substrate 110 may be a compound semiconductor substrate. For example, the substrate 110 may be an n type GaAs substrate. A layer that is conductive to growth of the photodiode layer 88, i.e., a layer that is appropriate to lattice match may be interposed between the substrate 110 and the photodiode layer 88. For example, a buffer layer (not shown) and a contact layer (not shown), which are sequentially stacked on the substrate 110, may be further interposed between the substrate 110 and the photodiode layer 88. The buffer layer and the contact layer may be compound semiconductor layers that are doped with the same impurity as that of the substrate 110. In consideration of a subsequent etching process, an etch stopper may be further disposed on the contact layer. The etch stopper may be an element of the photodiode layer 88. Also, part of the contact layer may be included in the photodiode layer 88.

Subsequently, a gate layer 86 and a light emitting layer 84 are sequentially formed on the photodiode layer 88. A lower electrode 98 is formed on a portion of the light emitting layer 84. The portion of the light emitting layer 84 on which the lower electrode 98 is formed, faces an optical image sensor.

Next, a mask 98M is formed on the light emitting layer 84 so as to cover the lower electrode 98 and a portion of the light emitting layer 84 that will be used as a light emitting unit to be included in a unit pixel. The mask 98M may be a photosensitive layer pattern. The light emitting layer 84 around the mask 98M is etched. The etching process is performed until the gate layer 86 is exposed. After the etching process is performed, the mask 98M is removed. Due to the etching process, the light emitting layer 84 is patterned, and a light emitting unit 84A is formed on the gate layer 86. The light emitting unit 84A will be described below with reference to FIG. 11.

Figure 11:
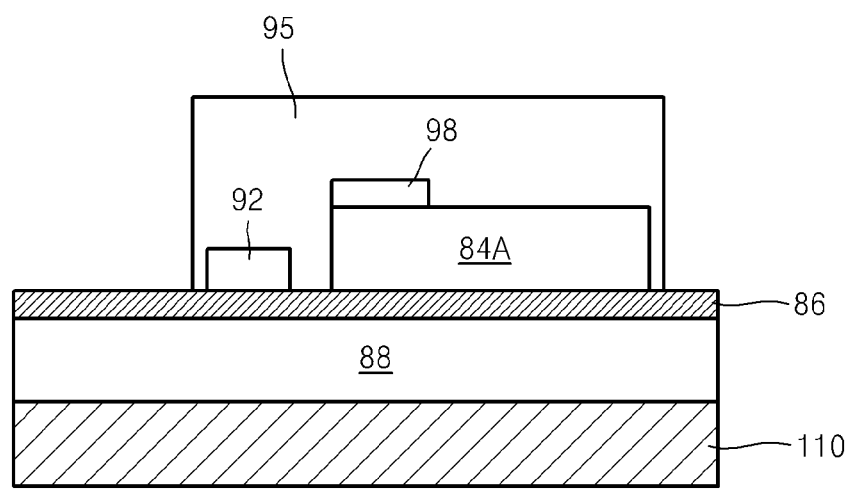
Figure 12:
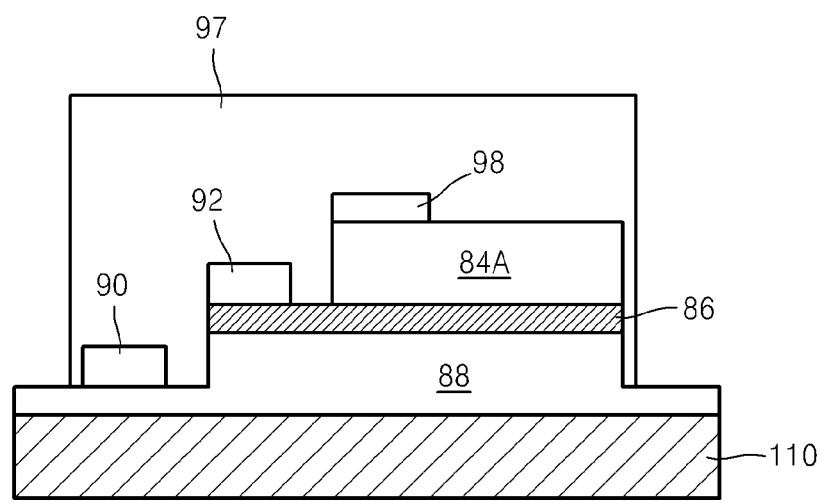

Referring to FIG. 11, a gating electrode 92 is formed on the exposed portion of the gate layer 86. The gating electrode 92 is separated from the light emitting unit 84A. The gating electrode 92 may be formed by performing a lift-off process using the photosensitive layer pattern, as described above. A mask 95 is formed on the gate layer 86 so as to cover the gating electrode 92, the lower electrode 98, and the light emitting unit 84A. The mask 95 may be a photosensitive layer pattern. The gate layer 86 around the mask 95 is etched. The etching process may be performed until the portion of the photodiode layer 88 outside the mask 95 is formed to have a thickness less than that of the other portion of the photodiode layer 88, as illustrated in FIG. 12. After the etching process is performed, the mask 95 is removed. The etching process of the gate layer 86 may also be performed until the above-described contact layer is exposed after layers constituting the photodiode layer 88 are sequentially etched.

Referring to FIG. 12, the thickness of the portion of the photodiode layer 88 outside the mask 95 is less than that of the portion of the photodiode layer 88 that is covered by the mask 95, as a result of performing the etching process using the mask 95. An upper electrode 90 is formed on the portion of the photodiode layer 88 having the smaller thickness due to the etching process. Subsequently, a mask 97 is formed so as to define a unit pixel area. The mask 97 may be a photosensitive layer pattern. A section of the portion of the photodiode layer 88 having the smaller thickness, which is disposed outside the mask 97, is etched. The etching process is performed until the substrate 110 is exposed. By performing the etching process, a photodiode 88A is formed as will be described with reference to FIG. 13, and adjacent unit pixels may be electrically separated from one another. After the etching process is performed, the mask 97 is removed.

Figure 13:
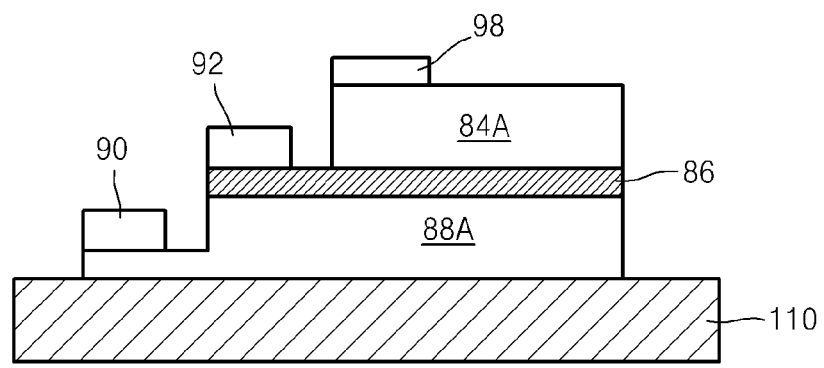

FIG. 13 shows a resultant structure after the mask 97 is removed. FIG. 13 shows the case that one unit pixel is formed on the substrate 110. However, an exemplary embodiment of the present invention is not limited thereto, and a plurality of unit pixels may be formed on the substrate 110 to constitute an array. In this case, each unit pixel may be formed by performing the processes described with reference to FIGS. 10 through 12.

Figure 14:
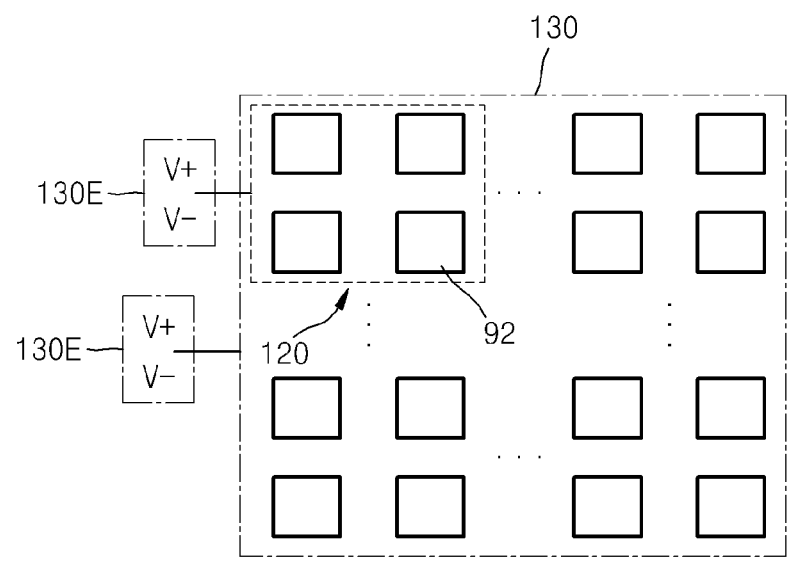
FIG. 14 is a plan view of an array including a plurality of unit pixels of the optical modulator shown in FIG. 1, according to an exemplary embodiment of the present invention.

FIG. 14 shows an example of the case that the first optical modulator 100 includes a plurality of unit pixels so as to constitute an array 130. In FIG. 14, the gating electrodes 92 represent the unit pixels.

Referring to FIG. 14, the array 130 includes a plurality of unit blocks 120. Each unit block 120 includes four gating electrodes 92. However, the number of gating electrodes 92 included in the unit block 120 may be greater or less than 4.

On the other hand, the array 130 may be gated. In this case, a transient response time for an ON/OFF operation when the array 130 is gated may be extended. The transient response time is related to time constants of the light emitting unit 84A of FIG. 13 and a photodiode layer such as the photodiode 88A of FIG. 13. The time constants of a light emitting unit such as the light emitting unit 84A of FIG. 13 and a photodiode layer such as the photodiode 88A of FIG. 13 are obtained by multiplying capacitance of a PN junction region and resistance. The capacitance is in proportion to the area of the PN junction region and a bias voltage. As such, the transient response time may be reduced by reducing the area of the PN junction region including a light emitting unit such as the light emitting unit 84A of FIG. 13 and a photodiode such as the photodiode 88A of FIG. 3 and the bias voltage.

As the number of gating electrodes 92 included in each unit block 120 of the array 130 of FIG. 14 increases, i.e., as the number of unit pixels increases, the area of the PN junction region is increased, and the transient response time may be extended. Thus, the number of gating electrodes 92 included in the unit block 120 may be determined in consideration of a proper gating time. For example, the gating time may be about 1 ns to about 5 ns. Thus, the number of unit pixels that may be included in the unit block 120 so as to attain such a gating time may be known in consideration of the capacitance of the unit pixels. The capacitance of the unit pixels is related to a PN junction area of a photodiode and a light emitting unit, a bias voltage applied to the photodiode, a positive voltage applied to the light emitting unit, and the structure and doping concentration of each element.

In FIG. 14, a power supply voltage may be commonly applied to both the array 130 and all unit pixels included in the array 130. Alternatively, an independent power supply source voltage may be applied to the unit block 120.

In FIG. 14, the connection of a power supply source 130E and the array 130 illustrates the case that the power supply source 130E is commonly applied to all of the unit pixels included in the array 130. The connection of the power supply source 130E and the unit blocks 120 illustrates the case that an independent power supply source voltage is applied to each of the unit blocks 120. In the power supply source 130E, the voltage V+ is applied to the photodiode 88A, and the voltage V− is applied to the light emitting diode 84.

When the entire array 130 of FIG. 14 is gated, a power transistor may be used as a gate transistor in consideration of capacitance. However, considering that the transient response time is delayed according to a time constant, it is more efficient to perform gating in each block than to gate the entire array 130. Thus, a gate transistor may be provided in each unit block 120.

Figure 15:
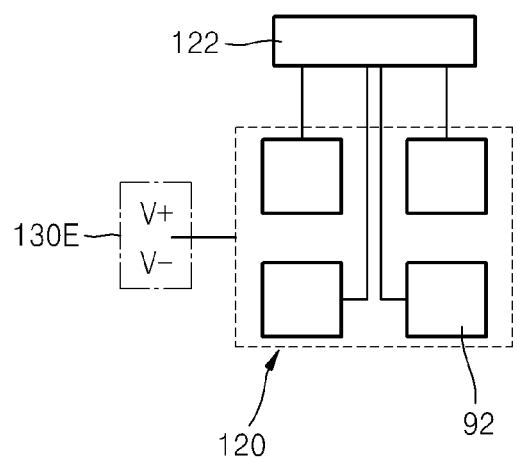
FIG. 15 is a plan view for explaining the relationship between one block selected from the array of FIG. 14 and a gate transistor corresponding to the block, according to an exemplary embodiment of the present invention.

FIG. 15 is a plan view for explaining the relationship between one block selected from the array of FIG. 14 and a gate transistor corresponding to the block. Referring to FIG. 15, a gate transistor 122 is disposed outside the unit block 120. The gate transistor 122 may be a bipolar transistor. The gate transistor 122 may be a power transistor in consideration of capacitance of the unit block 120. The gate transistor 122 may also be formed inside the unit block 120.

Figure 16:
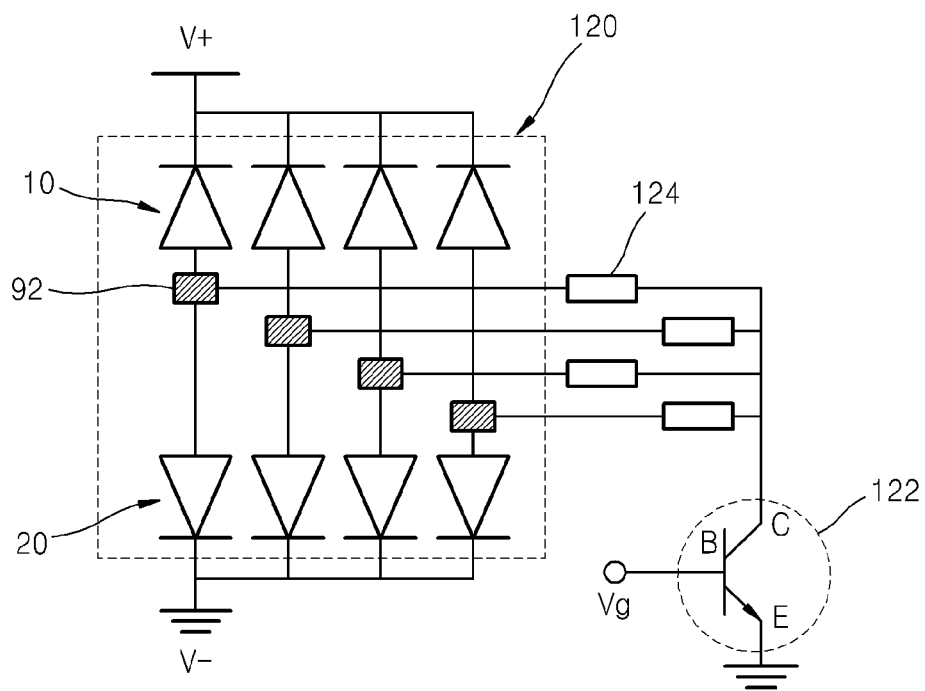
FIG. 16 is a circuit diagram for explaining the relationship between a block including four unit pixels and a gate transistor.

FIG. 16 illustrates an equivalent circuit of FIG. 15. Referring to FIG. 16, a voltage V+ is applied to a photodiode 10 of a unit pixel included in a unit block 120, and a light emitting unit 20 is commonly grounded, or a voltage V− less than the voltage V+ is applied to the light emitting unit 20. A collector C of the gate transistor 122 is commonly connected to gating electrodes 92 of unit pixels included in the unit block 120. An emitter E of the gate transistor 122 is grounded, and a gating voltage Vg is applied to a base B of the gate transistor 122. The gate transistor 122 and the gating electrodes 92 of each unit pixel are connected to each other via a load 124. The load 124 is used to prevent interference between unit pixels during a gating operation.

A method of operating the first optical modulator will now be described.

Figure 17:
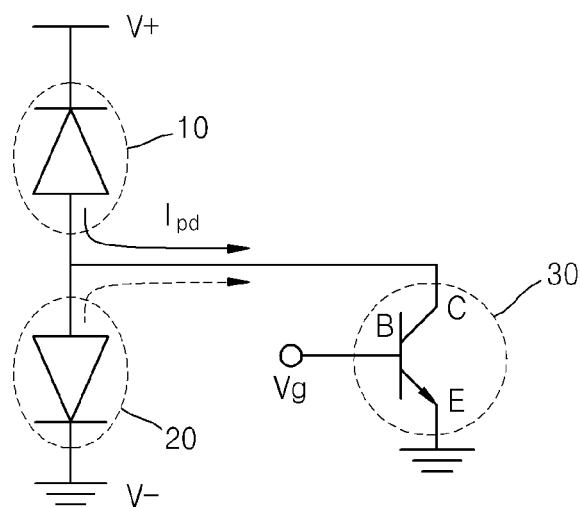
FIG. 17 is a circuit diagram for describing a gating method of the optical modulator of FIG. 1, according to an exemplary embodiment of the present invention.

FIG. 17 is a circuit diagram for describing a gating operation to be performed on a unit pixel. Referring to FIG. 17, a gating voltage Vg is applied to a base B of a gate transistor 30. The gating voltage Vg may be about 1.2 V to about 1.4 V. When the gating voltage Vg is applied to the base B of the gate transistor 30, the gate transistor 30 is in an ON state. When the gate transistor 30 is in an ON state, current $I_{pd}$ generated in the photodiode 10 flows through the gate transistor 30 having a low impedance. In other words, the current $I_{pd}$ generated in the photodiode 10 flows through the gate transistor 30 and bypasses the light emitting unit 20 when the gate transistor 30 is in an ON state. Thus, the light emitting unit 20 is in an OFF state. Also, when the gate transistor 30 is in an ON state, charges that remain in the light emitting unit 20 are discharged via the gate transistor 30. As such, an optical tail that is a problem of a general optical modulator and occurs even after the light emitting unit 20 is turned off, disappears. Thus, an off time of the light emitting unit 20 may be reduced by performing the gating operation using the gate transistor 122.

In the unit block 120 of FIG. 16, a plurality of unit pixels hold a gate transistor 122 in common. Thus, a gating operation of each unit pixel using the gate transistor 122 in the unit block 120 is the same as described with reference to FIG. 17. Thus, the gating operation of the unit block 120 may be the same as the gating operation performed on the unit pixel shown in FIG. 17.

Figure 18A:
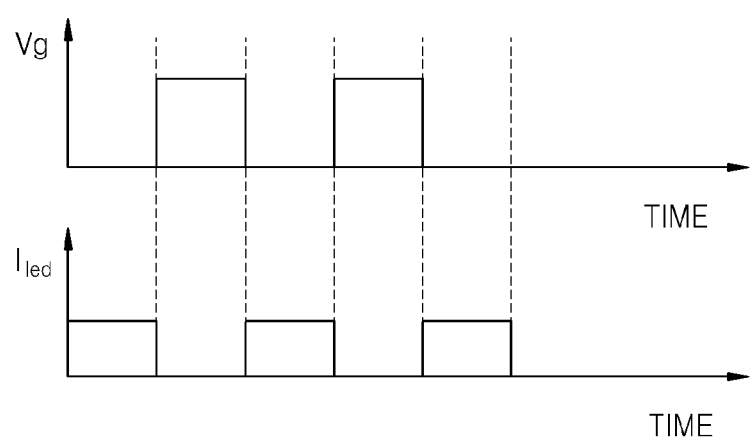
FIGS. 18A and 18B are time series charts illustrating variation of currents supplied to a light emitting unit according to gating voltage signals applied to a gate transistor when a gating operation is performed in the optical modulator of FIG. 1, according to an exemplary embodiment of the present invention.
Figure 18B:
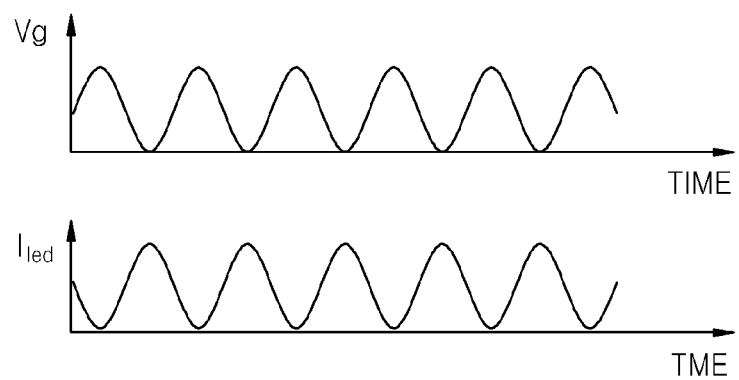

FIGS. 18A and 18B are time charts showing a gating voltage Vg applied to the gate transistor 30 during the gating operation of FIG. 17 and a current $I_{led}$ supplied to the light emitting unit 20 from the photodiode 10 according to time.

Referring to FIG. 18A, when the gating voltage Vg is applied to the gate transistor 30, the current $I_{led}$ is not supplied to the light emitting unit 20, and when the gating voltage Vg is not applied to the gate transistor 30, i.e., when the gate transistor 30 is turned off, the current $I_{led}$ is supplied to the light emitting unit 20.

FIG. 18A shows logic gating whereby the gating voltage Vg is applied in an ON/OFF pulse form and thus, the current $I_{led}$ supplied to the light emitting unit 20 is also in a pulse form.

Referring to FIG. 18B, when the gating voltage Vg applied to the base B of the gate transistor 30 is applied in a sinusoidal waveform, the current $I_{led}$ applied to the light emitting unit 20 is also supplied in a sinusoidal waveform. In other words, by adjusting the gating voltage Vg, the current $I_{led}$ supplied to the light emitting unit 20 and current that flows through the gate transistor 30 may be controlled so that sinusoidal gating shown in FIG. 18B may be performed. The gating voltage Vg applied to the base B of the gate transistor 30 may have a triangular waveform or other waveforms as well as a sinusoidal waveform. By using sinusoidal gating, when an input light is uniform, an output light may be modulated at a higher frequency than in pulse gating.

An optical image input to the first optical modulator may be modulated into a desired function such as a sinusoidal wave, a ramp wave, and a square wave or may be shuttered by using the first optical modulator that performs the gating operation and peripheral electrical devices.

An optical modulator (hereinafter, referred to as a second optical modulator) according to another exemplary embodiment of the present invention will now be described.

Figure 19:
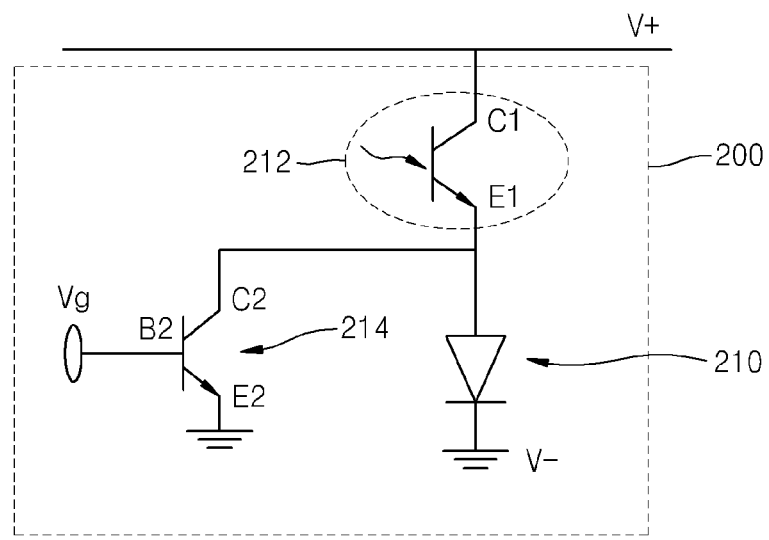
FIG. 19 is a circuit diagram of an optical modulator according to another exemplary embodiment of the present invention.

FIG. 19 is a circuit diagram of a second optical modulator 200 according to another exemplary embodiment of the present invention. Referring to FIG. 19, the second optical modulator 200 according to the present exemplary embodiment may include a heterojunction phototransistor (HPT) 212, a light emitting unit 210, and a heterojunction bipolar transistor (HBT) 214. The second optical modulator 200 may be in the form of an array including a plurality of unit pixels in consideration of time constant, etc. In this case, the array may include a plurality of blocks, and each of the blocks may include at least two unit pixels. The structure of each unit pixel included in the array may be as shown in FIG. 19. The HPT 212 is an example of an optical-electric converter that converts an optical signal of incident light into an electrical signal. However, other optical-electric converters other than the HPT 212 may be used. The light emitting unit 210 is an example of an electro-optical converter that converts the electrical signal input from the HPT 212 into an optical signal. The light emitting unit 210 may be an LED. The light emitting unit 210 may be the same as the light emitting unit 20 of FIG. 1. The HBT 214 is an example of a gate transistor for gating charges that flow through the light emitting unit 20 from the HPT 212. However, other gating units other than the HBT 214 may also be used. The HPT 212 and the light emitting unit 210 are connected to each other in series. A second collector C2 of the HBT 214 is connected to a first emitter E1 of the HPT 212, and a second emitter E2 of the HBT 214 is grounded. A gating voltage Vg is applied to a second base B2 of the HBT 214 during a gating operation. A power supply voltage is applied to a first collector C1 of the HPT 212. The light emitting unit 210 is grounded. The light emitting unit 210 and the second emitter E2 of the HBT 214 have the same electric potential.

Figure 20A:
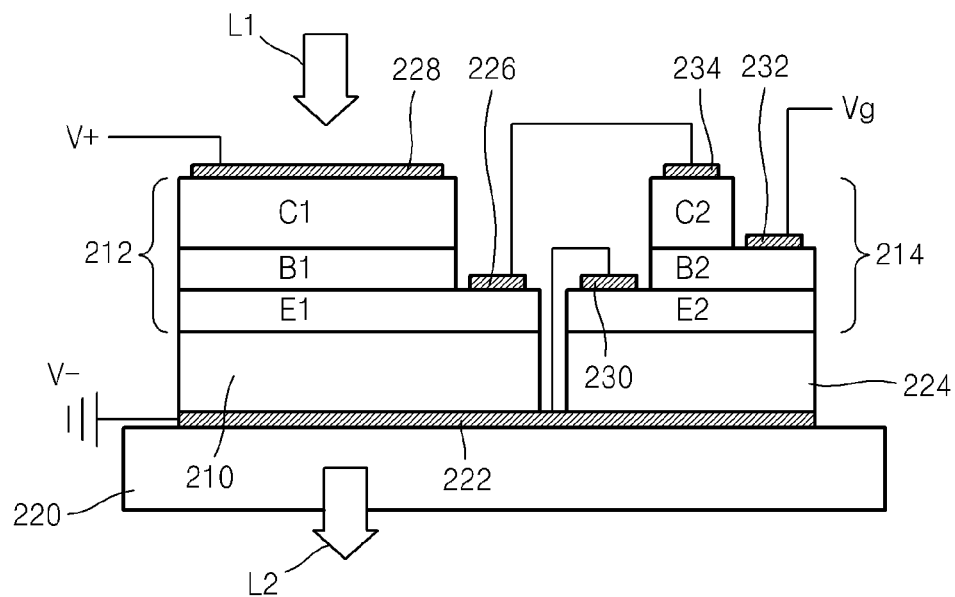
FIG. 20A is a cross-sectional view of an optical modulator that may be represented by the circuit diagram of FIG. 19, according to an exemplary embodiment of the present invention.

FIG. 20A is a cross-sectional view of a second optical modulator that may be represented by the circuit diagram of FIG. 19, according to an exemplary embodiment of the present invention. Referring to FIG. 20A, a first electrode 222 that is transparent is disposed on a transparent substrate 220. The transparent substrate 220 may be a glass or sapphire substrate that is transparent with respect to emitted light L2. The first electrode 222 is a transparent electrode such as an ITO electrode, a ZnO electrode or an AZO electrode. A light emitting unit 210 and a dummy pattern 224 are disposed on the first electrode 222. The light emitting unit 210 and the dummy pattern 224 are separated from each other. The structure of the dummy pattern 224 may be the same as the light emitting unit 210. The first electrode 222 may be divided into two electrodes. In this case, one of the two electrodes contacts the light emitting unit 210, and the other one contacts the dummy pattern 224. A HPT 212 is disposed on the light emitting unit 210. A tunnel junction layer (not shown) may be further disposed between the light emitting unit 210 and the HPT 212. The tunnel junction layer may be formed by sequentially stacking a P++ type GaAs layer and an N++ type GaAs layer. The HPT 212 includes a first emitter E1, a first base B1, and a first collector C1, which are sequentially stacked on the light emitting unit 210. The first emitter E1 may have a single layer structure or a multi-layer structure including a sub-emitter layer and a main emitter layer, which are sequentially stacked on the first emitter E1. The sub-emitter layer may be an N+ type GaAs layer. The main emitter layer may be an N type InGaP layer. The first base B1 is formed on a given area of the first emitter E1. A second electrode 226 is formed on the first emitter E1. The second electrode 226 may be formed of the same material as or a different material from the material of the first electrode 222. The second electrode 226 and the first base B1 are separated from each other. The first collector C1 may have a single layer structure or a multi-layer structure including a main collector layer (not shown) and a sub-collector layer, which are sequentially stacked on the first collector C1. A material of the main collector layer may be different from a material of the sub-collector layer according to incident light. The main collector layer may be an N-type GaAs layer, and the subcollector layer may be an N+ type GaAs layer or an N+ type InGaP layer. Subsequently, a third electrode 228 is disposed on a top surface of the first collector C1 on which incident light L1 is incident. The third electrode 228 may be formed of the same material as the material of the first electrode 222. A voltage V+ is applied to the third electrode 228. An HBT 214 is disposed on the dummy pattern 224. The HBT 214 includes a second emitter E2, a second base B2, and a second collector C2, which are sequentially stacked on the dummy pattern 224. The second emitter E2 and the second collector C2 may have a single layer structure or a multi-layer structure like the first emitter E1 and the first collector C1 of the HPT 212. A fourth electrode 230 and the second base B2 are disposed on the second emitter E2. The fourth electrode 230 and the second base B2 are separated from each other. The fourth electrode 230 may be the same as the second electrode 226. The fourth electrode 230 is connected to the first electrode 222. Thus, the fourth electrode 230 has the same electric potential as that of the first electrode 222. A fifth electrode 232 and the second collector C2 are disposed on the second base B2 of the HBT 214. The fifth electrode 232 and the second collector C2 are separated from each other. A gating voltage Vg is applied to the fifth electrode 232 via a gate line (not shown). A sixth electrode 234 is disposed on a top surface of the second collector C2. The sixth electrode 234 may be the same as or different from the third electrode 228. The sixth electrode 234 is connected to the second electrode 226. In this way, the first emitter E1 of the HPT 212 and the second collector C2 of the HBT 214 are connected to each other. Reference numeral L2 is light that is generated by the light emitting unit 210 and is emitted to an optical image sensor (not shown) via the transparent substrate 220.

Figure 20B:
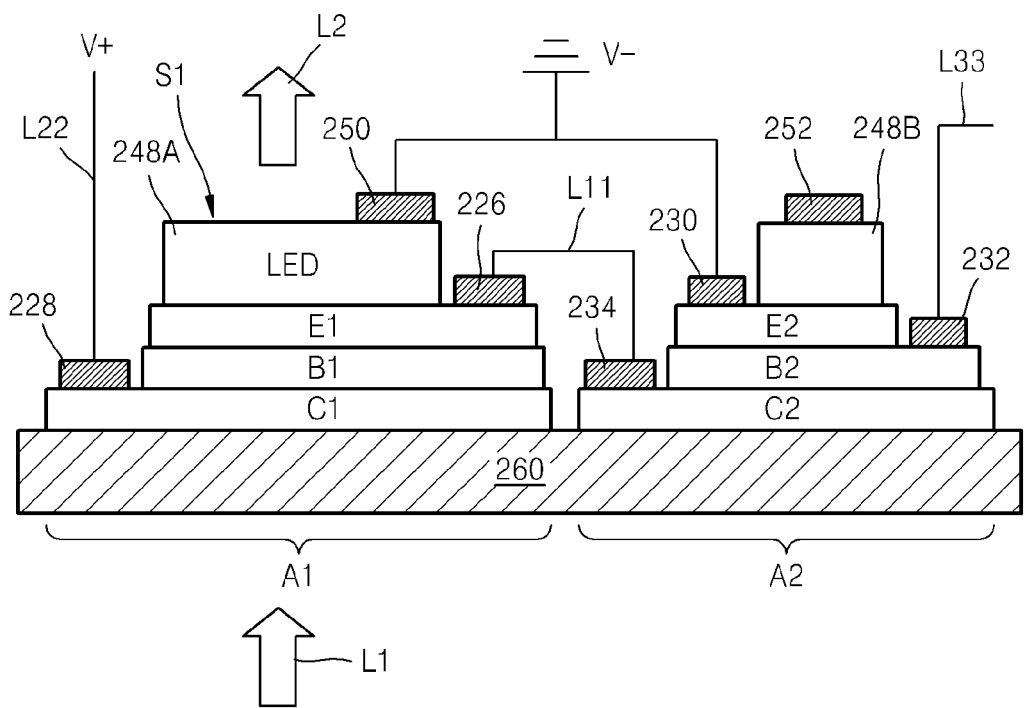
FIG. 20B is a cross-sectional view of an optical modulator that may be represented by the circuit diagram of FIG. 19, according to another exemplary embodiment of the present invention.

FIG. 20B is a cross-sectional view of a second optical modulator according to another exemplary embodiment of the present invention. Like reference numerals represent like elements as those of FIG. 20A or elements having the same functions as those of FIG. 20A.

Referring to FIG. 20B, a first collector C1, a first base B1, and a first emitter E1 of an HPT 212 are sequentially stacked on a first area A1 of a transparent substrate 260. The transparent substrate 260 is a substrate that is transparent with respect to incident light L1, and a material of the transparent substrate 260 may be different according to the incident light L1. For example, when the incident light L1 is light having a wavelength equal to or higher than 900 nm, the transparent substrate 260 may be a GaAs substrate. A surface of the transparent substrate 260 on which light is incident may be coated with an antireflection layer so that the incident light L1 may be prevented from being reflected. A third electrode 228 and the first base B1 are disposed on the first collector C1. A voltage V+ is applied to the third electrode 228 is via a wiring L22. A second electrode 226 and a first light emitting unit 248A are disposed on the first emitter E1. The first light emitting unit 248A and the second electrode 226 are separated from each other. A first lower electrode 250 is disposed on a surface S1 of the first light emitting unit 248A from which light L2 is emitted. The first lower electrode 250 may be an electrode that is transparent with respect to the light L2 that is emitted from the first light emitting unit 248A. The first lower electrode 250 may be an ITO, ZnO or AZO electrode. The first lower electrode 250 may be disposed on a portion of the surface S1 of the first light emitting unit 248A or may be disposed to cover the surface S1 of the first light emitting unit 248A.

A second collector C2, a second base B2, and a second emitter E2 of the HBT 214 are sequentially stacked on a second area A2 of the transparent substrate 260. The structure of the second collector C2, the second base B2, and the second emitter E2 may be the same as the structure of the first collector C1, the first base B1, and the first emitter E1. A sixth electrode 234 and the second base B2 are disposed on the second collector C2. The sixth electrode 234 is connected to the second electrode 226 via a wiring L11. A fifth electrode 232 and the second emitter E2 are disposed on the second base B2. The fifth electrode 232 and the second emitter E2 are separated from each other. A gating voltage signal may be applied to the fifth electrode 232 via a wiring L33. The wiring L33 may be a gate line such as a gate line 410 of FIG. 36. A fourth electrode 230 and the second light emitting unit 248 that is a dummy pattern are disposed on the second emitter E2. The fourth electrode 230 is connected to the first lower electrode 250 and is grounded. Instead of ground, a voltage V− less than the voltage V+ applied to the third electrode 228 may be applied to the fourth electrode 230 and the first lower electrode 250. A second lower electrode 252 is disposed on the second light emitting unit 248B. The second lower electrode 252 may be a dummy electrode.

The second optical modulator of FIGS. 20A and 20B that may be represented by the circuit diagram of FIG. 19 has a collector-up structure in which the first collector C1 of the HPT 212 is disposed above the first emitter E1.

In the second optical modulator having the collector-up structure, most input light is absorbed by the first collector C1 of the HPT 212. Thus, when the HPT 212 is turned off, an optical current is not transmitted to the light emitting unit 210. Also, the second optical modulator has an up-converter function of converting near infrared light having a wavelength of about 800 nm to about 900 nm into light having a wavelength of about 600 nm to 700 nm that is easily received by a general CCD camera, by performing a gating operation.

The operating principle of the HPT 212 of the second optical modulator will now be described below.

When the incident light L1 is incident on the HPT 212, photons are absorbed by the main collector layer of the first collector C1, and electrons generated in the absorption procedure are moved to the subcollector layer. Holes formed due to absorption of the photons are moved to the first base B1 of the HPT 212 so that a Fermi level may be decreased. As such, the height of an electric potential barrier between the first base B1 and the first emitter E1 is decreased so that electrons are dispersed into the second base B2 from the first emitter E1 and current is amplified. The amplified current flows through the light emitting unit 210.

An optical gain of the HPT 212 is increased according to the size of energy of the incident light L1. When the energy of the incident light L1 is about 10 nW to about 100 nW, the optical gain of the HPT 212 may be about 7 to about 20. The optical gain of the HPT 212 may be varied according to the doping concentration of the first base B1 of the HPT 212. Thus, the doping concentration of the first base B1 of the HPT 212 may be a concentration at which excellent electrical characteristics and optical gain of the HPT 212 are attained. For example, when the first emitter E1 and the first collector C1 are as described above and the first base B1 is a P type GaAs layer, the doping concentration of the first base B1 may be equal to or greater than $4 \times 10^{18}$ cm$^{-3}$.

When a bias voltage applied to the second optical modulator is about 4 V to about 5 V, the optical-electric conversion efficiency of the HPT 212 is about 20% to about 30% and the luminous efficiency of the light emitting unit 210 is about 10% to about 20%, the optical gain (output light energy/input light energy) of the second optical modulator may be about 1 to about 2.

A method of manufacturing the second optical modulator of FIG. 20A according to another exemplary embodiment of the present invention will now be described with reference to FIGS. 21 through 28. In this procedure, like reference numerals represent like elements as those of FIG. 20A. FIGS. 21 through 28 are cross-sectional views illustrating a method of manufacturing the second optical modulator shown in FIG. 20A, according to an exemplary embodiment of the present invention.

Figure 21:
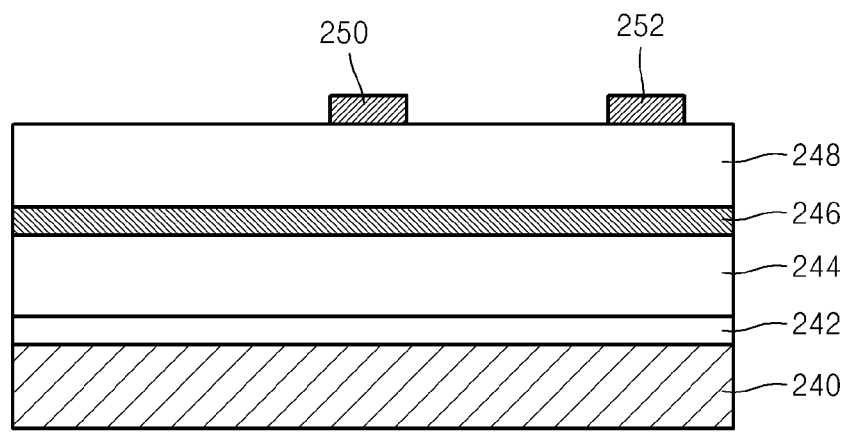
FIGS. 21 through 28 are cross-sectional views illustrating a method of manufacturing the optical modulator shown in FIG. 20A, according to another exemplary embodiment of the present invention.

Referring to FIG. 21, a separation layer 242 is formed on a substrate 240. The substrate 240 may be a compound semiconductor substrate. For example, the substrate 240 may be a GaAs substrate. The separation layer 242 may be the same as the separation layer 82 of FIG. 4. The separation layer 242 may be a sacrificial layer such as an AlGaAs layer, an AlAs layer or an InGaP layer. A layer 244 (hereinafter, a transistor layer) including material layers of a transistor is formed on the separation layer 242. The transistor layer 244 may be formed by sequentially stacking a first N type compound semiconductor layer, a P type compound semiconductor layer, and a second N type compound semiconductor layer on the separation layer 242. The compound semiconductor layers may be doped compound semiconductor layers that are based on GaAs, InGaP or AlGaAs or may be varied according to incident light. The first N type compound semiconductor layer may have a multi-layer structure having different doping concentrations. The second N type compound semiconductor layer may also have a multi-layer structure having different doping concentrations. In a subsequent patterning process, the transistor layer 244 is patterned by using an optical transistor such as a HPT and a gate transistor, for example, a HBT. Thus, the structure of the transistor layer 244 may be the same as the structure of the HPT 212 of FIG. 20. The transistor layer 244 may be formed by using an epitaxial growth method such as metal organic chemical vapor deposition (MOCVD) or molecular beam epitaxy (MBE). A tunnel junction layer 246 may be formed on the transistor layer 244. The tunnel junction layer 246 may be formed as a doped compound semiconductor layer. For example, the tunnel junction layer 246 may be formed by sequentially stacking an N++ GaAs layer and a P++ GaAs layer on the tunnel junction layer 246. However, the tunnel junction layer 246 may not be formed. A light emitting unit layer 248 may be formed on the tunnel junction layer 246. The light emitting unit layer 248 may be the same as the light emitting unit 84 of FIG. 4. First and second lower electrodes 250 and 252 are formed on the light emitting unit layer 248. The first and second lower electrodes 250 and 252 are separated from each other. The tunnel junction layer 246 and the light emitting unit layer 248 may be formed by using an epitaxial growth method such as MOCVD or MBE.

Figure 22:
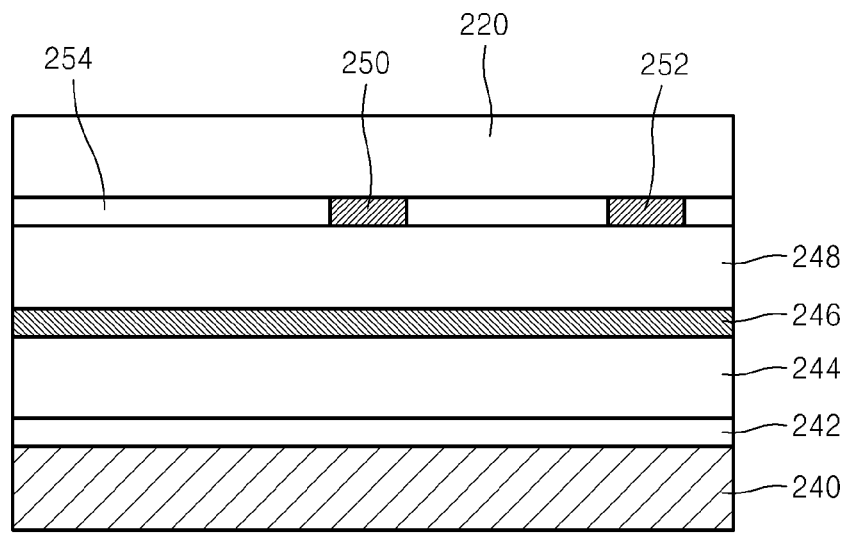
Figure 23:
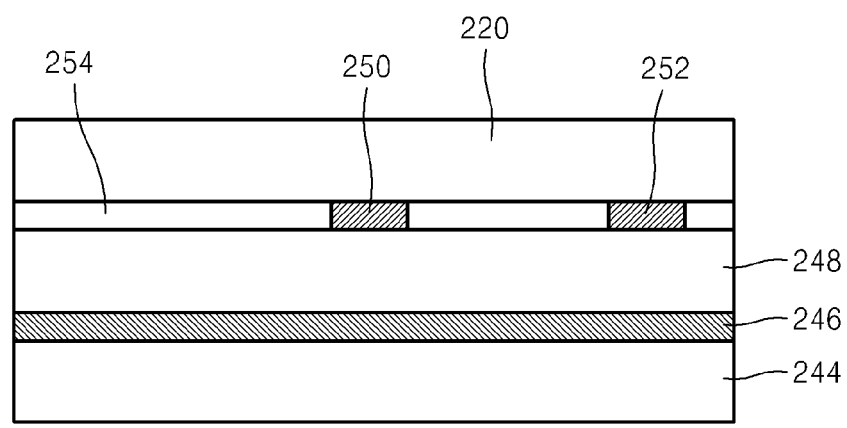

Referring to FIG. 22, an insulating layer 254 is formed on the light emitting unit layer 248 so as to cover the first and second lower electrodes 250 and 252. A top surface of the insulating layer 254 is planarized until the first and second lower electrodes 250 and 252 are exposed. A transparent substrate 220 is formed on the insulating layer 254 so as to cover the exposed first and second lower electrodes 250 and 252. The transparent substrate 220 may be a substrate that is transparent with respect to light emitted from the light emitting unit layer 248. The transparent substrate 220 is as described with reference to FIG. 20. After the transparent substrate 220 is formed, the substrate 240 is removed from the resultant structure. The substrate 240 may be removed by performing an epitaxial lift-off process. In the epitaxial lift-off process, the substrate 240 may be removed by decomposing the separation layer 242 or by separating the separation layer 242 therefrom. FIG. 23 shows the resultant structure formed after the substrate 240 is removed by using the separation layer 242. Subsequent processes may be performed after the resultant structure of FIG. 23 is inverted. In this way, the transparent substrate 220 is disposed in a lower portion of the resultant structure of FIG. 23, and the transistor layer 244 is disposed in an upper portion of the resultant structure of FIG. 23.

Figure 24:
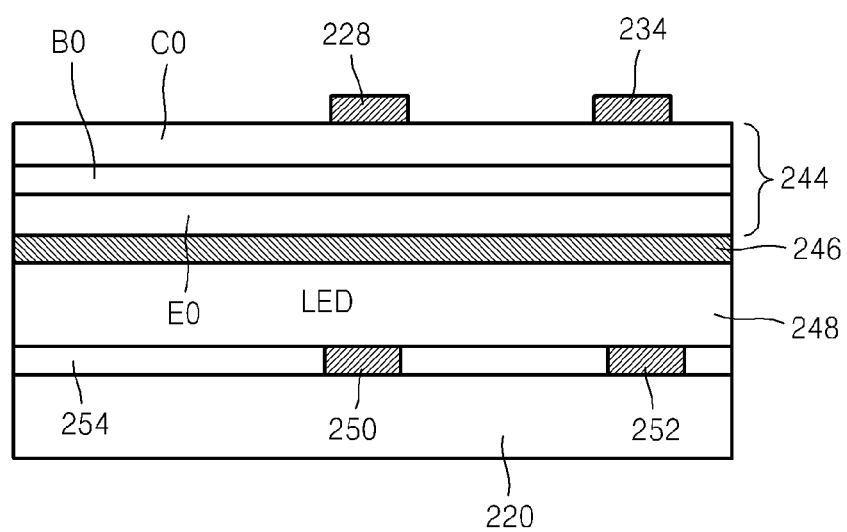

Referring to FIG. 24, the transistor layer 244 includes an emitter layer E0, a base layer B0, and a collector layer C0 sequentially stacked on the tunnel junction layer 246. In this case, each of the emitter layer E0, the base layer B0 and the collector layer C0 may be doped with conductive impurities at a proper concentration in consideration of the optical gain of the HPT that is finally formed, for example, at a concentration of about $10^{16}$ cm$^{-3}$ to about $10^{18}$ cm$^{-3}$. The emitter layer E0 may be the above-described second N type compound semiconductor layer. The base layer B0 may be the above-described P type compound semiconductor layer. The collector layer C0 may be the above-described first N type compound semiconductor layer. The collector layer C0 may be a compound semiconductor layer, such as a GaAs layer, that absorbs incident light having a wavelength of about 800 nm. The emitter layer E0 may be formed by sequentially stacking a sub-emitter layer (not shown) and a main emitter layer (not shown) on the emitter layer E0. The sub-emitter layer may also be formed on the light emitting unit to be finally formed under the HPT. The sub-emitter layer may be a GaAs layer that is doped with N+ impurities, for example. The collector layer C0 may be formed by sequentially stacking a main collector layer (not shown) and a sub-collector layer (not shown) on the collector layer C0. The subcollector layer may be a GaAs, InGaP or AlGaAs layer that is doped with N+ impurities, for example. The third and sixth electrodes 228 and 234 are formed on the transistor layer 244. The third and sixth electrodes 228 and 234 may be formed to be separated from each other. The third and sixth electrodes 228 and 234 may be formed of ITO, ZnO or AZO, for example. The third and sixth electrodes 228 and 234 are upper electrodes, and at least one surface of the third electrode 228 may be coated with an antireflection layer so as to reduce a loss of incident light due to reflection.

Figure 25:
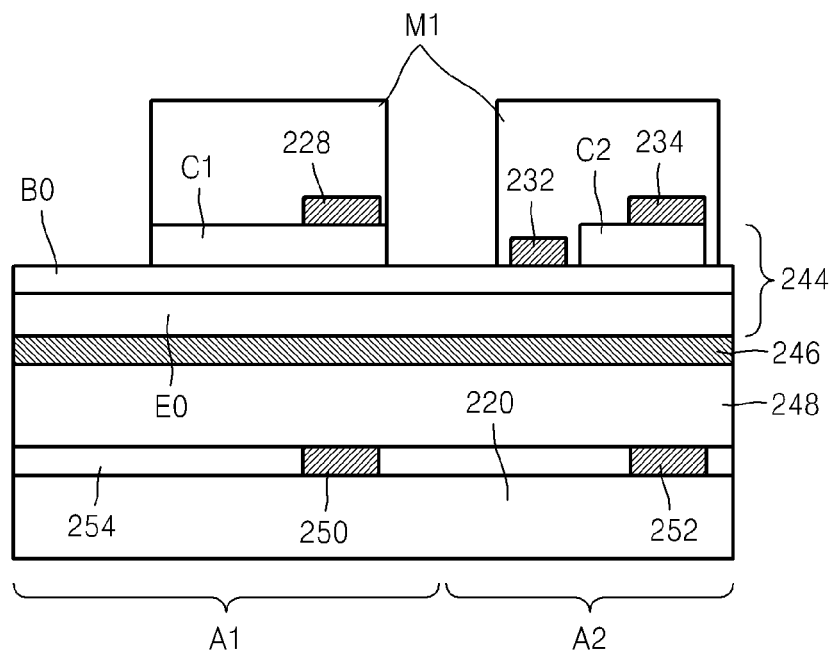
Figure 26:
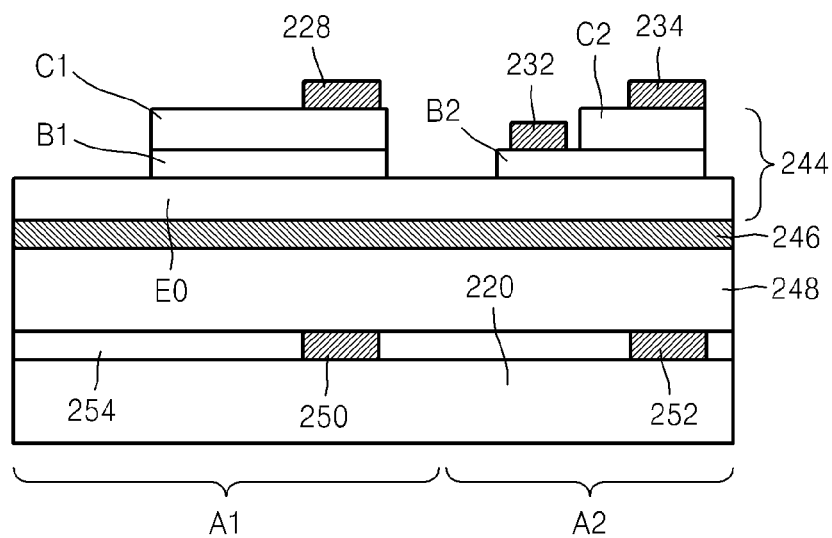

Referring to FIG. 25, first and second collectors C1 and C2 that are separated from each other are formed by patterning the collector layer C0 on the transistor layer 244. The first and second collectors C1 and C2 represent the collectors C1 and C2 of FIG. 20. However, for convenience of explanation, the terms first and second collectors are used when describing the method. The first and second collectors C1 and C2 may be formed by forming a mask (not shown) that covers portions of the collector layer C0 and then by etching the collector layer C0 around the mask until the base layer B0 is exposed, and by removing the mask. When the first and second collectors C1 and C2 are formed, the area of the first collector C1 may be larger than the second collector C2. The third electrode 228 is a transparent electrode and thus may be formed on the entire top surface of the first collector C1. Subsequently, the fifth electrode 232 is formed in a portion that corresponds to a second area A2 of the base layer B0 and is adjacent to the second collector C2. The fifth electrode 232 is a gating electrode. The second area A2 is an area in which an HBT as a gate transistor is to be formed in a subsequent process. A first area A1 is an area in which an HPT as an optical transistor is to be formed. In the next process, a mask M1 that covers the first collector C1 and the third electrode 228, the second collector C2, the sixth electrode 234 and the fifth electrode 232 and a space between the second collector C2 and the fifth electrode 232 is formed. The portion of the base layer B0 outside the mask M1 is etched until the emitter layer E0 is exposed. After the etching process is performed, the mask M1 is removed. By performing the etching process, first and second bases B1 and B2 that are separated from each other are formed on the emitter layer E0, as illustrated in FIG. 26.

Figure 27:
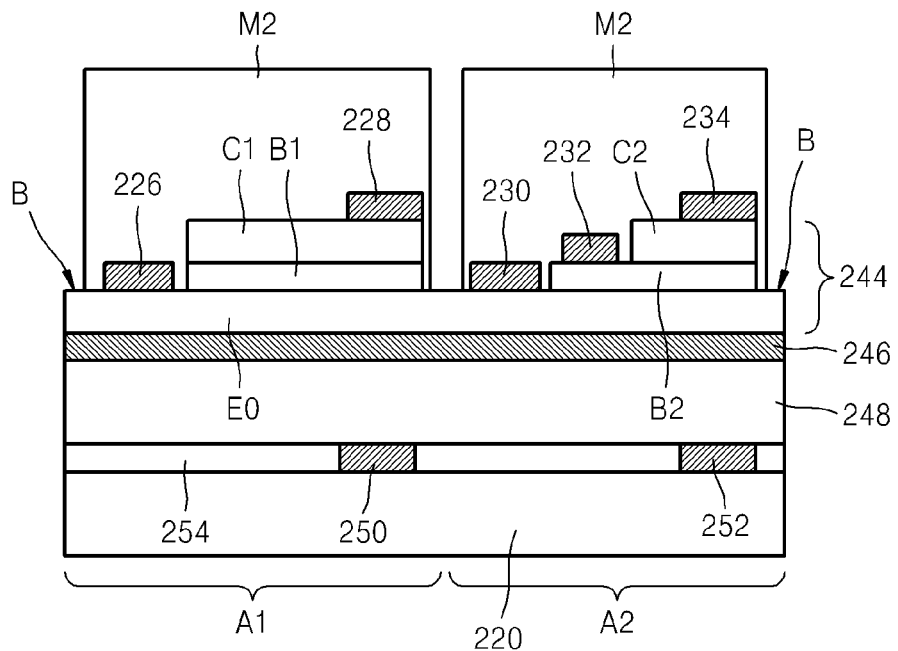
Figure 28:
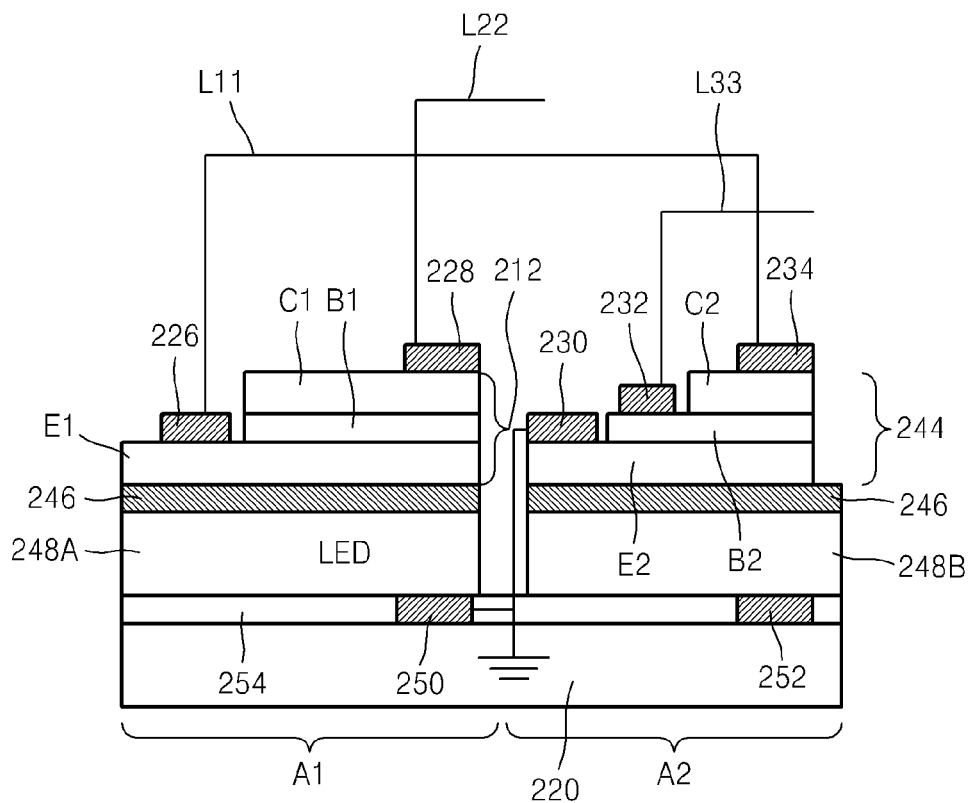

Referring to FIG. 27, second and fourth electrodes 226 and 230 are formed on the exposed top surface of the emitter layer E0. The second electrode 226 is formed on the top surface of the emitter layer E0 that is in the first area A1. The first electrode 230 is formed on the top surface of the emitter layer E0 that is in the second area A2. A mask M2 that exposes a portion of the emitter layer E0 and covers elements formed on the emitter layer E0 is formed. The mask M2 may be a photosensitive layer pattern. The mask M2 covers the second through sixth electrodes 226, 228, 230, 232, and 234, the first and second bases B1 and B2, and the first and second collectors C1 and C2. Also, the mask M2 covers a space between the second electrode 226 and the first collector C1, a space between the fourth electrode 230 and the second base B2 and a space between the fifth electrode 232 and the second collector C2. The mask M2 exposes a portion of the emitter layer E0 that corresponds to a boundary region between the first and second areas A1 and A2. The mask M2 may be a mask that defines a unit pixel region. When an array including a plurality of unit pixels is formed, the mask M2 may also mask a neighboring unit pixel region. An area B of the emitter layer E0 that corresponds to a boundary region with a neighboring unit pixel are exposed by the mask M2. The exposed portions of the emitter layer E0 outside the mask M2 are etched until the insulating layer 254 is exposed. After the etching process is performed, the mask M2 is removed. By performing the etching process, the emitter layer E0 is divided into first and second emitters E1 and E2 that are separated from each other, and the light emitting unit layer 248 is divided into a first light emitting unit 248A and a second light emitting unit 248B, as illustrated in FIG. 28. The first light emitting unit 248A corresponds to the light emitting unit 210 of FIG. 20. The second light emitting unit 248B corresponds to the dummy pattern 224 of FIG. 20. As a result of etching using the mask M2, as illustrated in FIG. 28, the first light emitting unit 248A and a HPT 212 are sequentially formed in the first area A1, and the second light emitting unit 248B and a HBT 214 as a gate transistor are sequentially formed in the second area A2. In a subsequent process, an interlayer dielectric layer (not shown) that covers the first and second areas A1 and A2 is formed, and contact holes (not shown) through which the second through sixth electrodes 226, 228, 230, 232, and 234 are exposed, are formed in the interlayer dielectric layer. While filling the contact holes, a wiring L11 for connecting the second electrode 226 and the sixth electrode 234, a wiring L22 for connecting the third electrode 228 to a power supply source, and a wiring L33 for connecting the fifth electrode 232 to a gating voltage source are formed. Also, the first lower electrode 250 and the fourth electrode 230 are grounded. In this way, the second optical modulator 200 of FIG. 20 may be manufactured.

A method of manufacturing the second optical modulator of FIG. 20B according to another exemplary embodiment of the present invention will now be described with reference to FIGS. 29 through 33. In this procedure, like reference numerals represent like elements as those of FIG. 20B. FIGS. 29 through 33 are cross-sectional views illustrating a method of manufacturing the second optical modulator shown in FIG. 20B, according to another exemplary embodiment of the present invention.

Figure 29:
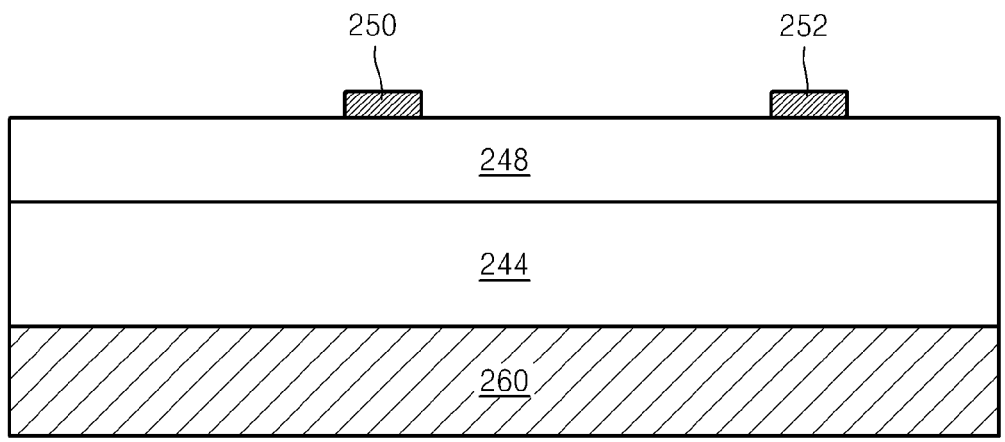
FIGS. 29 through 33 are cross-sectional views illustrating a method of manufacturing the optical modulator shown in FIG. 20B, according to another exemplary embodiment of the present invention.
Figure 30:
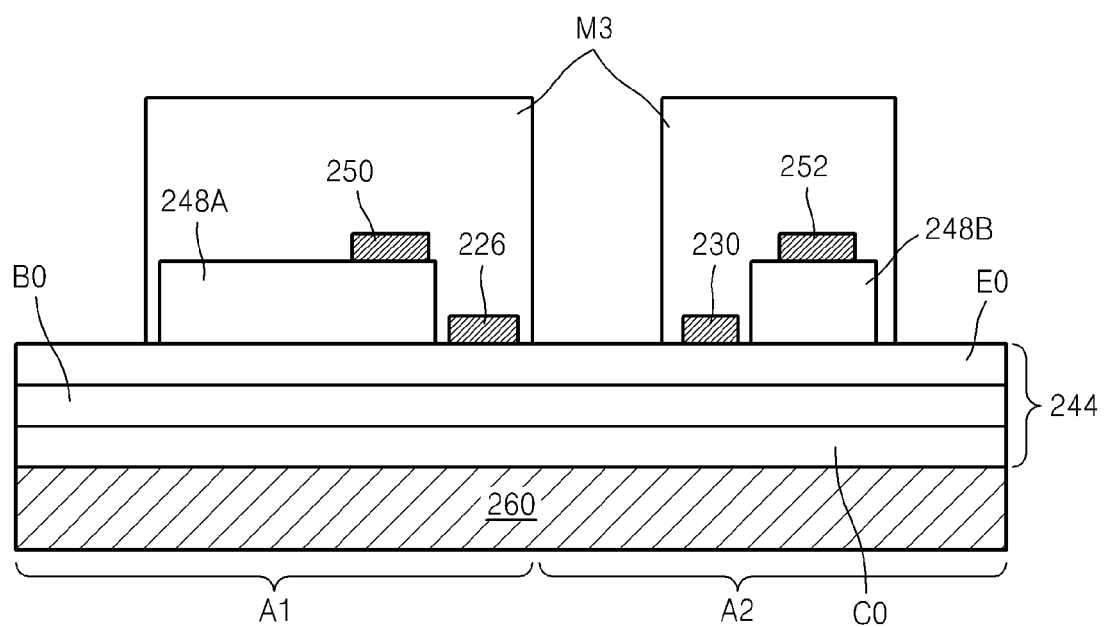

Referring to FIG. 29, a transistor layer 244 and a light emitting unit layer 248 are sequentially stacked on a substrate 260. The substrate 260 may be a substrate that is transparent with respect to incident light, such as a compound semiconductor substrate. For example, when the wavelength of light that is incident on the substrate 260 is equal to or greater than about 900 nm, the substrate 260 may be a GaAs substrate that is transparent with respect to the light. In FIG. 29, light is incident on a lower surface of the substrate 260. A tunnel junction layer may be further formed between the transistor layer 244 and the light emitting unit layer 248. First and second lower electrodes 250 and 252 are formed on the light emitting unit layer 248. Referring to FIG. 30, the light emitting unit layer 248 is patterned to form first and second light emitting units 248A and 248B that are separated from each other, by using a masking process, a photolithography process and an etching process. In this case, the light emitting unit layer 248 may be patterned so that the first light emitting unit 248A is disposed in a first area A1 of the substrate 260 and the second light emitting unit 248B is disposed in a second area A2 of the substrate 260. The area of a surface of the first light emitting unit 248A from which light is emitted may be larger than that of the second light emitting unit 248B. A first lower electrode 250 is formed on a top surface of the first light emitting unit 248A, i.e., on a surface that faces an optical sensor image. The first lower electrode 250 is a transparent electrode and thus may be formed on the entire top surface of the first light emitting unit 248A. The transistor layer 244 may be formed by sequentially stacking a collector layer C0, a base layer B0, and an emitter layer E0 on the substrate 260 by using an epitaxial growth method. A second electrode 226 is formed on the portion of the emitter layer E0 in the first area A1, and a fourth electrode 230 is formed on the portion of the emitter layer E0 in the second area A2. A mask M3 that covers the first and second light emitting units 248A and 248B, the first and second lower electrodes 250 and 252 and the second and fourth electrodes 226 and 230 is formed on the emitter layer E0. The mask M3 may be a photosensitive layer pattern. The mask M3 covers the portion of the emitter layer E0 that corresponds to the first area A1 so as to include the first light emitting unit 248A, the second electrode 226, and the first lower electrode 250 in the first area A1. Also, the mask M3 covers the portion of the emitter layer E0 that corresponds to the second area A2 so as to include the second light emitting unit 248B, the fourth electrode 230, and the second lower electrode 252 in the second area A2. A portion of the emitter layer E0 to be used in an HPT and a portion of the emitter layer E0 to be used in an HBT are defined by the mask M3. Subsequently, the portion of the emitter layer E0 around the mask M3 is etched and then, the mask M3 is removed. As a result, first and second emitters E1 and E2 are formed from the emitter layer E0, and a portion of the base layer B0 is exposed (see FIG. 31).

Figure 31:
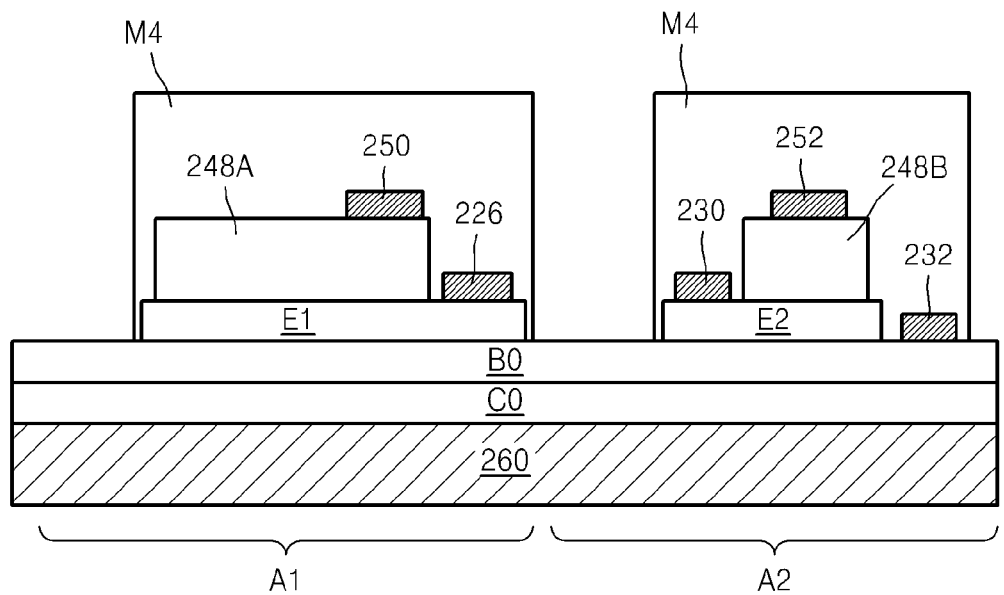

Referring to FIG. 31, a fifth electrode 232 is formed in the exposed portion of the base layer B0 in the second area A2. The fifth electrode 232 is a gating electrode, and a gating voltage signal is applied to the fifth electrode 232 during a gating operation. A mask M4 that defines a portion of the base layer B0 is formed on the base layer B0. The mask M4 defines a portion of the base layer B0 to be used in the HPT and a portion of the base layer B0 to be used in the HBT. The mask M4 covers the first emitter E1, elements formed thereon, the second emitter E2, elements formed thereon, and the fifth electrode 232. The portion of the base layer B0 outside the mask M4 is etched until the collector layer C0 is exposed. After the etching process is performed, the mask M4 is removed.

Figure 32:
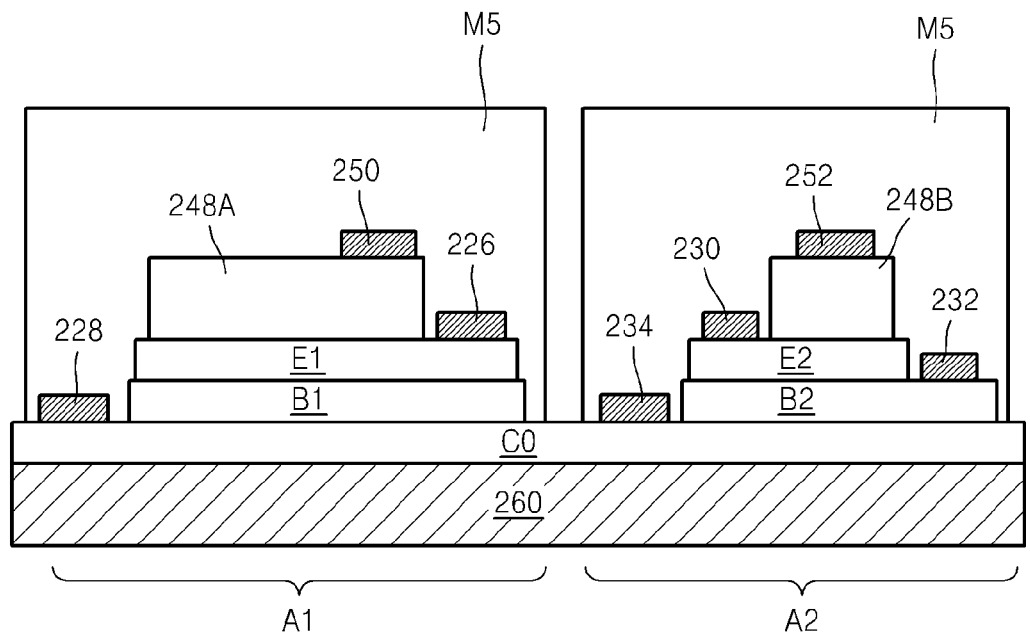

FIG. 32 shows the result after the etching process is performed using the mask M4. Referring to FIG. 32, first and second bases B1 and B2 are formed from the base layer B0 of FIG. 31 by etching using the mask M4.

Figure 33:
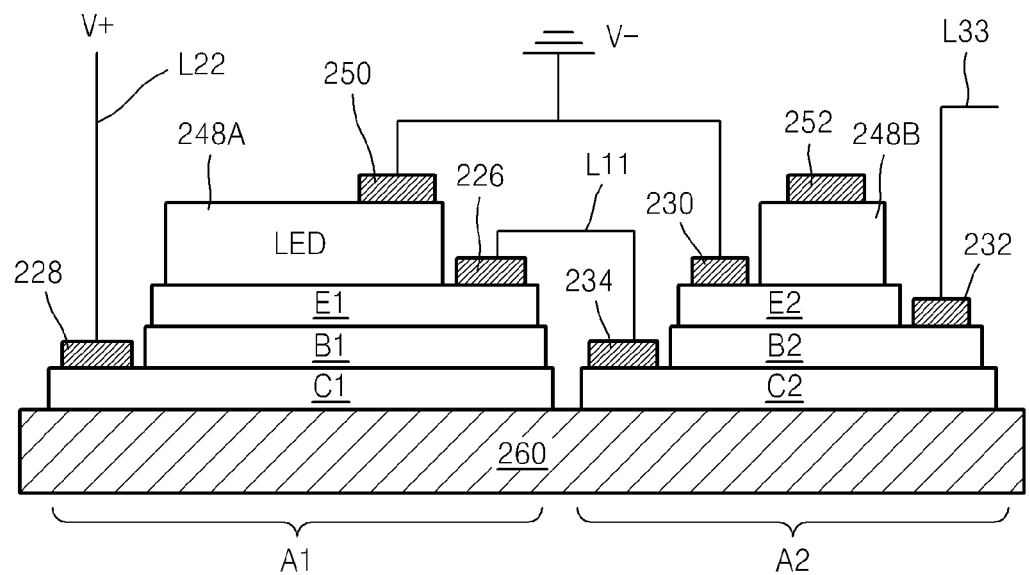

The first emitter E1 is disposed on the first base B1. The first base B1 serves as a base of the HPT. The second emitter E2 and the fifth electrode 232 are disposed on the second base B2 to be separated from each other. The second base B2 serves as a base of the HBT. Third and sixth electrodes 228 and 234 are formed on the exposed portion of the collector layer C0. The third electrode 228 is disposed in the first area A1, and the sixth electrode 234 is disposed in the second area A2. When the substrate 260 on which light is incident is referred to as an upper portion, the third and sixth electrodes 228 and 234 serve as upper electrodes with respect to the first and second lower electrodes 250 and 252. Subsequently, after the third and sixth electrodes 228 and 234 are formed, a mask M5 is formed on the collector layer C0. The mask M5 defines a portion of the first area A1 to be used in the HPT and a portion of the second area A2 to be used in the HBT. The first base B1, elements formed thereon, and the third electrode 228 are formed in the portion of the first area A1 defined by the mask M5. Also, the second base B2, elements formed thereon, and the sixth electrode 234 are formed in the portion of the second area A2 defined by the mask M5. After the mask M5 is formed, the portion of the collector layer C0 outside the mask M5 is etched until the substrate 260 is exposed. After the etching process is performed, the mask M5 is removed. By performing the etching process, the collector layer C0 is patterned to form first and second collectors C1 and C2, as illustrated in FIG. 33. In this way, as illustrated in FIG. 33, the first collector C1, the first base B1, and the first emitter E1 are sequentially formed on the first area A1, thereby forming the HPT and the first light emitting unit 248A is formed on the HPT. The second collector C2, the second base B2, and the second emitter E2 are sequentially formed on the second area A2, thereby forming the HBT. The second light emitting unit 248B constituting a dummy pattern is formed on the HBT. The HPT, the first light emitting unit 248A and the HBT may constitute a unit pixel of the second optical modulator of FIG. 20B. After the etching process using the mask M5 is performed, an interlayer dielectric layer (not shown) that covers elements formed on the substrate 260 is formed, and contact holes (not shown) through which the first lower electrode 250 and the second through sixth electrodes 226, 228, 230, 232, and 234 are exposed, are formed in the interlayer dielectric layer, and then, a wiring formation process of filling the contact holes is performed. In this way, a wiring L11 for connecting the second electrode 226 and the sixth electrode 234, a wiring L22 for applying a voltage V+ to the third electrode 228, and a wiring L33 for applying a gating voltage signal to the fifth electrode 232 constituting a gating electrode are formed. Also, a wiring for grounding the first lower electrode 250 and the fourth electrode 230 formed on the second emitter E2 may be formed. A voltage V− less than the voltage V+ applied to the second electrode 228 may be applied to the grounding wiring.

A method of operating the second optical modulator will now be described.

Figure 34:
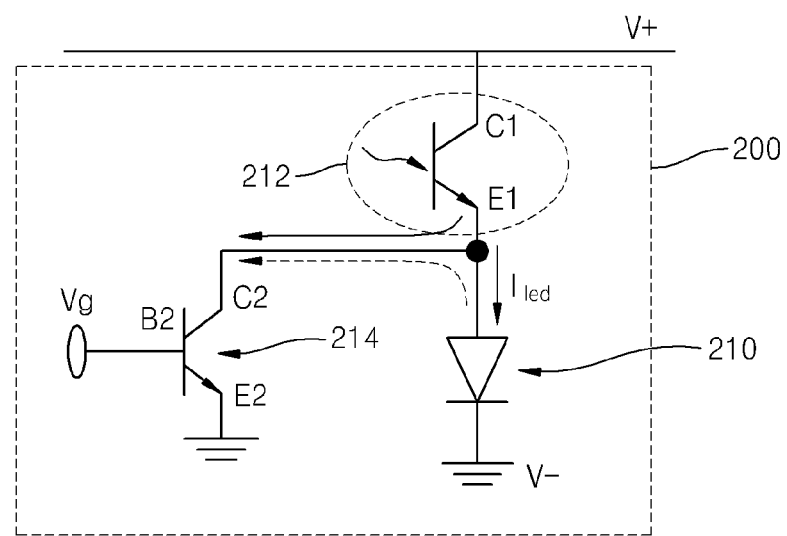
FIG. 34 is a circuit diagram for describing a gating method of the optical modulator of FIG. 19, according to an exemplary embodiment of the present invention.

FIG. 34 is a circuit diagram for describing a gating method of the second optical modulator 200 of FIG. 19, according to an exemplary embodiment of the present invention. Referring to FIG. 34, a voltage V+ is applied to the first collector C1 of the HPT 212, and the light emitting unit 210 is grounded or a voltage less than the voltage V+ applied to the first collector C1 is applied to the light emitting unit 210. In other words, an electric potential is formed between the first collector C1 of the HPT 212 and a surface of the light emitting unit 210 from which light is emitted. In this state, a gating voltage Vg is applied to the second base B2 of the HBT 214. The gating voltage Vg may be applied to the second base B2 of the HBT 214 before forming the electric potential. When the gating voltage Vg is applied to the second base B2 of the HBT 214, the HBT 214 is turned on and an impedance of the HBT 214 is decreased. Thus, current generated in the HPT 212 flows through the HBT 214 while bypassing the light emitting unit 210. As such, there is no current supplied to the light emitting unit 210 from the HPT 212, and the light emitting unit 210 is turned off. When there remain charges that are not recombined in the light emitting unit 210 after the HBT 214 is turned on, the remaining charges flow through the HBT 214 having a low impedance. As such, unnecessary residual light such as an optical tail may be prevented from being generated after the light emitting unit 210 is turned off.

In the gating operation, the reaction of the light emitting unit 210 may be varied according to a method of applying the gating voltage Vg to the second base B2 of the HBT 214. In other words, the amount of current to be supplied to the light emitting unit 210 from the HPT 212 may be varied according to the method of applying the gating voltage Vg.

Figure 35:
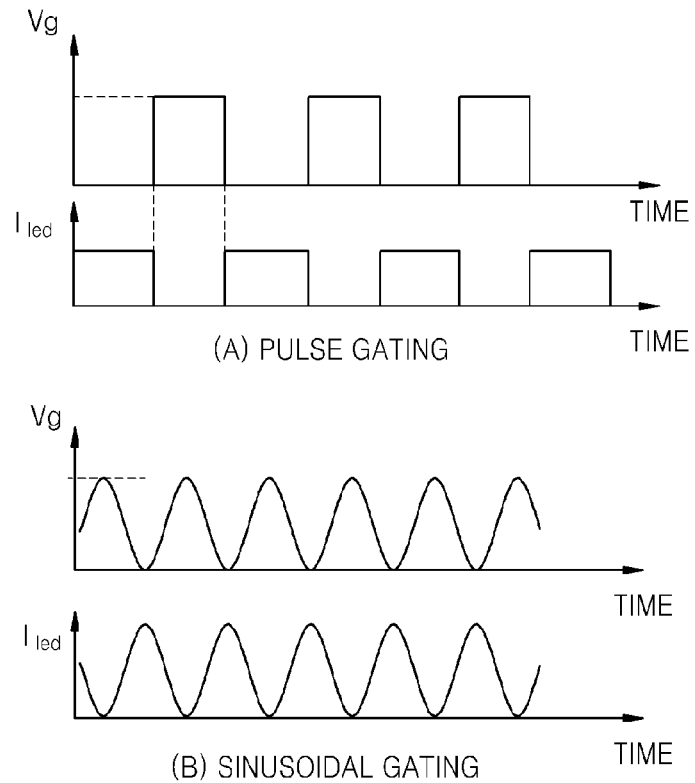
FIG. 35 is a time series chart illustrating variation of currents supplied to a light emitting unit according to gating voltage signals applied to a gate transistor when a gating operation is performed in the optical modulator of FIG. 19, according to an exemplary embodiment of the present invention.

FIG. 35 is a time series chart illustrating variation of currents supplied to the light emitting unit 210 according to a gating method, i.e., a method of applying the gating voltage Vg when a gating operation is performed in the second optical modulator 200 of FIG. 19. Referring to (a) of FIG. 35, when the gating voltage Vg applied to the second base B2 of the HBT 214 has a pulse form and the gating voltage Vg is OFF, an amplified optical current $I_{led}$ flows through the light emitting unit 210 from the HPT 212. On the other hand, when the gating voltage Vg is ON, the current $I_{led}$ does not flow through the light emitting unit 210.

Referring to (b) of FIG. 35, when the gating voltage Vg applied to the second base B2 of the HBT 214 is consecutive and is varied periodically, sinusoidal gating may be performed. In detail, when the gating voltage Vg applied to the second base B2 is changed into a sinusoidal waveform, the amount of current supplied to the light emitting unit 210 from the HPT 212 is controlled by the magnitude of the gating voltage Vg. As such, the current supplied to the light emitting unit 210 from the HPT 212 is changed into the sinusoidal waveform. The gating voltage Vg in a different waveform from the sinusoidal waveform, i.e., in a triangular waveform may be applied to the second base B of the HBT 214. As described above, in case of sinusoidal gating, gating may be performed at a higher frequency than in pulse gating so that a modulation frequency may be increased.

As such, comparing FIGS. 18 and 35, the gating operation of the second optical modulator 200 and the gating operation of the first optical modulator 100 may be the same.

Meanwhile, the area of a unit pixel may be increased by increasing the areas of the HPT 212 and the light emitting unit 210. However, when the areas of the HPT 212 and the light emitting unit 210 are increased, as described with reference to the first optical modulator 100, a transient response time may be extended as a time constant is increased. The time constant of the HPT 212 is in proportion to the amount of current that remains in the first base B1 and capacitance between the first base B1 and the first collector C1. The capacitance of the HPT 212 is in proportion to a PN junction area and the magnitude of a bias voltage. The case of the light emitting unit 210 is as described with reference to the first optical modulator 100. Thus, as an alternative for reducing the transient response time in the gating operation of the second optical modulator 200, the area of a unit pixel is not increased but is reduced and a two-dimensional array is constituted to include unit pixels having reduced areas. The area of each of the unit pixels that constitute the two dimensional array may be 10×10 μm², for example.

Figure 36:
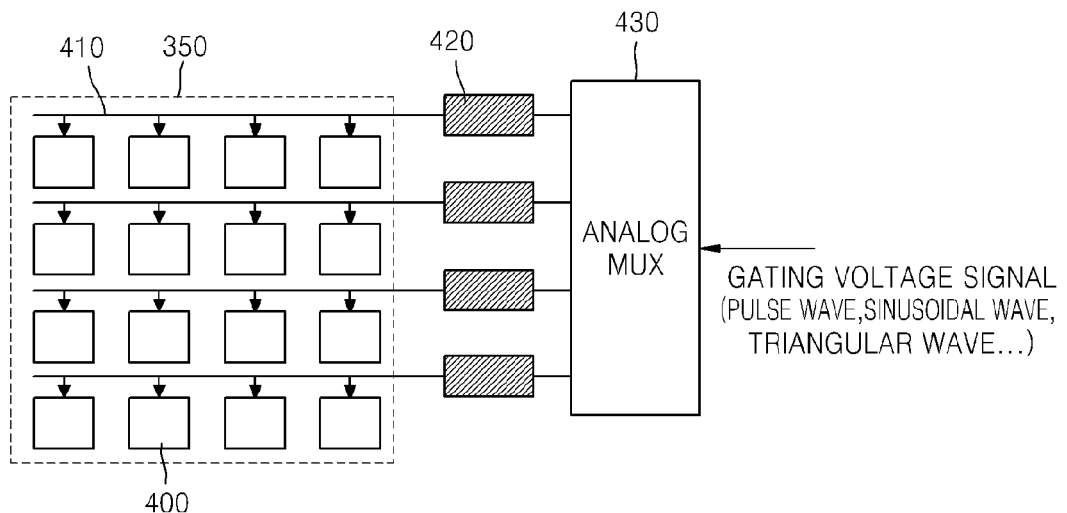
FIG. 36 is a schematic plan view of an array including a plurality of unit pixels of the optical modulator shown in FIG. 19, according to an exemplary embodiment of the present invention.

FIG. 36 illustrates an array 350 including a plurality of unit pixels 400, according to an exemplary embodiment of the present invention. The area of each unit pixel 400 may be 10×10 μm².

Referring to FIG. 36, the plurality of unit pixels 400 form a matrix. A power supply source may be disposed in the array 350. Thus, the same bias voltage may be applied to each unit pixel 400. The array 350 includes 16 unit pixels 400 but may include a greater or lesser number of unit pixels 400. Each unit pixel 400 may be a unit pixel of the above-described second optical modulator or a unit pixel of an optical modulator from among third through fifth optical modulators that will be described later. The unit pixels 400 included in each row of the array 350 include a HBT that is a gate transistor. Thus, electric interference does not occur between the unit pixels 400 of each row of the array 350 during a gating operation. The unit pixels 400 included in each row of the array 350 are connected to one another via the same gate line 410. The gate line 410 allocated to each row of the array 350 is connected to a base of the HBT included in each unit pixel 400 of each row. Four gate lines 410 illustrated in FIG. 36 are respectively connected to four switching elements 420 in a one-to-one manner. The switching elements 420 may be field effect transistors (FETs). The switching elements 420 are connected to an analog multiplexer 430. A gating voltage signal is supplied to the analog multiplexer 430. As illustrated in FIG. 36, when the gating voltage signal is supplied to the analog multiplexer 430, the analog multiplexer 430 may turn on or turn off the switching elements 420 simultaneously. The analog multiplexer 430 may control turning on and turning off of the switching elements 420 according to the gating voltage signal. For example, when the gating voltage signal is a pulse signal, the analog multiplexer 430 may turn on or turn off the switching elements 420 according to the pulse signal simultaneously so that all of the unit pixels 400 included in the array 350 may be simultaneously gated. A large load may be generated when all of the unit pixels 400 included in the array 350 are simultaneously gated. In this case, each row of the array 350 is set as a unit block or at least two rows of the array 350 are set as a unit block, thereby turning on or turning off the switching elements 420 connected to each unit block so that the unit pixels 400 may be simultaneously gated according to unit blocks. When the gating voltage signal is consecutive and periodic such as a sinusoidal waveform or a triangular wave, the analog multiplexer 430 may maintain the switching elements 420 in a turn on state for a given amount of time. While the switching elements 420 are maintained in the turn on state, the consecutive and periodic gating voltage signal is applied to a gate transistor of each unit pixel so that periodic and consecutive gating such as sinusoidal gating may be performed. The periodic and consecutive gating may be simultaneously performed on all of the unit pixels 400 included in the array 350. However, when the load is large, the unit pixels 400 may also be gated according to each unit block, as described above.

Meanwhile, when the optical modulator including the array 350 of FIG. 36 is used for distance measurement and when it is efficient to gate the array 350 according to a gating voltage signal, the switching elements 420 may also be replaced with power transistors having a large capacity. Also, the array 350 includes the plurality of unit pixels 400. Thus, the gating operation of the array 350 may be explained as the above-described gating operation of the unit pixels 400.

An optical modulator (hereinafter, referred to as a third optical modulator) according to another exemplary embodiment of the present invention will now be described.

Figure 37:
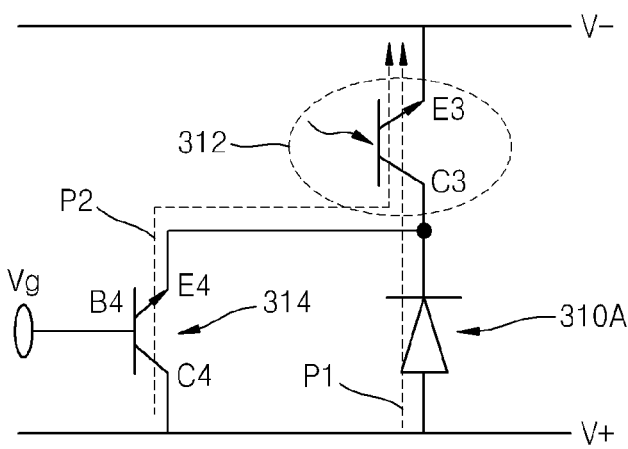
FIG. 37 is a circuit diagram of an optical modulator according to another exemplary embodiment of the present invention.

FIG. 37 is a circuit diagram of a third optical modulator according to another exemplary embodiment of the present invention. Referring to FIG. 37, the third optical modulator according to the present exemplary embodiment includes an HPT 312, an HBT 314, and a light emitting unit 310A. The HPT 312 is an example of an optical-electric converter. Thus, other optical-electric converters instead of the HPT 312 may be used. The HBT 314 is a gate transistor that performs a gating operation. The HBT 314 is an example of a gating unit. Thus, other gating units instead of the HBT 314 may be used. The light emitting unit 310A may be an LED.

A third collector C3 of the HPT 312 is connected to a fourth emitter E4 of the HBT 314 and a first terminal of the light emitting unit 310A. A voltage V+ is applied to a fourth collector C4 of the HBT 314 and a second terminal of the light emitting unit 310A. A voltage less than the voltage V+ is applied to a third emitter E3 of the HPT 312. The third emitter E3 of the HPT 312 may be grounded.

In this way, when the HBT 314 is in an off state during a gating operation, an electric potential is formed between the third emitter E3 of the HPT 312 and the second terminal of the light emitting unit 310A so that current flows along a first path P1 that passes through the light emitting unit 310A. As such, light is emitted from the light emitting unit 310A. When a gating voltage Vg is applied to a fourth base B4 of the HBT 314 during the gating operation, the HBT 314 is in an on state, and an electric potential is formed between the fourth collector C4 of the HBT 314 and the third emitter E3 of the HPT 312. As such, the current flows along a second path P2 that passes through the HBT 314, and the light emitting unit 310 is turned off. In this case, charges that remain in the light emitting unit 310A will be removed along the second path P2 and thus, residual light such as an optical tail may be rapidly removed from the light emitting unit 310A. The gating voltage Vg applied to the fourth base B4 of the HBT 314 or the gating voltage signal during the gating operation may be the same as that of the second optical modulator 200.

The third optical modulator may include an array including a plurality of unit pixels as shown in FIG. 37. The entire array may be simultaneously gated or may be gated according to unit blocks including the plurality of unit pixels. However, even in this case, the basic gating operation is a gating operation on each unit pixel. Thus, the gating operation on the array or each unit block is the same as described above. When the entire array or unit block is gated, reducing a transient response time according to a time constant may be considered as described with reference to the second optical modulator. In this regard, the gating operation of the second optical modulator described with reference to FIG. 36 may be performed. In other words, the unit pixels 400 of FIG. 36 may be unit pixels of the third optical modulator of FIG. 37.

Figure 38:
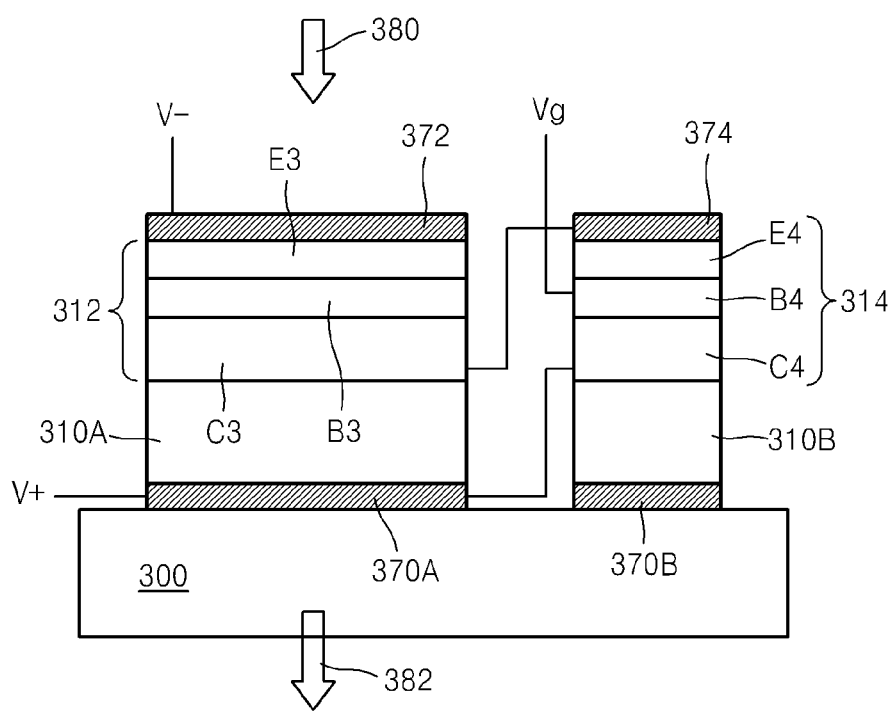
FIG. 38 is a cross-sectional view of an optical modulator that may be represented by the circuit diagram of FIG. 37, according to an exemplary embodiment of the present invention.

FIG. 38 is a cross-sectional view of the optical modulator shown in FIG. 37, according to an exemplary embodiment of the present invention. Referring to FIG. 38, third and fourth lower electrodes 370A and 370B are disposed on a substrate 300 to be separated from each other. The substrate 300 is a substrate that is transparent with respect to light 382 emitted from a light emitting unit 310A, such as a glass substrate. The third and fourth lower electrodes 370A and 370B may be ITO, ZnO or AZO electrodes. The light emitting unit 310A and an HPT 312 are sequentially stacked on the third lower electrode 370A. A tunnel junction layer may be further disposed between the light emitting unit 310A and the HPT 312. The light emitting unit 310A may include a P type compound semiconductor layer, an active layer, and an N type compound semiconductor layer, which are sequentially stacked on the light emitting unit 310A. In this case, each compound semiconductor layer may be the same as the compound semiconductor layer included in the light emitting unit 20 of the first optical modulator 100 of FIG. 3 and the light emitting unit 210 of the second optical modulator 200 of FIG. 19. The HPT 312 is formed by sequentially stacking a third collector C3, a third base B3, and a third emitter E3 on the light emitting unit 310A. The third collector C3 may have a single layer structure or a multi-layer structure. For example, the third collector C3 may have a multi-layer structure in which a sub-collector and a main collector are sequentially stacked. In this case, the sub-collector may also be included in the light emitting unit 310A. A third upper electrode 372 is disposed on the third emitter E3 of the HPT 312. The surface of the third upper electrode 372 may be coated with an antireflection layer so as to prevent reflection of incident light 380. The third upper electrode 372 may be the same as the third lower electrode 370A. The third lower electrode 370A contacts the entire bottom surface of the light emitting unit 310A but only a portion of the third lower electrode 370A may contact the bottom surface of the light emitting unit 310A. Also, the third lower electrode 370A may be formed on one layer from among layers of the light emitting unit 310A. For example, the third lower electrode 370A may be disposed on a portion of the P type compound semiconductor layer of the light emitting unit 310A. In this case, the P type compound semiconductor layer of the light emitting unit 310A may directly contact the substrate 300.

Subsequently, a dummy pattern 310B is disposed on the fourth lower electrode 370B. The dummy pattern 310B may have the same structure as the light emitting unit 310A. Only a portion of the fourth lower electrode 370B may contact the dummy pattern 310B. A HBT 314 is disposed on the dummy pattern 310B. The HBT 314 is formed by sequentially stacking a fourth collector C4, a fourth base B4, and a fourth emitter E4 on the dummy pattern 310B. N type or P type conductive impurities may be doped with the fourth collector C4, the fourth base B4, and the fourth emitter E4 of the HBT 314 at a doping concentration of about $10^{16}$ cm$^{-3}$ to about $10^{19}$ cm$^{-3}$, for example. The doping concentration of each of the layers of the HPT 312 may be about $10^{16}$ cm$^{-3}$ to about $10^{19}$ cm$^{-3}$. The fourth upper electrode 374 is disposed on the HBT 314. The fourth upper electrode 374 may be the same as the third upper electrode 372. The fourth emitter E4 of the HBT 314 is connected to the third collector C3 of the HPT 312 via the fourth upper electrode 374. A voltage V+ is applied to the light emitting unit 310A via the third lower electrode 370A, and is also applied to the fourth collector C4 of the HBT 314. Although not shown, the fourth collector C4 of the HBT 314 may be connected to the fourth lower electrode 370B via a wiring or the voltage V+ may be applied to the fourth collector C4 of the HBT 314 via the fourth lower electrode 370B. A voltage V− less than the voltage V+ is applied to the third emitter E3 of the HPT 312 via the third upper electrode 372.

The third optical modulator having the structure illustrated in FIG. 38 is different from the second optical modulator having the structure illustrated in FIG. 28 in that stack positions of an emitter and a collector are opposite to each other. The stack positions of the emitter and the collector are made opposite in a simple manner by changing the order for forming the emitter and the collector in a manufacturing process. Thus, the third optical modulator of FIG. 38 may be manufactured by using the method of manufacturing the second optical modulator illustrated in FIGS. 21 through 28. Thus, descriptions of the method of manufacturing the third optical modulator having the structure illustrated in FIG. 38 will not be provided here.

Figure 39:
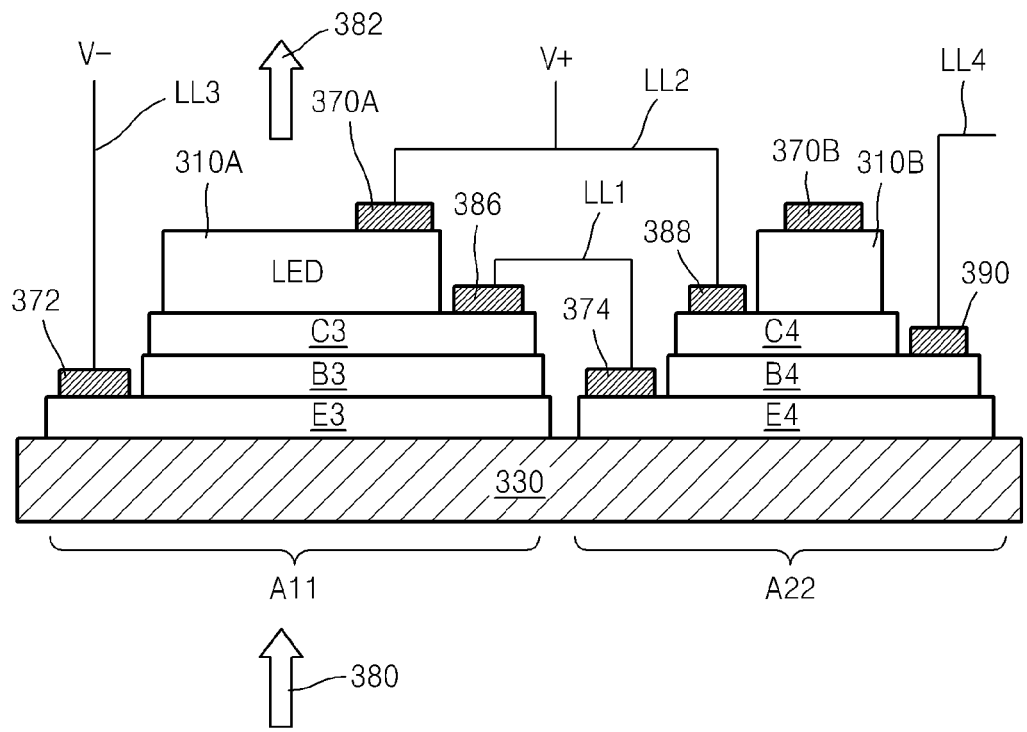
FIG. 39 is a cross-sectional view of an optical modulator that may be represented by the circuit diagram of FIG. 37, according to another exemplary embodiment of the present invention.

FIG. 39 is a cross-sectional view of a third optical modulator that may be represented by the circuit diagram of FIG. 37, according to another exemplary embodiment of the present invention. Like reference numerals represent like elements as those of FIG. 38 or elements having the same functions as those of FIG. 38.

Referring to FIG. 39, a third emitter E3, a third base B3, and a third collector C3 of the HPT 312 are sequentially stacked on a first area A11 of a substrate 330, and a light emitting unit 310A is stacked on the third collector C3.

The substrate 330 may be the same as the substrate 260 of FIG. 30. A surface of the substrate 330 on which light is incident may be coated with an antireflection layer (not shown). A third upper electrode 372 and the third base B3 is disposed on the third emitter E3. The third upper electrode 372 and the third base B3 are separated from each other. A voltage V− that is less than a voltage V+ is applied to the third upper electrode 372 via a third wiring LL3. A seventh electrode 386 and the light emitting unit 310A are disposed on the third collector C3. The seventh electrode 386 and the light emitting unit 310A are separated from each other. A third lower electrode 370A is disposed on a surface of the light emitting unit 310A from which light is emitted. The third lower electrode 370A is a transparent electrode and thus may cover the entire surface of the light emitting unit 310A from which light is emitted. A fourth emitter E4, a fourth base B4, and a fourth collector C4 of the HBT 314 are sequentially stacked on a second area A22 of the substrate 330, and a dummy pattern 310B is disposed on the fourth collector C4. A fourth upper electrode 374 and the fourth base B4 are disposed on the fourth emitter E4 to be separated from each other. The fourth upper electrode 374 is connected to the seventh electrode 386 formed on the third collector C3 of the HPT 312 via a first wiring LL1. In this way, the third collector C3 of the HPT 312 and the fourth emitter E4 of the HBT 314 are connected to each other. A gating electrode 390 and the fourth collector C4 are disposed on the fourth base B4 to be separated from each other. The gating electrode 390 may be connected to a gating voltage signal supply source disposed outside a unit pixel via a fourth wiring LL4. An eighth electrode 388 and the dummy pattern 310B are disposed on the fourth collector C4 to be separated from each other. The eight electrode 388 is connected to the third lower electrode 370A via a second wiring LL3, and the voltage V+ is applied to the second wiring LL2. The same voltage V+ may be applied to the third lower electrode 370A and the eight electrode 388. A fourth lower electrode 370B is disposed on the dummy pattern 310B. For convenience of a manufacturing process, the dummy pattern 310B and the fourth lower electrode 370B are formed but may not be formed.

The third optical modulator having the structure illustrated in FIG. 39 is different from the second optical modulator having the structure illustrated in FIG. 33 in that stack positions of an emitter and a collector are opposite to each other. The stack positions of the emitter and the collector are made opposite in a simple manner by changing the order for forming the emitter and the collector in the manufacturing process. Thus, the third optical modulator of FIG. 39 may be manufactured by simply changing the order for forming the emitter and the collector in the method of manufacturing the second optical modulator illustrated in FIGS. 29 through 33. Thus, the method of manufacturing the third optical modulator having the structure of FIG. 39 may be replaced with the method of manufacturing the second optical modulator illustrated in FIGS. 29 through 33. Thus, descriptions of the method of manufacturing the third optical modulator having the structure of FIG. 39 will not be provided here.

Also, the HPT 312 of the third optical modulator illustrated in FIGS. 38 and 39 has an emitter-up structure in which the third emitter E3 is closer to the surface of the third emitter E3 on which light is incident, than the third collector C3. A method of manufacturing the HPT having the emitter-up structure is the same as a general method of manufacturing the HBT and thus, the HPT having the emitter-up structure may be easily manufactured.

Methods of manufacturing and operating an optical modulator (hereinafter, referred to as a fourth optical modulator) according to other exemplary embodiments of the present invention will now be described. In these procedures, like reference numerals represent like elements as those described above, and descriptions thereof will not be provided here.

Figure 40:
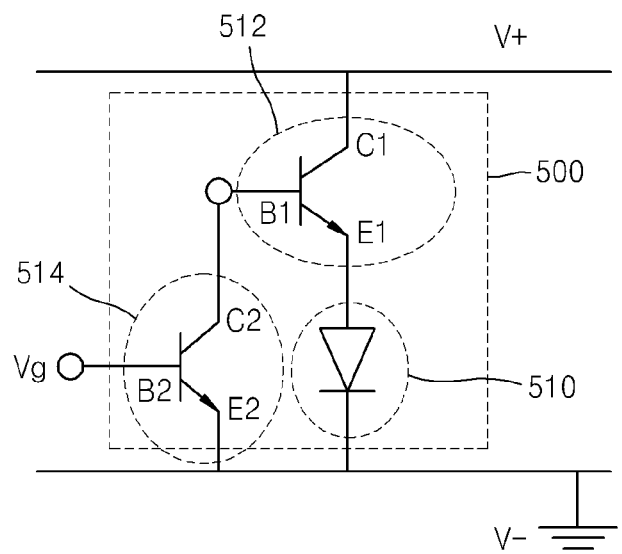
FIG. 40 is a circuit diagram of an optical modulator according to another exemplary embodiment of the present invention.

FIG. 40 is a circuit diagram of a fourth optical modulator 500 according to another exemplary embodiment of the present invention. Referring to FIG. 40, the fourth optical modulator 500 includes an HPT 512, an HBT 514, and a light emitting unit 510. The HPT 512 is an example of an optical-electric converter, and other optical-electric converters may also be used. The HPT 212 of the second optical modulator 200 has a 2-port structure in which an optical current is input to the first base B1 and is output to the emitter E1, whereas the HPT 512 of the fifth optical modulator 500 has a 3-port structure in which current may be applied to a first base B1. The HBT 514 is a gating transistor and is an example of a gating unit. Thus, other gating units instead of the HBT 514 may also be used. The structure of the HBT 514 may be the same as the HBT 214 of the second optical modulator 200. The structure and function of the light emitting unit 510 may be the same as those of the light emitting unit 248A of the second optical modulator 200. A voltage V+ is applied to a first collector C1 of the HPT 512, a first emitter E1 is connected to the light emitting unit 510, and a first base B1 is connected to a second collector C2 of the HBT 514. A voltage V− less than the voltage V+ may be applied to a second emitter E2 of the HBT 514 and a surface of the light emitting unit 510 from which light is emitted, or the second emitter E2 of the HBT 514 and the surface of the light emitting unit 510 from which light is emitted may be grounded. The HPT 512 has the 3-port structure as described above. Thus, the response speed of the fourth optical modulator 500 may be faster than other optical modulators such as the second optical modulator 200 including the HPT 212 having the 2-port structure.

Figure 41:
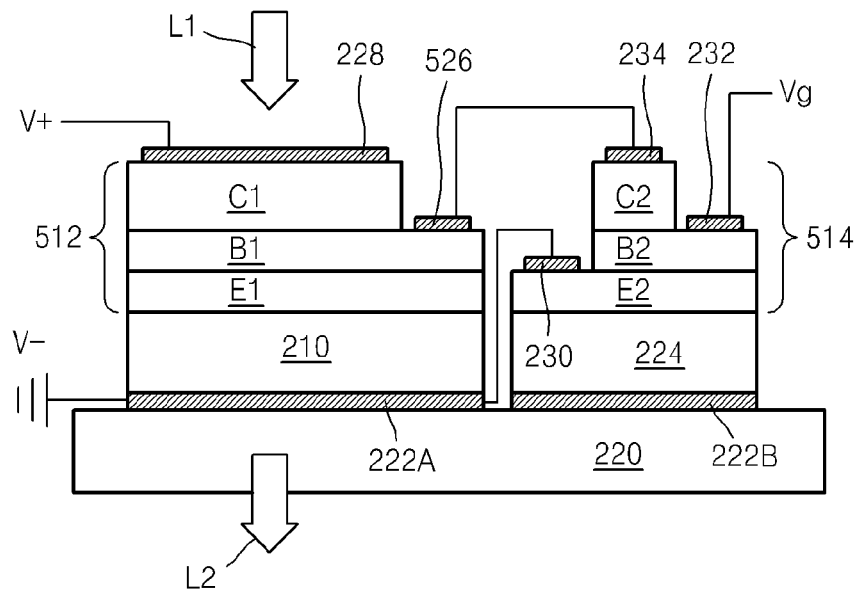
FIG. 41 is a cross-sectional view of an optical modulator that may be represented by the circuit diagram of FIG. 40, according to an exemplary embodiment of the present invention.

FIG. 41 is a cross-sectional view of the fourth optical modulator shown in FIG. 40, according to an exemplary embodiment of the present invention. Referring to FIG. 41, first and second lower electrodes 222A and 222B are disposed on a transparent substrate 220 to be separated from each other. A light emitting unit 210 and an HPT 512 are sequentially stacked on the first lower electrode 222A. The HPT 512 includes a first emitter E1, a first base B1, and a first collector C1, which are sequentially stacked on the light emitting unit 210. Incident light L1 is incident on the first collector C1. The first collector C1 may have a single layer structure or a multi-layer structure, as described with reference to FIG. 20A. The first collector C1 and a ninth electrode 526 are disposed on the first base B1. The first collector C1 and the ninth electrode 526 are separated from each other. A third electrode 228 is disposed on the first collector C1. A dummy pattern 224 that may have the same structure as that of the light emitting unit 210 and an HBT 514 are sequentially stacked on the second lower electrode 222B. The HBT 514 includes a second emitter E2, a second base B2, and a second collector C2, which are sequentially stacked on the dummy pattern 224. A fourth electrode 230 and the second base B2 are disposed on the second emitter E2. The fourth electrode 230 is separated from the second base B2. A fifth electrode 232 to which a gating voltage Vg is applied, is disposed on the second base B2. A sixth electrode 234 is disposed on the second collector C2. The sixth electrode 234 is connected to the ninth electrode 526. In this way, the first base B1 of the HPT 512 and the second collector C2 of the HBT 514 are electrically connected to each other. The first lower electrode 222A may be grounded, or a voltage V− less than the voltage V+ may be applied to the first lower electrode 222A. The fourth electrode 230 may be disposed to have the same electric potential as the first lower electrode 222A.

Figure 42:
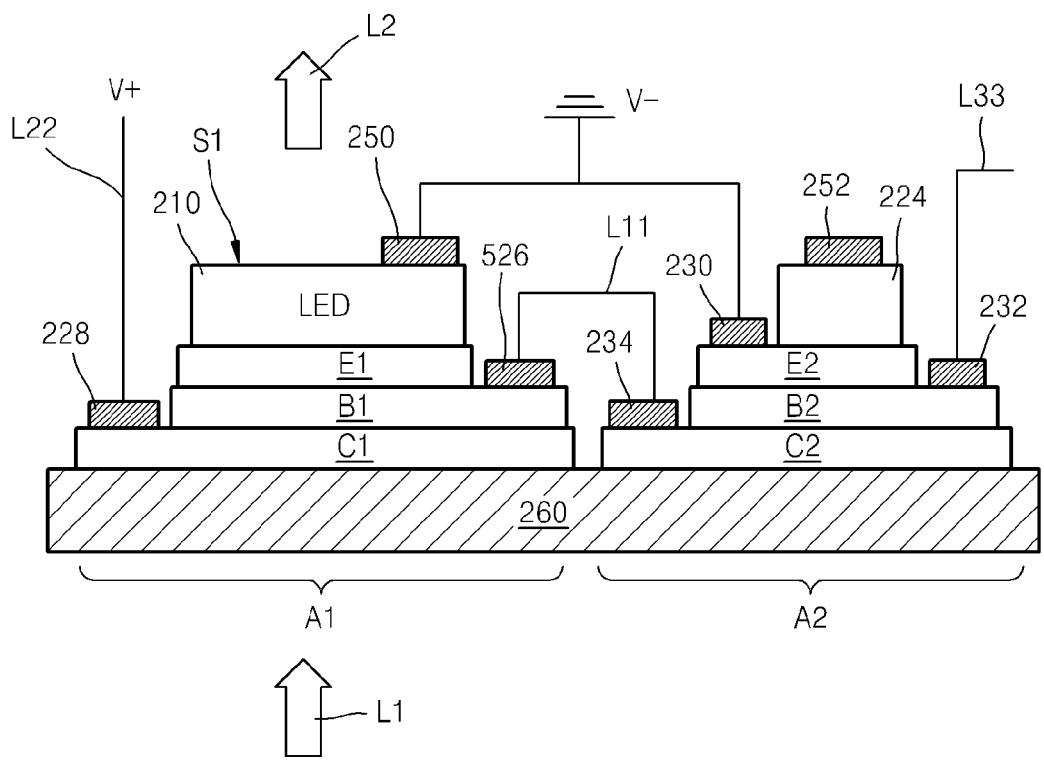
FIG. 42 is a cross-sectional view of an optical modulator that may be represented by the circuit diagram of FIG. 40, according to another exemplary embodiment of the present invention.

FIG. 42 is a cross-sectional view of the optical modulator shown in FIG. 40, according to another exemplary embodiment of the present invention. Referring to FIG. 42, a ninth electrode 526 and a first emitter E1 are disposed on a first base B1 of an HPT formed on a first area A1. The first emitter E1 and the ninth electrode 526 are separated from each other. The ninth electrode 526 is connected to a sixth electrode 234 formed on a second collector C2 of an HBT formed on a second area A2 of a base 260 via a wiring L11. In other words, the first base B1 of the HPT is connected to the second collector C2 of the HBT. Only a first emitting unit 210 is disposed on a first emitter E1 of the HPT.

The only difference between the fourth optical modulator of FIG. 42 and the second optical modulator of FIG. 20B is that, in the second optical modulator of FIG. 20B, the second collector C2 of the HBT is connected to the first emitter E1 of the HPT, whereas in the fourth optical modulator of FIG. 42, the second collector C2 of the HBT is connected to the first base B1 of the HPT, as described above, and the other structures of the fourth optical modulator of FIG. 42 and the second optical modulator of FIG. 20B are the same. Thus, remaining descriptions of the structure of the fourth optical modulator of FIG. 42 will not be provided here.

Also, the fourth optical modulator may also include the array illustrated in FIG. 36.

Since the structures of the fourth optical modulator and the second optical modulator are similar, in the method of manufacturing the second optical modulator of FIG. 20B, when the second electrode 226 formed on the first emitter E1 of the HPT is formed as the ninth electrode 526 on the first base B1, the method of manufacturing the second optical modulator of FIG. 20B (see FIGS. 29 through 33) may become the method of manufacturing the fourth optical modulator of FIG. 42. The second electrode 226 in another position as the ninth electrode 526 is formed by adjusting the order for forming electrodes and the positions of the electrodes, and thus forming the second electrode 226 in another position as the ninth electrode 526 is not difficult.

Thus, the fourth optical modulator of FIG. 42 may be manufactured by referring to FIGS. 29 through 33 which illustrate the method of manufacturing the second optical modulator of FIG. 20B. Thus, detailed descriptions of the method of manufacturing the fourth optical modulator of FIG. 42 will not be provided here.

For the similar reason, the fourth optical modulator of FIG. 41 may be manufactured by referring to FIGS. 21 through 28 which illustrate the method of manufacturing the second optical modulator of FIG. 20A. Thus, detailed descriptions of the method of manufacturing the fourth optical modulator of FIG. 41 will not be provided here.

The method of operating the fourth optical modulator will now be described with reference to FIGS. 40 and 41 or FIGS. 40 and 42. In the below-described method of operating the fourth optical modulator, the case that the first collector C1 of the HPT 512 includes a main collector and a subcollector will be described. The subcollector and the main collector are sequentially stacked on the first collector C1 toward an optical image sensor, and the main collector contacts the first base B1.

A voltage V+ is applied to the first collector C1 of the HPT 512, and a voltage V− that is lower than the voltage V+ is applied to the second emitter E2 of the HBT 514 and the light emitting unit 510. The second emitter E2 of the HBT 514 and the light emitting unit 510 may be grounded. In this state, when a gating voltage is not applied to the second base B2 of the HBT 514, i.e., when the HBT 514 is turned off, if light is incident on the HPT 512, for example, if incident light L1 is incident on the first area A1 of the substrate 260 of FIG. 42, photoelectrons are generated in the main collector of the first collector C1 due to a photoelectric effect, and the generated photoelectrons are moved to the subcollector. Holes are moved to the first base B1, and a Fermi level is decreased at the first base B1. In this way, the height of an electric potential barrier between the first base B1 and the first emitter E1 is decreased so that current is dispersed into the second base B2 from the first emitter E1 and thus is amplified. The amplified current flows through the light emitting unit 510, and light is emitted from the light emitting unit 510 by electro-optical conversion.

Meanwhile, when a voltage is applied to the HPT 512, the light emitting unit 510 and the HBT 514 and a gating voltage Vg is applied to the second base B2 of the HBT 514, as described above, the holes flow through the HBT 514 from the first base B1 of the HPT 512. As such, the Fermi level of the first base B1 is increased and electrons do not flow smoothly from the first emitter E1 of the HPT 512. As such, the operation of the light emitting unit 510 is stopped. A logic gating result or a sinusoidal gating result as illustrated in FIG. 35 may be attained according to the shape of the gating voltage signal applied to the second base B2 of the HBT 514.

An optical modulator (hereinafter, referred to as a fifth optical modulator) and methods of manufacturing and operating the fifth optical modulator, according to other exemplary embodiments of the present invention will now be described. Like reference numerals represent like elements as those described previously and thus, descriptions thereof will not be provided here.

Figure 43:
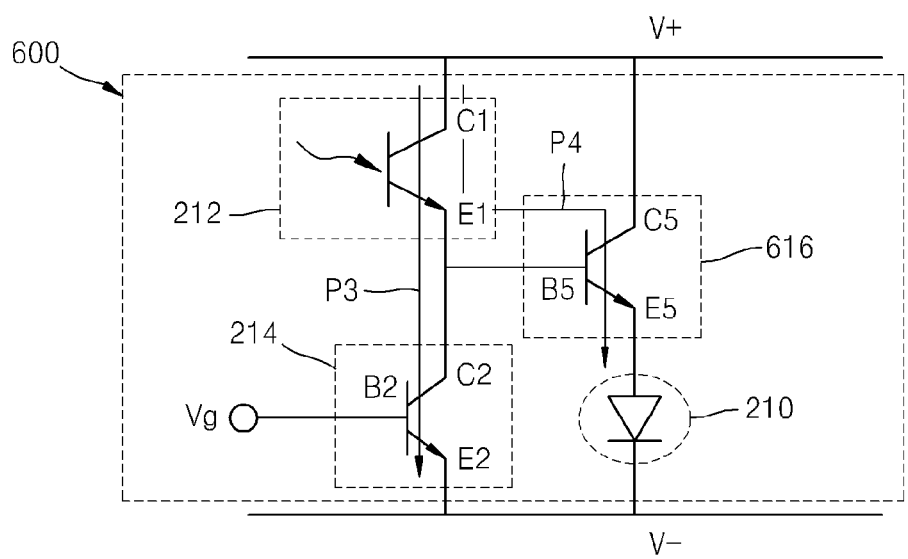
FIG. 43 is a circuit diagram for describing a gating operation of the optical modulator of FIG. 37, according to an exemplary embodiment of the present invention.

FIG. 43 is a circuit diagram of a fifth optical modulator 600 according to an exemplary embodiment of the present invention. Referring to FIG. 43, the fifth optical modulator 600 includes an HPT 212, a first HBT 214, a second HBT 616, and a light emitting unit 210. The HPT 212 and the first HBT 214 may be connected to each other in the same manner as in the second optical modulator. The second HBT 616 is an example of an amplification unit for amplifying the optical gain of the HPT 212. The fifth base B5 of the second HBT 616 is connected to the first emitter E1 of the HPT 212 and the second collector C2 of the first HBT 214. In this way, the second HBT 616 is provided so that the fifth optical modulator 600 may constitute a photo-darlington circuit that increases the optical gain of the HPT 212 up to about 100 times to about 1000 times as much as the optical gain of a conventional HPT. The fifth emitter E5 of the second HBT 616 is connected to the light emitting unit 210. A fifth collector C5 of the second HBT 616 and the first collector C1 of the HPT 212 are supplied with a voltage V+ and have the same electric potential. A voltage V− less than the voltage V+ is applied to a surface of the second emitter E2 of the first HBT 214 and a surface of the light emitting unit 210 from which light is emitted, so that the second emitter E2 of the first HBT 214 and the light emitting unit 210 have the same electric potential. The surface of the second emitter E2 of the first HBT 214 and the surface of the light emitting unit 210 from which light is emitted may also be grounded.

A gating operation of the fifth optical modulator will now be described.

When voltages are applied to the HPT 212, the second HBT 616 and the light emitting unit 210, as illustrated in FIG. 43 and a gating voltage Vg is applied to the second base B2 of the first HBT 214 as a gate transistor and the first HBT 214 is in an on state, charges generated in the HPT 212 do not flow through the second HBT 616 but flow through the first HBT 214 having a low impedance along a third path P3. As such, the light emitting unit 210 does not operate.

If the gating voltage Vg is not applied to the second base B2 of the first HBT 214, the first HBT 214 is in an off state, and charges generated in the HPT 212 flow through the second HBT 616 along a fourth path P4. The charges that flow through the second HBT 616 are amplified, and the amplified charges flow through the light emitting unit 210, and the light emitting unit 210 is driven. Logic gating or sinusoidal gating may be performed according to a method of applying a gating voltage.

The fifth optical modulator 600 may attain an optical-electric conversion gain from the HPT 212 and a current gain from the second HBT 616 and thus, may have a higher performance than the fourth optical modulator 500 in terms of gain. On the other hand, a time delay of the fourth optical modulator 500 in transmission of a gating signal may be less than that of the fifth optical modulator 600 and thus, the fourth optical modulator 500 may have a higher performance than the fifth optical modulator 600. However, in consideration of the square of a gain and a bandwidth, an off response characteristic of the fifth optical modulator 600 may be higher than that of the fourth optical modulator 500.

Owing to the optical signal amplification and gating function, the fifth optical modulator 600 may be used as a gated image intensifier. In other words, the fifth optical modulator 600 may amplify incident light having low intensity to perform a high speed gating operation. Thus, by using the fifth optical modulator 600, the number of accumulation of the quantity of light may be reduced in the CCD camera and many images may be captured so that an accuracy of distance measurement may be improved.

Figure 44:
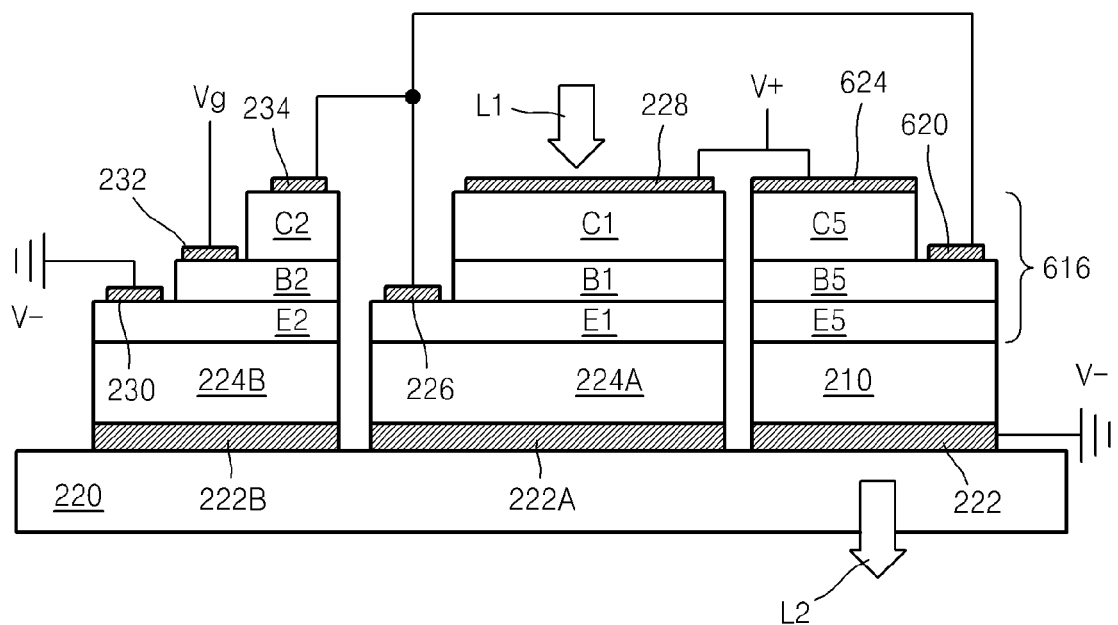
FIG. 44 is a cross-sectional view of an optical modulator that may be represented by the circuit diagram of FIG. 43, according to an exemplary embodiment of the present invention.

FIG. 44 is a cross-sectional view of a fifth optical modulator that may be represented by the circuit diagram of FIG. 43, according to an exemplary embodiment of the present invention. Referring to FIG. 44, first through third lower electrodes 222A, 222B, and 222C are disposed on a transparent substrate 220 to be separated from one another. The first through third lower electrodes 222A, 222B, and 222C may be ITO, ZnO or AZO electrodes. A first dummy light emitting unit 224A may be disposed on the first lower electrode 222A. The structure of the first dummy light emitting unit 224A may be the same as or different from the light emitting unit 210 formed on the third lower electrode 222C. The first lower electrode 222A may contact only a portion of a bottom surface of the first dummy light emitting unit 224A. In this case, the other portions of the bottom surface of the first dummy light emitting unit 224A may directly contact the transparent substrate 220. However, the first lower electrode 222A may not be included. A first emitter E1, a first base B1, and a first collector C1 are sequentially stacked on the first dummy light emitting unit 224A. The first collector C1 may have a single layer or multi-layer structure. The first emitter E1 may also have a single layer or multi-layer structure. The first emitter E1, the base B1, and the first collector C1 constitute an HPT 212. A second electrode 226 and the first base B1 are disposed on the first emitter E1. The second electrode 226 is separated from the first base B1. A third electrode 228 is disposed on the first collector C1. The third electrode 228 may be an upper electrode. The third electrode 228 may cover the entire top surface of the first collector C1 or may be disposed only in a portion of the top surface of the first collector C1. Incident light L1 is incident on the top surface of the first collector C1. A second dummy light emitting unit 224B may be disposed on the second lower electrode 222B. The structure of the second dummy light emitting unit 224B may be the same as that of the first dummy light emitting unit 222A. The second lower electrode 222B may contact only a portion of the bottom surface of the second dummy light emitting unit 224B. However, the second lower electrode 222B may not be included. A second emitter E2, a second base B2 and a second collector C2 are sequentially stacked on the second dummy light emitting unit 224B. The structure of the second emitter E2, the second base B2 and the second collector C2 may be the same as that of the first emitter E1, the first base B1 and the first emitter E1. The second emitter E2, the second base B2 and the second collector C2 constitute an HBT 214. A fourth electrode 230 and the second base B2 are disposed on the second emitter E2. The fourth electrode 230 may be grounded, or a voltage V− less than the voltage V+ may be applied to the fourth electrode 230. A fifth electrode 232 and the second collector C2 are disposed on the second base B2. A gating voltage Vg is applied to the fifth electrode 232. A sixth electrode 234 is disposed on the second collector C2. The sixth electrode 234 may be an upper electrode. The sixth electrode 234 is connected to the second electrode 226. A light emitting unit 210 is disposed on the third lower electrode 222C. Light L2 emitted from the light emitting unit 210 is emitted via the substrate 220. Although the third lower electrode 222C contacts the entire bottom surface of the light emitting unit 210, the third lower electrode 222C may contact only a portion of the bottom surface of the light emitting unit 210. The third lower electrode 222C has the same electric potential as that of the fourth electrode 230. Although not shown, the third lower electrode 222C may be connected to the fourth electrode 230 via a wiring. A second HBT 616 is disposed on the light emitting unit 210. The second HBT 616 includes a fifth emitter E5, a fifth base B5, and a fifth collector C5, which are sequentially stacked on the light emitting unit 210. The structure of the fifth emitter E5, the fifth base B5 and the fifth collector C5 may be the same as that of the first emitter E1, the first base B1 and the first collector C1. A tenth electrode 620 and the fifth collector C5 are disposed on the fifth base B5. The tenth electrode 620 is separated from the fifth collector C5. The tenth electrode 620 may be formed of the same material as that of the second electrode 226.

The tenth electrode 620 is electrically connected to the second electrode 226 and the sixth electrode 234 via a wiring. An eleventh electrode 624 is disposed on the fifth collector C5. The eleventh electrode 624 may be an upper electrode. The eleventh electrode 624 may be formed of the same material as that of the third electrode 228. The eleventh electrode 624 is connected to the third electrode 228 via a wiring. The wiring for connecting the eleventh electrode 624 and the third electrode 228 is connected to the voltage V+.

Figure 45:
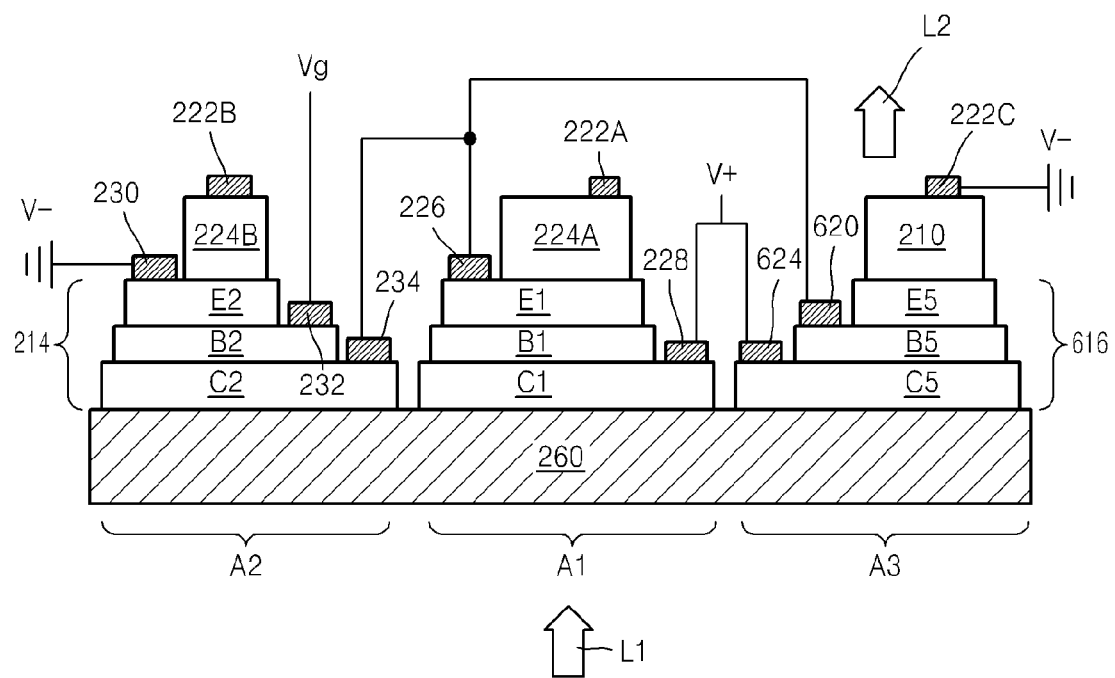
FIG. 45 is a cross-sectional view of an optical modulator that may be represented by the circuit diagram of FIG. 43, according to another exemplary embodiment of the present invention.

FIG. 45 is a cross-sectional view of a fifth optical modulator that may be represented by the circuit diagram of FIG. 43, according to another exemplary embodiment of the present invention. Referring to FIG. 45, an HPT and a first dummy light emitting unit 224A are sequentially stacked on a first area A1 of a transparent substrate 260. A third electrode 228 and a first base B1 are disposed on a first collector C1. A second electrode 226 and a first dummy light emitting unit 224A are disposed on a first emitter E1. The second electrode 226 is separated from the first dummy light emitting unit 224A. A first lower electrode 222A is disposed on a top surface of the first dummy light emitting unit 224A. An HBT 214 and a second dummy light emitting unit 224B are sequentially stacked on a second area A2 of the transparent substrate 260. The HBT 214 includes a second collector C2, a second base B2 and a second emitter E2, which are sequentially stacked on the transparent substrate 260. A sixth electrode 234 and a second base B2 are disposed on the second collector C2 to be separated from each other. A fifth electrode 232 and the second emitter E2 are disposed on the second base B2 to be separated from each other. A fourth electrode 230 and a second dummy light emitting unit 224B are disposed on the second emitter E2 to be separated from each other. A second HBT 616 and the light emitting unit 210 are sequentially stacked on a third area A3 of the transparent substrate 260. The second HBT 616 includes a fifth collector C5, a fifth base B5, and a fifth emitter E5, which are sequentially stacked on the transparent substrate 260. An eleventh electrode 624 and the fifth base B5 are disposed on the fifth collector C5 to be separated from each other. A tenth electrode 620 and the fifth emitter E5 are disposed on the fifth base B5 to be separated from each other. The light emitting unit 210 is disposed on the fifth emitter E5. A third lower electrode 222C is disposed on a surface of the light emitting unit 210 from which light is emitted. States in which voltages are applied to the fourth electrode 230, the fifth electrode 232, the third electrode 228, the eleventh electrode 624, and the third lower electrode 222C, respectively, are the same as those of FIG. 44. Also, the relationship between the electrodes may be the same as that of FIG. 44. The HPT, the HBT 214, the second HBT 616, and the light emitting unit 210, which are disposed on the first through third areas A1, A2, and A3 of the transparent substrate 260, constitute a unit pixel. A plurality of unit pixels may constitute an array such as the array 350 of FIG. 36. The incident light L1 is incident on the first area A1 of the transparent substrate 260. Light L2 is emitted from the light emitting unit 210. The light L2 is emitted by performing a gating operation.

A method of manufacturing the fifth optical modulator will now be described.

First, a method of manufacturing the fifth optical modulator having the structure of FIG. 44 will be described with reference to FIGS. 46 through 53. In this procedure, like reference numerals represent like elements as those described above, and descriptions thereof will not be provided here.

FIGS. 46 through 53 are cross-sectional views illustrating a method of manufacturing the fifth optical modulator shown in FIG. 44, according to an exemplary embodiment of the present invention.

Figure 46:
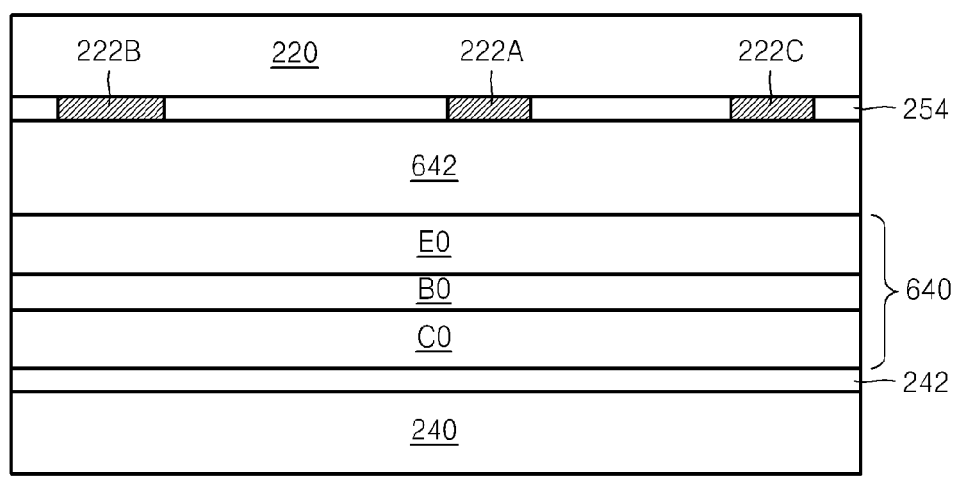
FIGS. 46 through 53 are cross-sectional views illustrating a method of manufacturing the optical modulator shown in FIG. 44, according to another exemplary embodiment of the present invention.

Referring to FIG. 46, a separation layer 242 is formed on a substrate 240. A heterojunction transistor layer 640 and a light emitting unit layer 642 are sequentially formed on the separation layer 242. The heterojunction transistor layer 640 is formed by sequentially stacking a collector layer C0, a base layer B0, and an emitter layer E0 on the separation layer 242. In this case, the collector layer C0 may be formed as a single layer or by sequentially stacking a subcollector layer (not shown) and a main collector layer (not shown). The emitter layer E0 may also be formed as a single layer or multi-layer structure like the collector layer C0. The light emitting unit layer 642 may be the same as the light emitting unit layer 248 of FIG. 21. A tunnel junction layer (not shown) may be further disposed between the heterojunction transistor layer 640 and the light emitting unit layer 642. First through third lower electrodes 222A, 222B, and 222C are disposed on the light emitting unit layer 642 to be separated from one another. A transparent insulating layer 254 is disposed on the light emitting unit layer 642 so as to cover the first through third lower electrodes 222A, 222B, and 222C. The top surface of the transparent insulating layer 254 is planarized until the first through third lower electrodes 222A, 222B, and 222C are exposed. A transparent substrate 220 is bonded to the planarized transparent insulating layer 254 so as to contact the exposed first through third lower electrodes 222A, 222B, and 222C.

Meanwhile, the first through third lower electrodes 222A, 222B, and 222C may be buried in the light emitting unit layer 642. For example, when the light emitting unit layer 642 is formed by sequentially stacking a P type compound semiconductor layer, an active layer, and an N type compound semiconductor layer on the emitter layer E0, the first through third lower electrodes 222A, 222B, and 222C may be formed so that three sides of each of the first through third lower electrodes 222A, 222B, and 222C are buried in the N type compound semiconductor layer. In this case, the transparent substrate 220 may be directly bonded to the N type compound semiconductor so as to contact the first through third lower electrodes 222A, 222B, and 222C.

Figure 47:
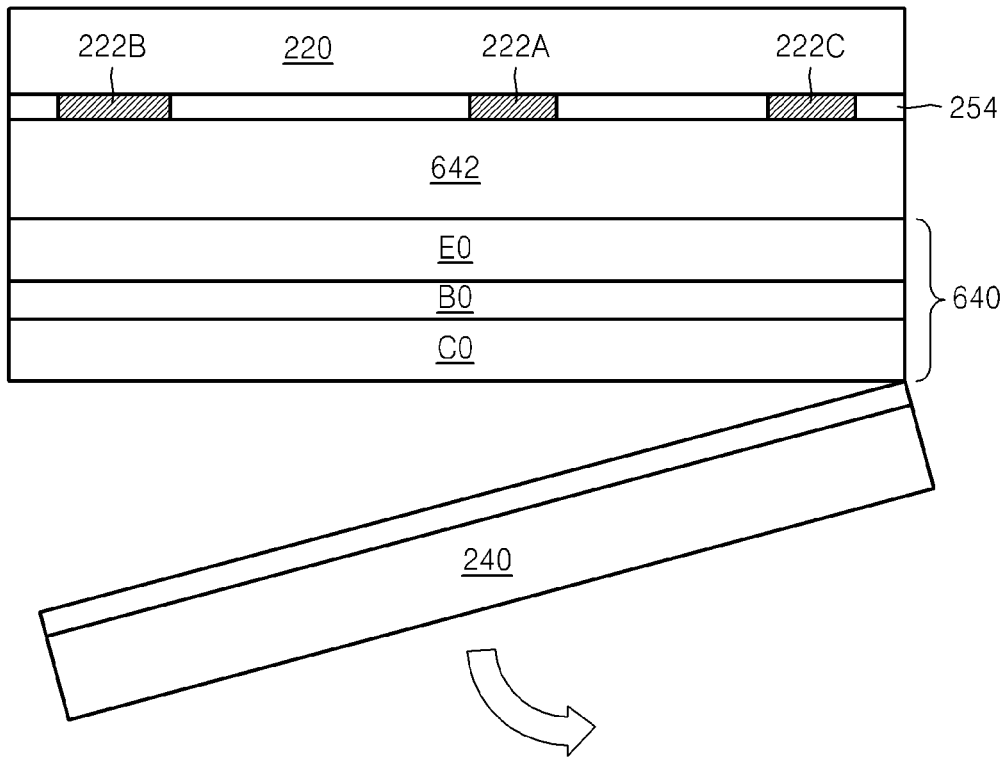

Referring to FIG. 47, the substrate 240 is removed from the resultant structure in which the transparent substrate 220 is bonded, by using the separation layer 242. After that, the resultant structure from which the substrate 240 is removed, is inverted so that the transparent substrate 220 may be disposed under the light emitting unit layer 642.

Figure 48:
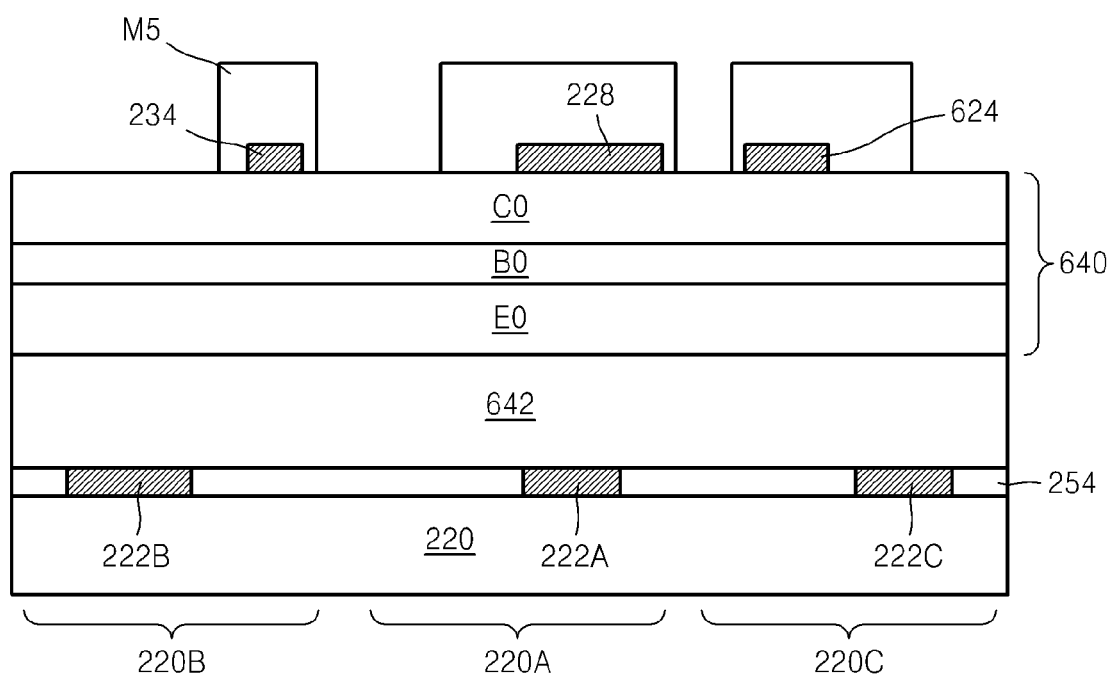

Referring to FIG. 48, first through third areas 220A, 220B, and 220C are defined in the transparent substrate 220. A third electrode 228, a sixth electrode 234, and an eleventh electrode 624 are formed on the collector layer C0 of the heterojunction transistor layer 640 to be separated from one another. The third electrode 228 is disposed in the first area 220A of the transparent substrate 220. The sixth electrode 234 is disposed in the second area 220B of the transparent substrate 220. The eleventh electrode 624 is disposed in the third area 220C of the transparent substrate 220. A mask M5 is formed on the collector layer C0 so as to cover three portions of the collector layer C0, i.e., the third electrode 228, the sixth electrode 234, and the eleventh electrode 624, and so as to expose spaces therebetween. The three portions of the collector layer C0 covered by the mask M5 are present on the first through third areas 220A, 220B, and 220C. Each of the third electrode 228, the sixth electrode 234, and the eleventh electrode 624 is disposed in each of the three portions of the collector C0 covered by the mask M5. As such, the mask M5 covers the third electrode 228, the sixth electrode 234, and the eleventh electrode 624 and a portion of the collector layer C0 around each of the third electrode 228, the sixth electrode 234, and the eleventh electrode 624. An area to be included in an HPT (see 212 of FIG. 53) of the fifth optical modulator, an area to be included in a first HBT (see 214 of FIG. 53) as a gate transistor, and an area to be included in a second HBT (see 616 of FIG. 53) as an amplification transistor are defined by the mask M5 in the collector layer C0. After the mask M5 is formed in this manner, the collector layer C0 around the mask M5 is etched until the base layer B0 is exposed. In this way, the collector layer C0 is divided into a first collector C1, a second collector C2, and a fifth collector C5 that will be described below with reference to FIG. 49.

Figure 49:
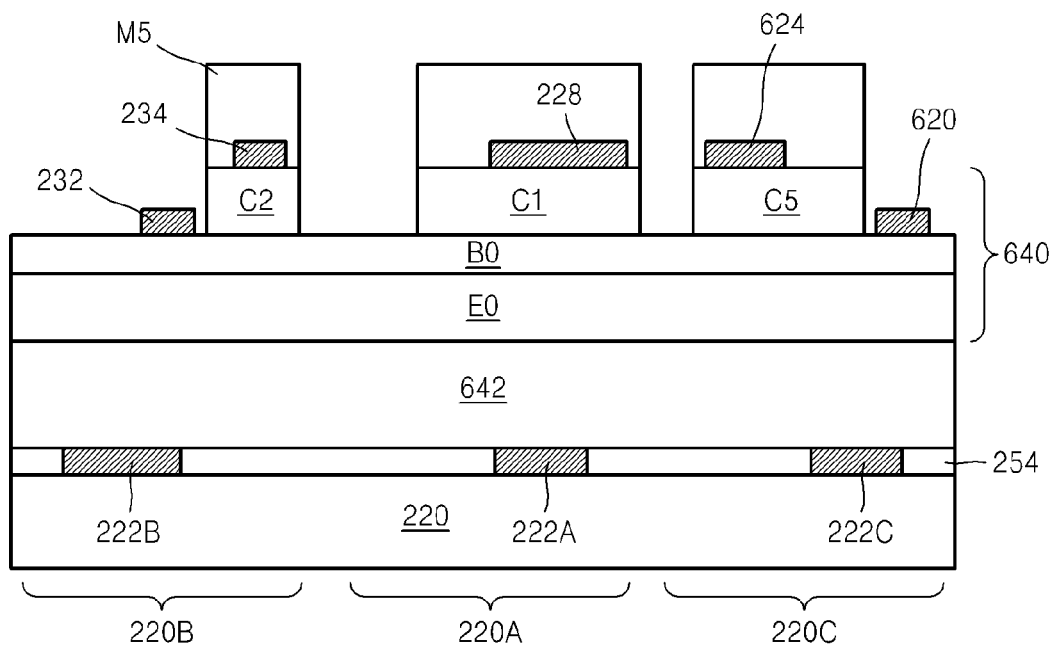

Referring to FIG. 49, after the first collector C1, the second collector C2, and the fifth collector C5 are formed, the mask M5 is removed. Subsequently, a fifth electrode 232 is disposed in a portion of the base layer B0 that corresponds to the second area 220B of the transparent substrate 220. The fifth electrode 232 is separated from the second collector C2. A tenth electrode 620 is disposed in a portion of the base layer B0 that corresponds to the third area 220C of the transparent substrate 220. The tenth electrode 620 is separated from the fifth collector C5. The fifth electrode 232 and the tenth electrode 620 may be formed by forming a mask (not shown) that exposes only a portion in which an electrode is to be disposed, i.e., a photosensitive layer pattern on the base layer B0, by forming an electrode material in the exposed portion of the base layer B0 and then by performing a process of removing the photosensitive layer pattern, i.e., a lift-off process.

Figure 50:
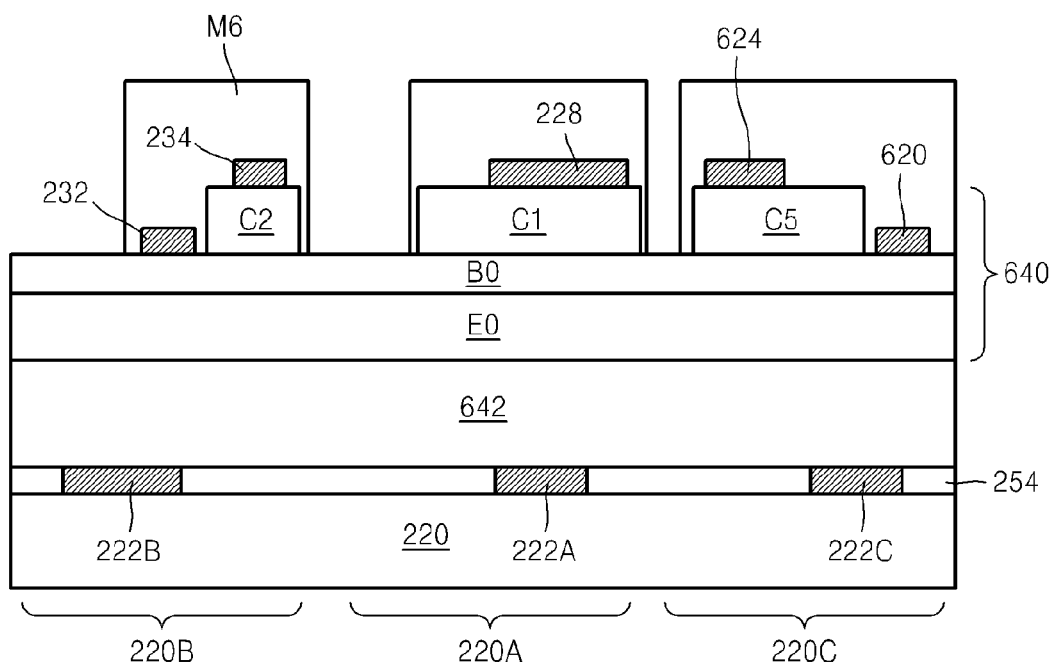

Referring to FIG. 50, a mask M6 is formed on the base layer B0. The mask layer M6 may be a photosensitive layer pattern. The mask M6 covers the second electrode 226 and the first collector C1 in the portion of the base layer B0 that corresponds to the first area 220A of the transparent substrate 220 and exposes the other portions of the base layer B0. Also, the mask M6 covers the fifth and sixth electrodes 232 and 234 and the second collector C2 in the portion of the base layer B0 that corresponds to the second area 220B of the transparent substrate 220, covers spaces between the fifth electrode 232 and the second collector C2, and exposes the other portions of the base layer B0. Also, the mask M6 covers the tenth and eleventh electrodes 620 and 624 and the fifth collector C5 in the portion of the base layer B0 that corresponds to the third area 220C of the transparent substrate 220, covers spaces between the tenth electrode 620 and the fifth collector C5, and exposes the other portions of the base layer B0. After the mask M6 is formed in this manner, the portion of the base layer B0 outside the mask M6 is etched until the emitter layer E0 is exposed. After that, the mask M6 is removed. By performing the etching process, the base layer B0 is divided into first, second, and fifth bases B1, B2, and B5 that are separated from one another, which will be described below with reference to FIG. 51.

Figure 51:
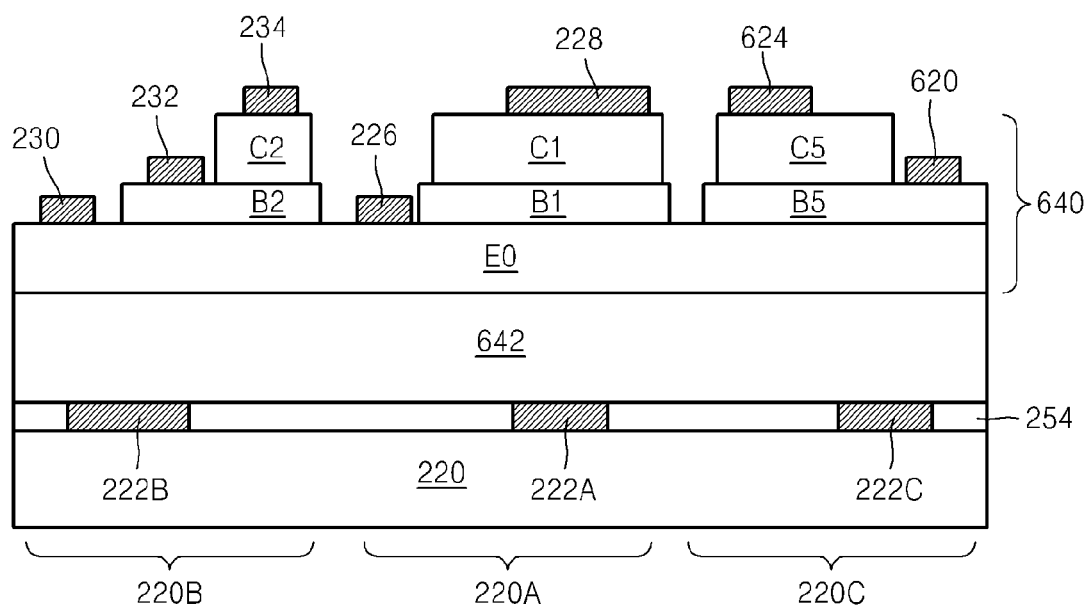

Referring to FIG. 51, the fourth electrode 230 and the second electrode 226 are disposed in a portion of the emitter layer E0 that is exposed by the etching process. The fourth electrode 230 is disposed in a portion that corresponds to the second area 220B of the emitter layer E0. In this case, the fourth electrode 230 is separated from the second base B2. The second electrode 226 is disposed in a portion that corresponds to the first area 220A of the emitter layer E0. In this case, the second electrode 226 is separated from the first base B1. The second and fourth electrodes 226 and 230 may be formed by performing the lift-off process.

Figure 52:
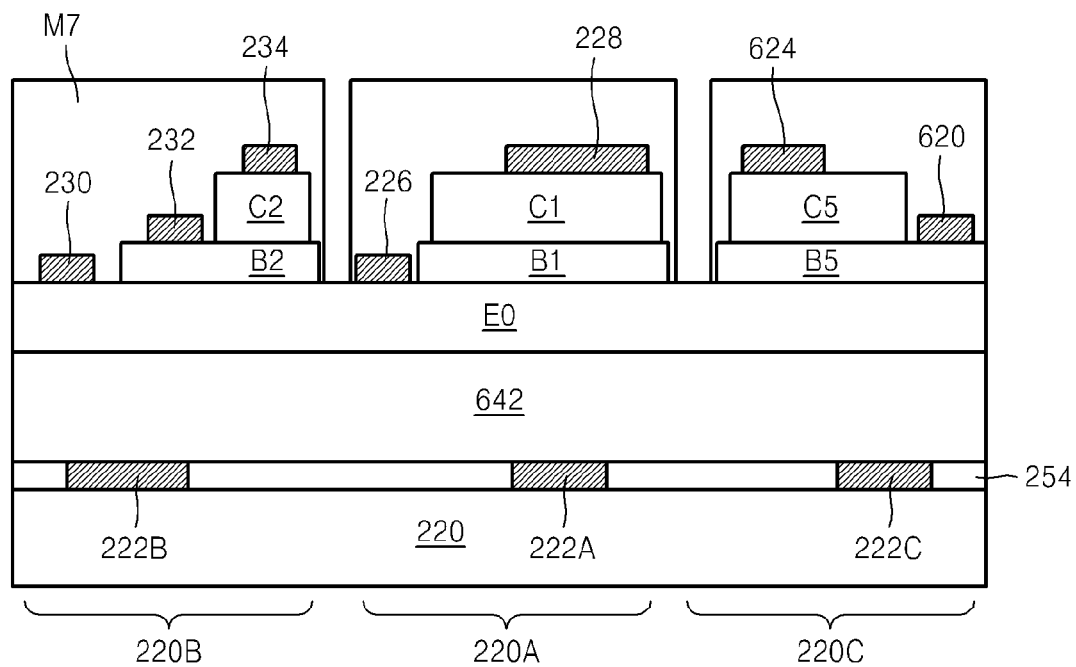

Referring to FIG. 52, a mask M7 is formed on the emitter layer E0 so as to cover elements formed on the emitter layer E0. The mask M7 may be a photosensitive layer pattern. The mask M7 covers the second and third electrodes 226 and 228, the first collector C1 and the first base B1 in the portion of the emitter layer E0 that corresponds to the first area 220A of the transparent substrate 220, covers spaces between the second electrode 226 and the first base B1, and exposes the other portions of the emitter layer E0. Also, the mask M7 covers the fourth through sixth electrodes 230, 232, and 234, the second collector C2, and the second base B2 in the portion of the emitter layer E0 that corresponds to the second area 220B of the transparent substrate 220, covers spaces between the fourth electrode 230 and the second base B2, and exposes the other portions of the emitter layer E0. Also, the mask M7 covers the tenth and eleventh electrodes 620 and 624, the fifth collector C5 and the fifth base B5 in the portion of the emitter layer E0 that corresponds to the third area 220C of the transparent substrate 220 and exposes the other portions of the emitter layer E0. After the mask M7 is formed in this manner, the emitter layer E0 outside the mask M7 is etched until the transparent substrate 220 is exposed. After that, the mask M7 is removed. By performing the etching process, the emitter layer E0 is divided into first, second, and fifth emitters E1, E2, and E5 that will be described below with reference to FIG. 53.

Figure 53:
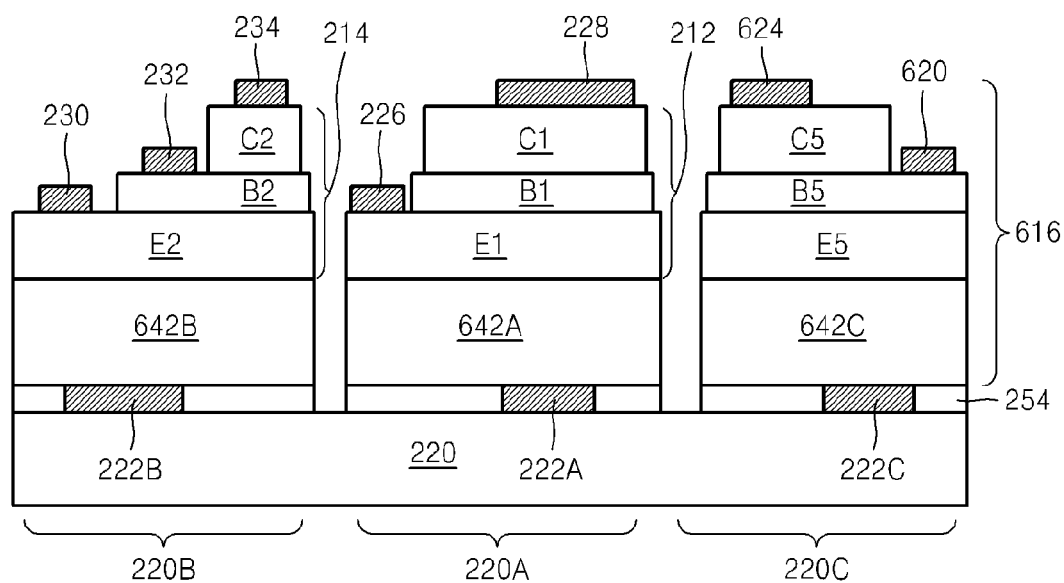

Referring to FIG. 53, the light emitting unit layer 642 is divided into first through third light emitting units 642A, 642B, and 642C. The first and second light emitting units 642A and 642B correspond to the first and second dummy light emitting units 224A and 224B of FIG. 44, respectively. The third light emitting unit 642C corresponds to the light emitting unit 210 of FIG. 44. By performing the etching process using the mask M7, an HPT 212 is disposed in the first area 220A of the transparent substrate 220, and an HBT that is a gate transistor is disposed in the second area 220B of the transparent substrate 220. A second HBT 616 is disposed in the third area 220C of the transparent substrate 220. After that, a wiring formation process of connecting electrodes, as illustrated in FIG. 44, may be performed. The wiring formation process may be performed using a general method.

A method of manufacturing the fifth optical modulator having the structure of FIG. 45 will now be described with reference to FIGS. 54 through 63. In this procedure, like reference numerals represent like elements as those described above, and descriptions thereof will not be provided here.

FIGS. 54 through 63 are cross-sectional views illustrating a method of manufacturing the fifth optical modulator shown in FIG. 45, according to an exemplary embodiment of the present invention.

Figure 54:
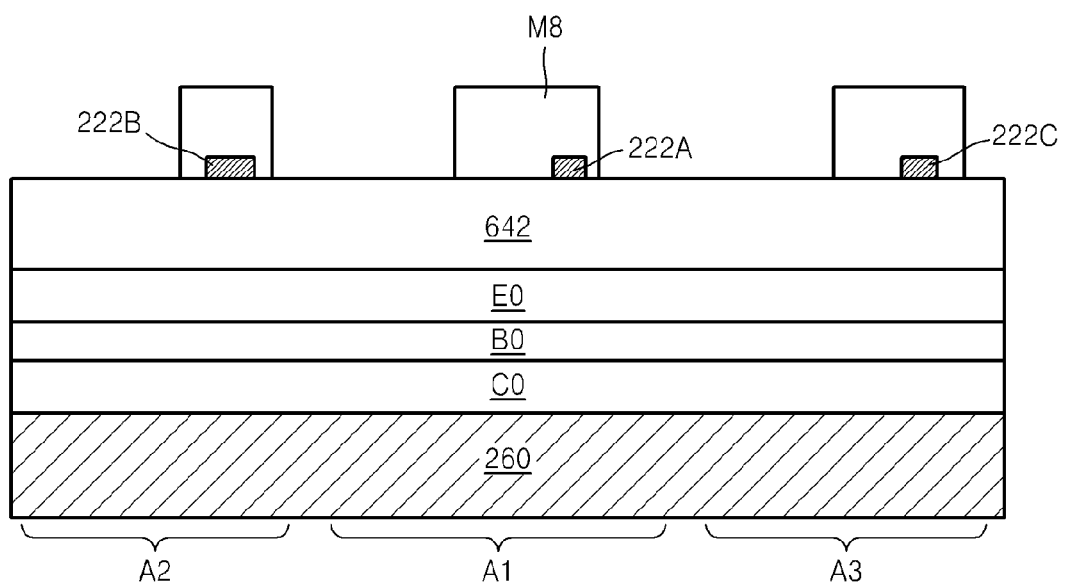
FIGS. 54 through 63 are cross-sectional views illustrating a method of manufacturing the optical modulator shown in FIG. 45, according to another exemplary embodiment of the present invention.
Figure 55:
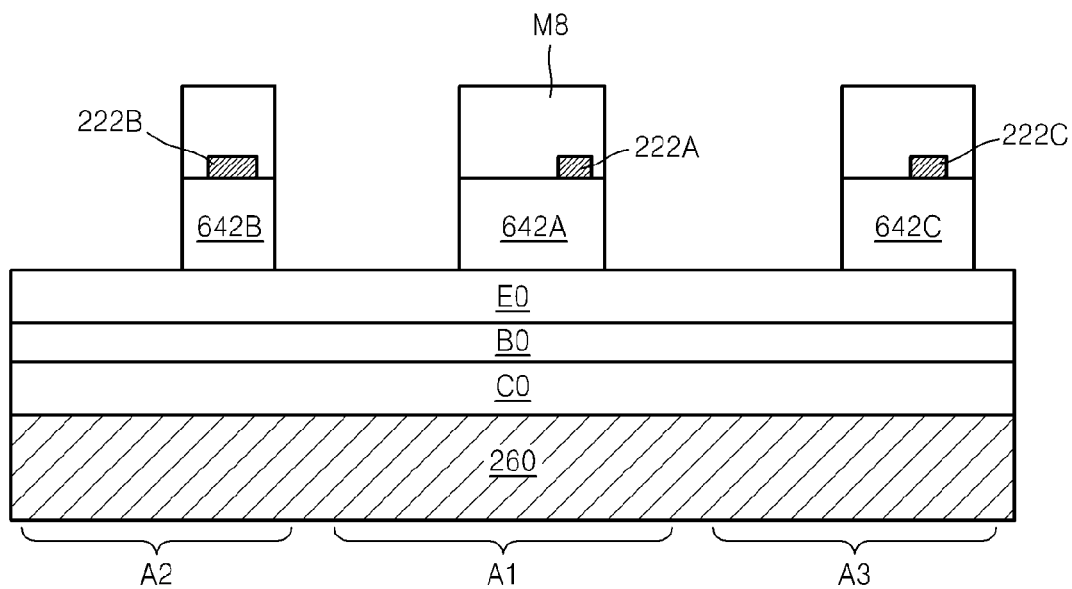

Referring to FIG. 54, a collector layer C0, a base layer B0, and an emitter layer E0 are sequentially formed on a transparent substrate 260. A light emitting unit layer 642 is formed on the emitter layer E0. First through third lower electrodes 222A, 222B, and 222C are formed on the light emitting unit layer 642 to be separated from one another. The first and second lower electrodes 222A and 222B may not be formed. The first through third lower electrodes 222A, 222B, and 222C are formed in a portion of the light emitting unit layer 642 that corresponds to the first through third areas A1, A2, and A3 of the transparent substrate 260. Descriptions of the first through third lower electrodes 222A, 222B, and 222C may be the same as those of FIG. 46. A mask M8 is formed on the light emitting unit layer 642. The mask M8 may be a photosensitive layer pattern. The mask M8 covers the first lower electrode 222A and a portion of the light emitting unit layer 642 outside the first lower electrode 222A in the first area A1 of the transparent substrate 260 and exposes the other portions of the light emitting unit layer 642. The mask M8 covers the second lower electrode 222B and a portion of the light emitting unit layer 642 outside the second lower electrode 222B in the second area A2 of the transparent substrate 260 and exposes the other portions of the light emitting unit layer 642. Also, the mask M8 covers the third lower electrode 222C and a portion of the light emitting unit layer 642 outside the third lower electrode 222C in the third area A3 of the transparent substrate 260 and exposes the other portions of the light emitting unit layer 642. Subsequently, the portion of the light emitting unit layer 642 outside the mask M8 is etched until the emitter layer E0 is exposed. By performing the etching process, the light emitting unit layer 642 is divided into first through third light emitting units 642A, 642B, and 642C, as illustrated in FIG. 55. The first and second light emitting units 642A and 642B correspond to first and second dummy light emitting units 224A and 224B, respectively, and the third light emitting unit 642C corresponds to the light emitting unit 210. After the etching process is performed, the mask M8 is removed.

Figure 56:
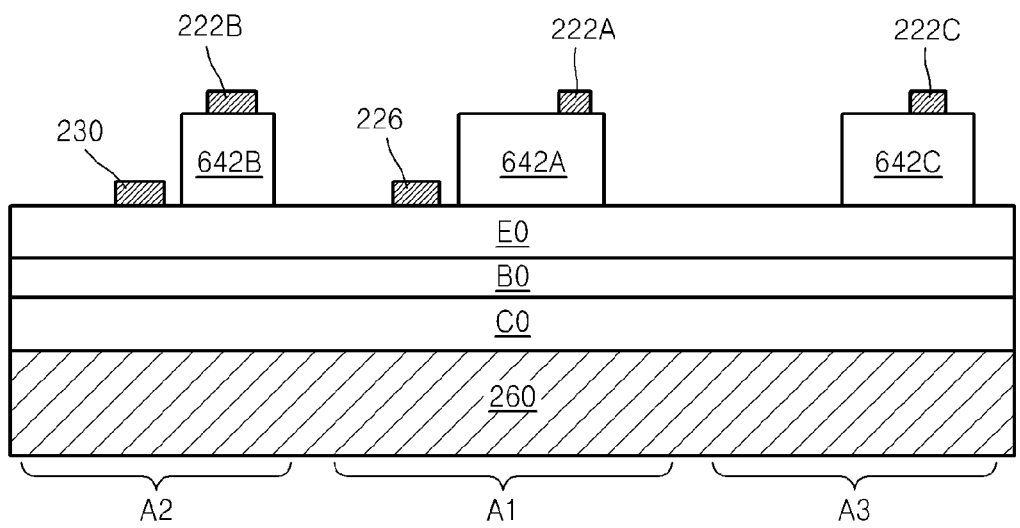

Referring to FIG. 56, a second electrode 226 and a fourth electrode 230 are formed on the emitter layer E0. The second electrode 226 is formed in a portion of the emitter layer E0 that corresponds to the first area A1 of the transparent substrate 260, and is separated from the first light emitting unit 642A. The fourth electrode 230 is formed in a portion of the emitter layer E0 that corresponds to the second area A2 of the transparent substrate 260, and is separated from the second light emitting unit 642B. The second electrode 226 and the fourth electrode 230 may be formed by using the above-described lift-off process.

Figure 57:
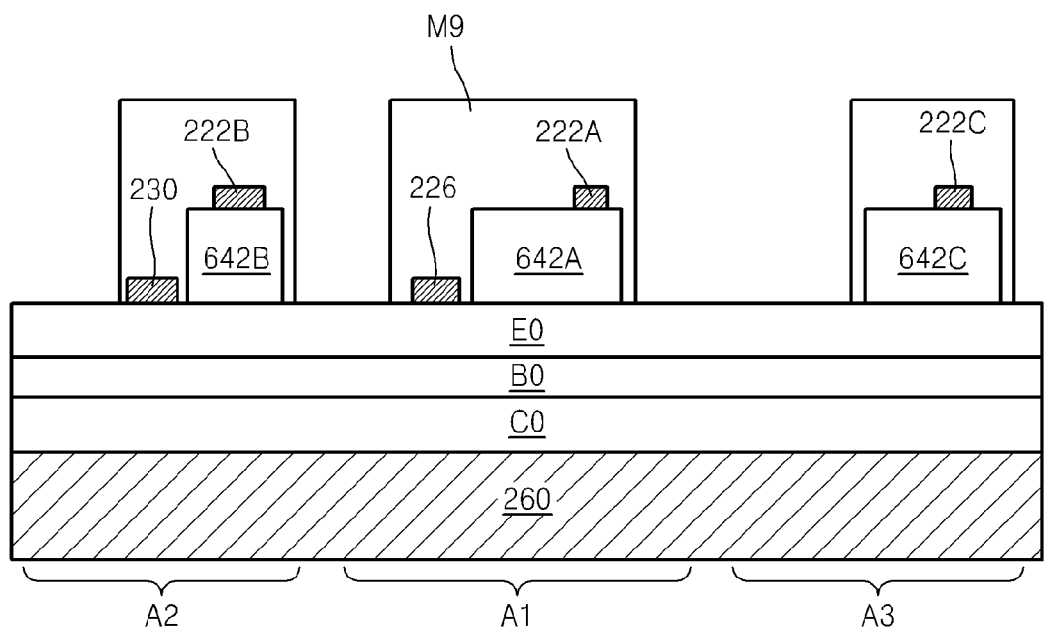

Referring to FIG. 57, a mask M9 is formed on the emitter layer E0 so as to cover elements formed on the emitter layer E0. The mask M9 may be a photosensitive layer pattern. The mask M9 is formed in three portions of the emitter layer E0 that correspond to the first through third areas A1, A2, and A3 of the transparent substrate 260. The mask M9 covers the first light emitting unit 642A, the first lower electrode 222A, and the second electrode 226 in the first area A1 of the transparent substrate 260 and covers spaces between the second electrode 226 and the first light emitting unit 642A. Also, the mask M9 covers the second light emitting unit 642B, the second lower electrode 222B, and the fourth electrode 230 in the second area A2 of the transparent substrate 260 and covers spaces between the fourth electrode 230 and the second light emitting unit 642B. Also, the mask M9 covers the third light emitting unit 642C and the third lower electrode 222C in the third area A3 of the transparent substrate 260. After the mask M9 is formed, the portion of the emitter layer E0 outside the mask M9 is etched until the base layer B0 is exposed. After the etching process is performed, the mask M9 is removed. By performing the etching process, the emitter layer E0 is divided into first, second, and fifth emitters E1, E2, and E5, as illustrated in FIG. 58.

Figure 58:
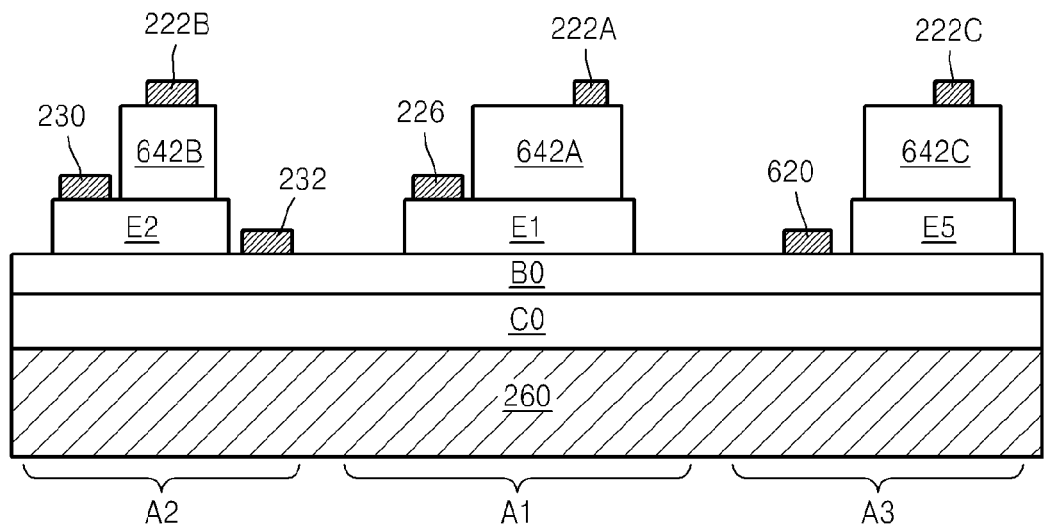

Referring to FIG. 58, a fifth electrode 232 and a tenth electrode 620 are formed on the exposed portion of the base layer B0. The fifth electrode 232 is formed in the first area A1 of the transparent substrate 260 and is separated from the second emitter E2. The tenth electrode 620 is formed in the third area A3 of the transparent substrate 260 and is separated from the fifth emitter E5. The fifth electrode 232 and the tenth electrode 620 may be formed by using the above-described lift-off process.

Figure 59:
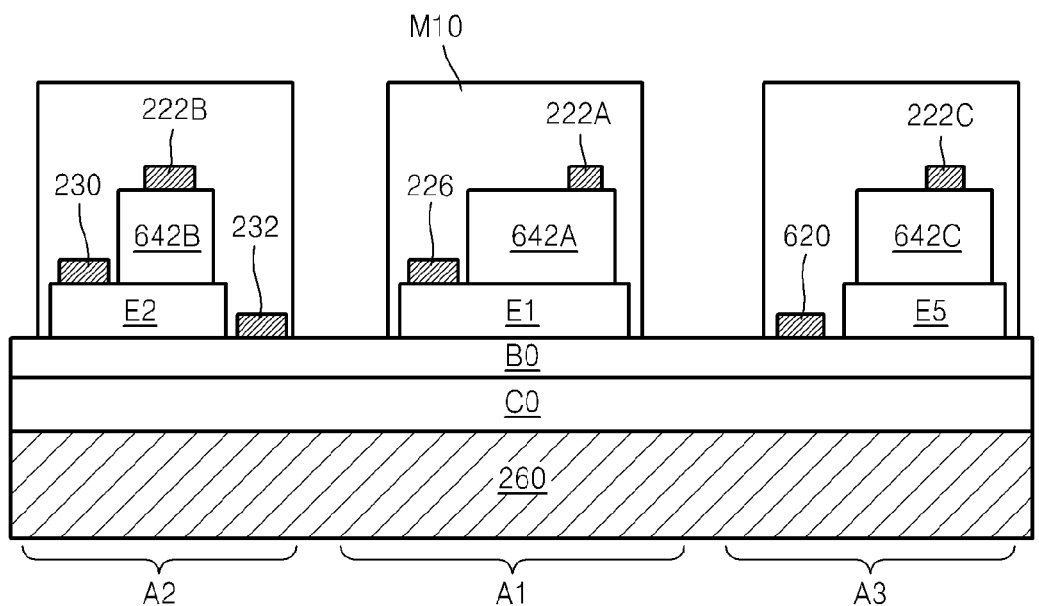
Figure 60:
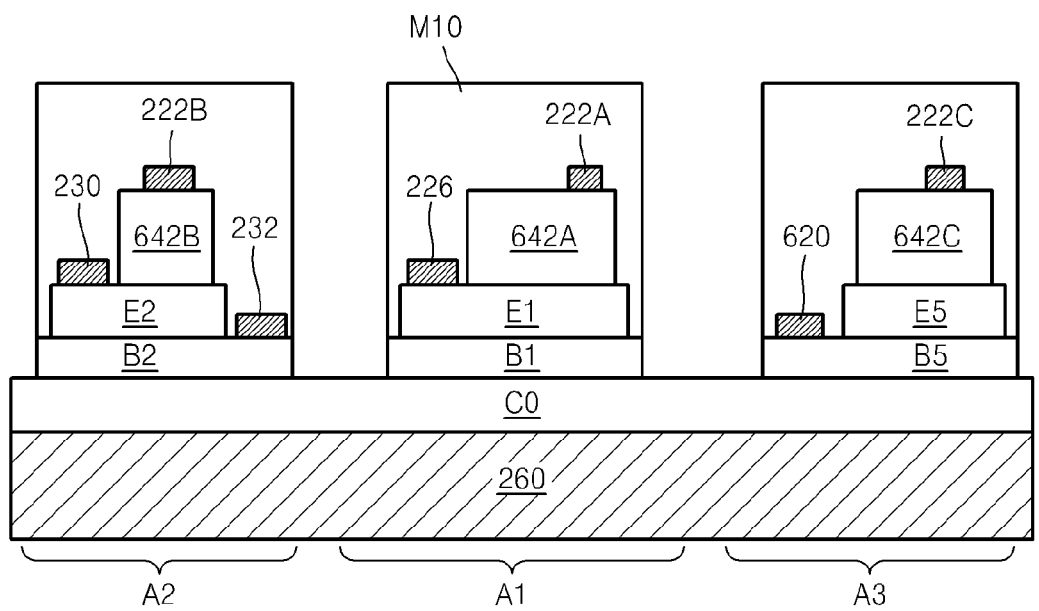

Referring to FIG. 59, a mask M10 is formed on the base layer B0. The mask M10 covers the first emitter E1 and elements formed on the first emitter E1 in a portion of the base layer B0 that corresponds to the first area A1 of the transparent substrate 260 and exposes the other portions of the base layer B0. The mask M10 covers the second emitter E2 and elements formed on the second emitter E2 in a portion of the base layer B0 that corresponds to the second area A2 of the transparent substrate 260, covers the fifth electrode 232, covers spaces between the fifth electrode 232 and the second emitter E, and exposes the other portions of the base layer B0. Also, the mask M10 covers the fifth emitter E5 and elements formed on the fifth emitter E5 in the third area A3 of the transparent substrate 260, covers spaces between the tenth electrode 620 and the fifth emitter E5, and exposes the other portions of the base layer B0. After the mask M10 is formed, the portion of the base layer B0 outside the mask M10 is etched until the collector layer C0 is exposed. By performing the etching process, the base layer B0 is divided into first, second, and fifth bases B1, B2, and B5, as illustrated in FIG. 60. After the etching process is performed, the mask M10 is removed.

Figure 61:
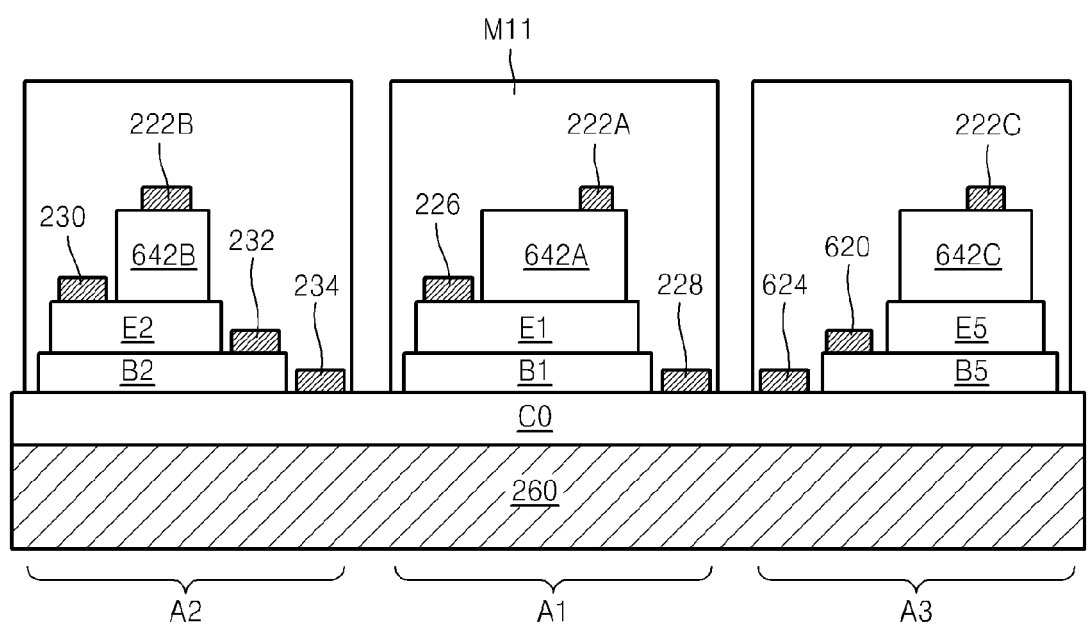

Referring to FIG. 61, a third electrode 228, a sixth electrode 234, and an eleventh electrode 624 are formed on the exposed portion of the collector layer C0. The third electrode 228 is formed in the first area A1 to be separated from the first base B1. The sixth electrode 234 is formed in the second area A2 to be separated from the second base B2. The eleventh electrode 623 is formed in the third area A3 to be separated from the fifth base B5. A mask M11 is formed on the collector layer C0. The mask 11 covers the first base B1 and elements formed on the first base B1 in a portion of the collector layer C0 that corresponds to the first area A1, covers the third electrode 228, covers spaces between the third electrode 228 and the first base B1, and exposes the other portions of the collector layer C0. The mask M11 covers the second base B2 and elements formed on the second base B2 in a portion of the collector layer C0 that corresponds to the second area A2, covers the sixth electrode 234, covers spaces between the sixth electrode 234 and the second base B2, and exposes the other portions of the collector layer C0. Also, the mask M11 covers the fifth base B5 and elements formed on the fifth base B5 in a portion of the collector layer C0 that corresponds to the third area A3, covers the eleventh electrode 624, covers spaces between the fifth base B5 and the eleventh electrode 624, and exposes the other portions of the collector layer C0. The portion of the collector layer C0 outside the mask M11 is etched until the transparent substrate 260 is exposed. After the etching process is performed, the mask M11 is removed. By performing the etching process, the collector layer C0 is divided into first, second, and fifth collectors C1, C2, and C5 that will be described below with reference to FIG. 62.

Figure 62:
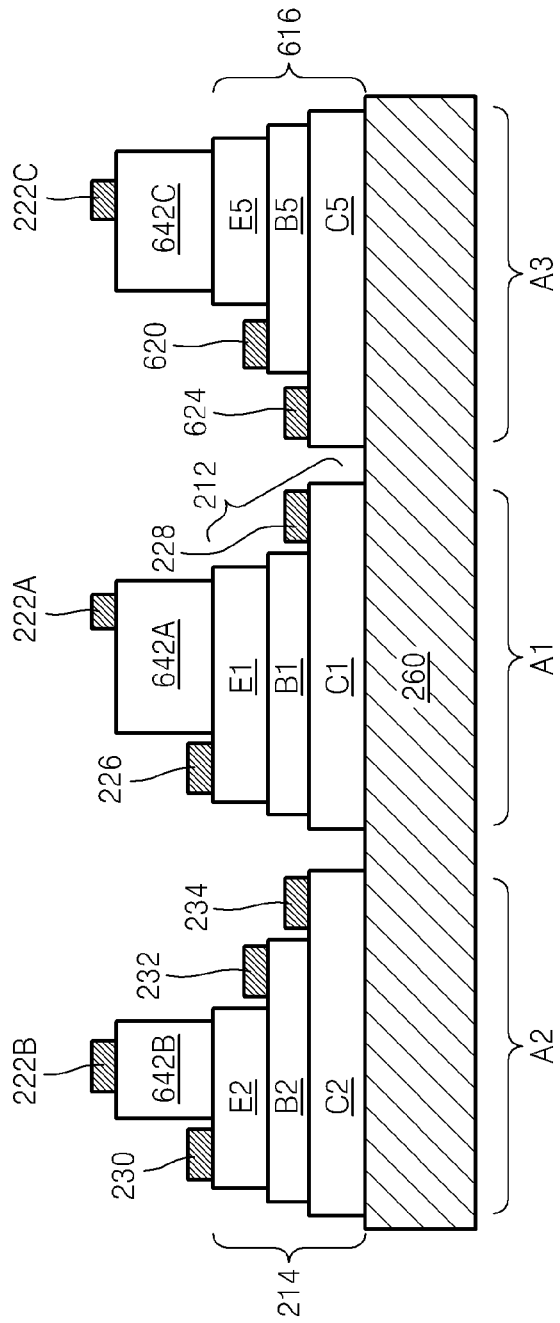

Referring to FIG. 62, an HPT 212 including the first collector C1, the first base B1, and the first emitter E1 is formed in the first area A1 of the transparent substrate 260 by performing the etching process using the mask M11, and an HBT 214 including the second collector C2, the second base B2, and the second emitter E2 is formed in the second area A2 of the transparent substrate 260. A second HBT 616 including the fifth collector C5, the fifth base B5, and the fifth emitter E5 and the light emitting unit 642C are sequentially formed in the third area A3 of the transparent substrate 260.

Figure 63:
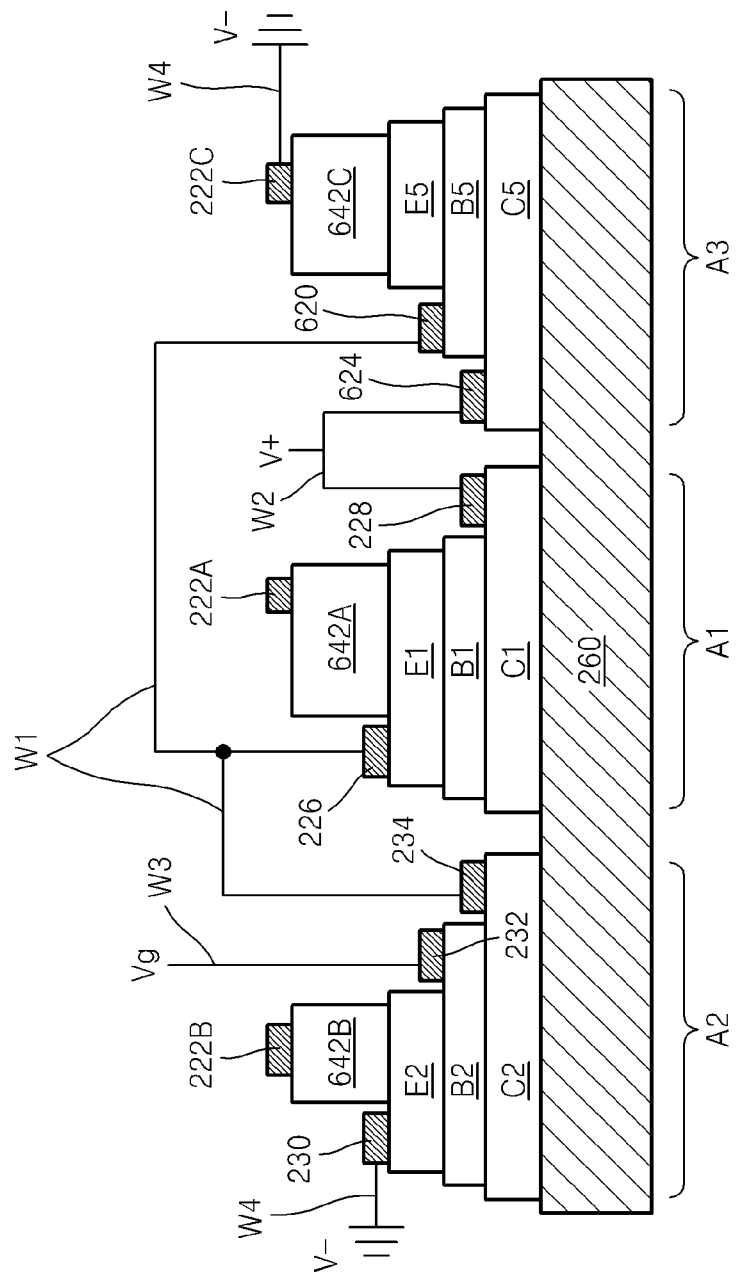

Referring to FIG. 63, a wiring W1 for connecting the second electrode 226, the tenth electrode 620, and the sixth electrode 234 is formed. A wiring W2 for connecting the third electrode 228 and the eleventh electrode 624 is formed. A voltage V+ is applied to the wiring W2. Also, a wiring W3 for applying a gating voltage Vg to the fifth electrode 232 is formed. Also, a wiring W4 for grounding the fourth electrode 230 and the third lower electrode 222C or for applying a voltage V− less than the voltage V+ is formed. The wirings W1, W2, W3, and W4 may be formed by covering the elements formed on the transparent substrate 260 by using an interlayer dielectric layer (not shown), by forming contact holes through which electrodes to which the wirings W1, W2, W3, and W4 are connected are exposed, in the interlayer dielectric layer, by forming a conductive layer for filling the contact holes, and by patterning the conductive layer in the form of a wiring.

An optical apparatus including the above-described optical modulator will now be described.

Figure 64:
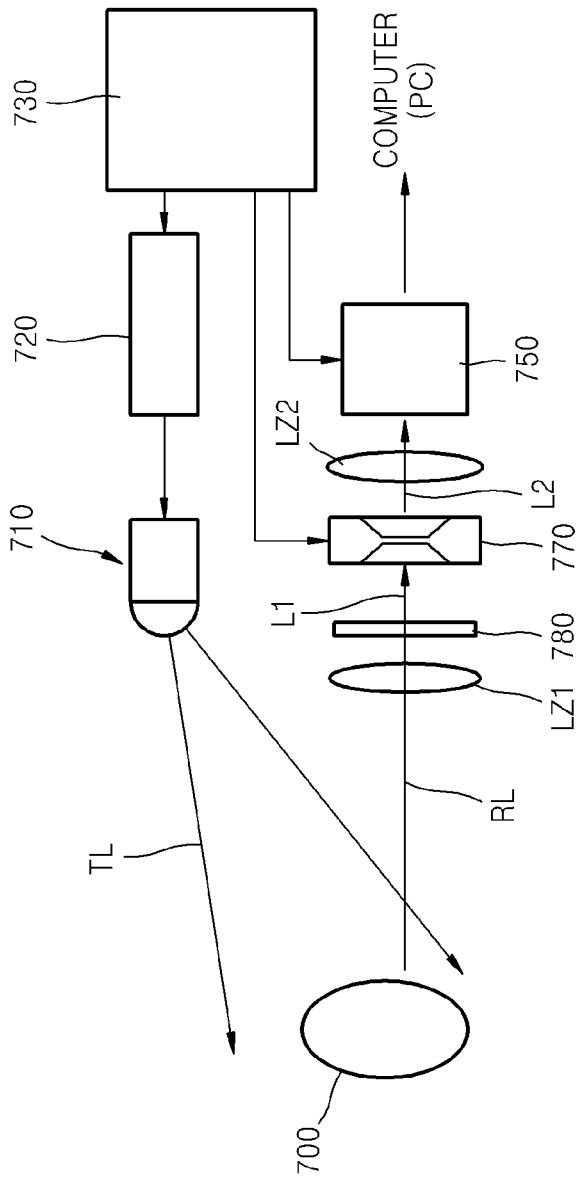
FIG. 64 is a schematic block diagram of an optical apparatus according to an exemplary embodiment of the present invention.

FIG. 64 is a schematic block diagram of an optical apparatus according to an exemplary embodiment of the present invention. The optical apparatus of FIG. 64 may be a camera system for distance measurement.

Referring to FIG. 64, the optical apparatus includes a light source 710, a light source driver 720, a camera controller 730, an optical image sensor 750, first and second lenses LZ1 and LZ2, a filter 780, and an optical modulator 770. The first lens LZ1, the filter 780, the optical modulator 770, the second lens LZ2, and the optical image sensor 750 are arranged in a line and may be on the same optical axis. Transmission light TL is emitted from the light source 710 and is irradiated on a subject 700. In this case, the transmission light TL may be infrared light. The transmission light TL may be irradiated in the form of a pulse or sinusoidal wave. The light source 710 is controlled by a light source driver 720. The operation of the light source driver 720 is controlled by a camera controller 730. The camera controller 730 controls the operations of the optical modulator 770 and the optical image sensor 750. The optical image sensor 750 may be a CCD or CMOS. The first lens LZ1 condenses reflection light RL reflected from the subject 700 so that the reflection light RL may be incident on the filter 780. The filter 780 is a pass filter for removing scattered light of the reflection light RL excluding the transmission light TL and may be an IR pass filter. The second lens LZ2 condenses light emitted from the optical modulator 770 on the optical image sensor 750. The optical modulator 770 may be any of the first through fifth optical modulators described above.

The optical modulator 770 may gate incident light L1 by using a logic gating method by which the incident light L1 is turned on/off according to an electric gating signal. Also, the optical modulator 770 may gate its optical gain by using a sine function. Distance measurement using correlation may be performed by using the logic gating method. In the case of the gain gating, a phase delay between the transmission light TL and the incident light L1 may be measured by using a self-mixing method so that distance measurement may be performed by using phase delay measurement.

Light L2 that passes through the optical modulator 770 is incident on the optical image sensor 750 via the second lens LZ2. When the optical image sensor 750 is a CCD, the optical image sensor 750 integrates the quantity of accumulated light that is gated at high speed under control of the camera controller 730 for an amount of time and outputs a brightness image of the accumulated light to a computer. A CCD and a CMOS that are general two-dimensional optical image sensors may be used in a distance measurement method using the optical modulator 770. Thus, by using the distance measurement method using the optical modulator 770, information about the distance between a subject and a camera which has high resolution may be obtained.

As described above, the optical modulator according to one or more exemplary embodiments of the present invention may be stacked perpendicular to a semiconductor substrate and may be integrated so as to have a relatively low volume. The optical modulator may be inexpensively manufactured using a general semiconductor manufacturing process. In particular, a gating voltage may be reduced and a fast gating speed of about 1 ns to about 2 ns may be attained. In addition, an optical amplification ratio of 2 or more may be attained so that distance measurement may be performed based on a time-of-flight (TOF) method.

Accordingly, the optical modulator according to one or more exemplary embodiments of the present invention may be used to capture three-dimensional images in real life and may be applied to various fields such as three-dimensional environment recognition technology, laser radar, input devices for three-dimensional displays, ultra high-speed photography, and the like.

Also, a general three-dimensional distance measurement camera has low resolution because modulation and demodulation is usually performed inside a charge coupled device (CCD) constituting an image sensor. In order to improve resolution, a signal processor may be disposed around unit pixels. In this case, the size of unit pixels is increased. Thus, it is difficult to manufacture a general three-dimensional distance measurement camera with high resolution.

On the other hand, a general CCD or CMOS may be used in the optical apparatus including the optical modulator according to one or more exemplary embodiments of the present invention so that high resolution may be attained.

Furthermore, in the optical modulator according to one or more exemplary embodiments of the present invention, an array may be constituted. Thus, light input to the array may be modulated and then may be transmitted as several transmission lights. Thus, the optical modulator according to one or more exemplary embodiments of the present invention may be used in various fields of optical communication.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. An optical modulator comprising:
an electro-optical converter and an optical-electric converter, which are stacked in the direction perpendicular to a substrate; and
a gate transistor which, when gating ON is performed, gates a signal transmitted to the electro-optical converter from the optical-electric converter and allows charges generated in the optical-electric converter and charges remaining in the electro-optical converter to flow through the gate transistor while bypassing the electro-optical converter.

2. The optical modulator of claim 1, wherein
the electro-optical converter is one of a plurality of electro-optical converters, the optical-electric converter is one of a plurality of optical-electric converters, and the gate transistor is one of a plurality of gate transistors, and
the optical modulator further comprises an array comprising a plurality of unit pixels, wherein each of the plurality of unit pixels comprises a corresponding one of the plurality of optical-electric converters, a corresponding one of the plurality of electro-optical converters, and a corresponding one of the plurality of gate transistors.

3. The optical modulator of claim 2, further comprising a control unit which simultaneously controls the plurality of gate transistors of the array.

4. The optical modulator of claim 3, wherein the plurality of gate transistor and the control unit are connected to each other via a power transistor.

5. The optical modulator of claim 2, wherein
the array comprises a plurality of blocks, each one of the plurality of blocks comprising at least two of the plurality of unit pixels, and
for each of the plurality of blocks, gate transistors of the at least two of the plurality of unit pixels are simultaneously controlled.

6. The optical modulator of claim 1, further comprising a charge amplification unit disposed between the optical-electric converter and the electro-optical converter,
wherein an output terminal of the optical-electric converter is connected to the gate transistor and the charge amplification unit, and
wherein a unit pixel comprises the optical-electric converter, the electro-optical converter, the charge amplification unit, and the gate transistor.

7. The optical modulator of claim 1, further comprising:
a gate layer, which is an anode layer held in common by the optical-electric converter and the electro-optical converter, and
a unit pixel which comprises the optical-electric converter and the electro-optical converter,
wherein the gate transistor is connected to the gate layer and is disposed outside the unit pixel.

8. The optical modulator of claim 7, wherein the unit pixel is one of a plurality of unit pixels of an array, wherein the gate transistor is disposed outside the array.

9. The optical modulator of claim 8, wherein
the array comprises a plurality of blocks, and each of the plurality of blocks comprises at least two of the plurality of unit pixels, and
the gate transistor is one of a plurality of gate transistors, and the plurality of gate transistors are disposed outside the array such that each of the plurality of gate transistors corresponds to one of the plurality of blocks.

10. The optical modulator of claim 9, further comprising a plurality of loads disposed such that for each of the plurality of unit pixels, one of the plurality of loads is disposed between the unit pixel and the gate transistor corresponding to the one of the plurality of blocks of the unit pixel.

11. The optical modulator of claim 1, wherein the optical-electric converter comprises a heterojunction phototransistor (HPT) having a 2-port structure.

12. The optical modulator of claim 1, wherein the optical-electric converter comprises a heterojunction phototransistor (HPT) having a 3-port structure.

13. The optical modulator of claim 11, wherein the HPT comprises an emitter, a base, and a collector sequentially stacked on the electro-optical converter, and a collector of the gate transistor is connected to the emitter of the HPT.

14. The optical modulator of claim 11, wherein the HPT comprises a collector, a base, and an emitter sequentially stacked on the electro-optical converter, and an emitter of the gate transistor is connected to the collector of the HPT.

15. The optical modulator of claim 12, wherein the HPT comprises an emitter, a base, and a collector sequentially stacked on the electro-optical converter, and a collector of the gate transistor is connected to the base of the HPT.

16. The optical modulator of claim 6, wherein the gate transistor comprises a first heterojunction bipolar transistor (HBT), and the charge amplification unit comprises a second HBT.

17. The optical modulator of claim 7, wherein the optical-electric converter comprises an avalanche photodiode (APD).

18. A method of operating an optical modulator including an electro-optical converter, an optical-electric converter, and a gate transistor, the method comprising:

putting the gate transistor into an ON state by applying a gating voltage signal to a gate of the gate transistor, to gate a signal transmitted to the electro-optical converter from the optical-electric converter and allow charges generated in the optical-electric converter and charges remaining in the electro-optical converter to flow through the gate transistor while bypassing the electro-optical converter.

19. The method of claim 18, wherein the applying the gating voltage signal comprises supplying the gating voltage signal in a pulse waveform, a sinusoidal waveform or a triangular waveform.

20. An optical apparatus comprising an optical modulator, wherein the optical modulator comprises:

an electro-optical converter and an optical-electric converter, which are stacked perpendicular to a substrate; and a gate transistor which, when gating ON is performed, gates a signal transmitted to the electro-optical converter from the optical-electric converter and allows charges generated in the optical-electric converter and charges remaining in the electro-optical converter to flow through the gate transistor while bypassing the electro-optical converter.

21. A method of manufacturing an optical modulator, the method comprising:

stacking an electro-optical converter and an optical-electric converter perpendicular to a substrate; and forming a gate transistor and connecting the gate transistor to the electro-optical converter and the optical-electric converter such that when gating ON is performed, the gate transistor gates a signal transmitted to the electro-optical converter from the optical-electric converter, and allows charges generated in the optical-electric converter and charges remaining in the electro-optical converter to flow through the gate transistor while bypassing the electro-optical converter.

22. The method of claim 21, wherein the stacking the electro-optical converter and the optical-electric converter comprises:

forming the electro-optical converter; and forming the optical-electric converter on the electro-optical converter.

23. The method of claim 21, wherein the stacking the electro-optical converter and the optical-electric converter comprises:

forming the optical-electric converter; and forming the electro-optical converter on the optical-electric converter.

24. The method of claim 21, further comprising:

forming a charge amplification unit for amplifying charges generated in the optical-electric converter, and connecting the charge amplification unit to an output terminal of the optical-electric converter, and connecting the gate transistor to the output terminal of the optical-electric converter.

25. The method of claim 21, wherein, the stacking the electro-optical converter and the optical-electric converter comprises:

stacking at least an emitter layer, a base layer, and a collector layer in that order, to form the electro-optical converter, and stacking at least an emitter layer, a base layer and a converter layer in that order, to form the electro-optical converter.

26. The method of claim 21, wherein, the stacking the electro-optical converter and optical-electric converter comprises:

stacking at least an emitter layer, a base layer, and a collector layer in that order, to form the electro-optical converter, and stacking at least an emitter layer, a base layer, and a collector layer in that order, to form the optical-electric converter.

27. The method of claim 22, further comprising forming a gate layer between the optical-electric converter and the electro-optical converter, wherein the gate transistor and the gate layer are connected to each other.

28. The method of claim 21, wherein the optical-electric converter, the electro-optical converter, and the gate transistor form a unit pixel.

29. The method of claim 21, wherein the optical-electric converter and the electro-optical converter form a unit pixel.

30. The method of claim 24, wherein the optical-electric converter, the electro-optical converter, the gate transistor, and the charge amplification unit form a unit pixel.

31. The method of claim 21, wherein the optical-electric converter and the gate transistor are simultaneously formed.

32. The method of claim 24, wherein the optical-electric converter, the gate transistor, and the charge amplification unit are simultaneously formed.

33. The method of claim 21, wherein the optical-electric converter comprises a heterojunction phototransistor (HPT) having a 2-port structure or 3-port structure structure.

34. The method of claim 33, wherein the optical-electric converter comprises the HPT having the 2-port structure, and an emitter of the optical-electric converter and a collector of the gate transistor are connected to each other.

35. The method of claim 33, wherein the optical-electric converter comprises the HPT having the 2-port structure, and a collector of the optical-electric converter and an emitter of the gate transistor are connected to each other.

36. The method of claim 33, wherein, the optical-electric converter comprises the HPT having the 3-port structure, and a base of the optical-electric converter and a collector of the gate transistor are connected to each other.

37. The method of claim 24, wherein each of the optical-electric converter, the gate transistor, and the charge amplification unit comprises a corresponding heterojunction phototransistor (HPT), and an emitter of the optical-electric converter is connected to a collector of the gate transistor and a base of the charge amplification unit.

38. The method of claim 21, wherein the optical-electric converter comprises a photodiode or an avalanche photodiode (APD).

* * * * *